(12) United States Patent
Irvine

(10) Patent No.: US 9,411,976 B2
(45) Date of Patent: Aug. 9, 2016

(54) COMMUNICATION SYSTEM AND METHOD

(71) Applicant: Maidsafe Ltd, Troon (GB)

(72) Inventor: David Irvine, Troon (GB)

(73) Assignee: MAIDSAFE FOUNDATION, Troon (GB)

( * ) Notice: Subject to any disclaimer, the term of this patent is extended or adjusted under 35 U.S.C. 154(b) by 9 days.

(21) Appl. No.: 14/260,432

(22) Filed: Apr. 24, 2014

(65) Prior Publication Data

US 2014/0237614 A1 Aug. 21, 2014

Related U.S. Application Data

(63) Continuation-in-part of application No. 13/362,384, filed on Jan. 31, 2012, now Pat. No. 8,788,803, which is a continuation of application No. 12/476,229, filed on Jun. 1, 2009, now abandoned, which is a continuation of application No. PCT/GB2007/004421, filed on Nov. 21, 2007.

(30) Foreign Application Priority Data

Dec. 1, 2006  (GB) .................................. 0624053.5
May 22, 2007 (GB) .................................. 0709759.5

(51) Int. Cl.
  *H04L 29/06* (2006.01)
  *G06F 21/62* (2013.01)
  *H04L 29/08* (2006.01)

(52) U.S. Cl.
  CPC ........ *G06F 21/6218* (2013.01); *H04L 63/0421* (2013.01); *H04L 63/123* (2013.01); *H04L 67/1097* (2013.01)

(58) Field of Classification Search
  CPC .......... G06F 11/2056; G06F 17/30194; G06F 3/065; G06F 17/30097; G06F 21/6272; G06F 21/64; G06F 21/645; G06F 11/1435; G06F 11/1471; G06F 21/6218; G06F 2221/2107; G06Q 10/10; Y10S 707/99955; H04L 9/06; H04L 63/08; H04L 9/0625; H04L 63/0428
  See application file for complete search history.

(56) References Cited

U.S. PATENT DOCUMENTS

| | | | |
|---|---|---|---|
| 7,805,366 B2* | 9/2010 | Chen et al. ...................... 705/40 |
| 2002/0032691 A1* | 3/2002 | Rabii et al. .................... 707/200 |
| 2002/0038296 A1* | 3/2002 | Margolus et al. ................. 707/1 |
| 2002/0112134 A1* | 8/2002 | Ohran et al. ................... 711/162 |
| 2003/0048903 A1* | 3/2003 | Ito et al. ........................ 380/263 |
| 2003/0187853 A1* | 10/2003 | Hensley et al. ................. 707/10 |
| 2004/0131181 A1* | 7/2004 | Rhoads ........................... 380/37 |
| 2005/0172010 A1* | 8/2005 | Malone et al. ................ 709/219 |

* cited by examiner

*Primary Examiner* — Mohammad W Reza
*Assistant Examiner* — Carlton Johnson

(57) ABSTRACT

There is provided a system, including a network that is defined by its novel approach to privacy, security and freedom for its users, namely privacy by allowing access anonymously, security by encrypting and obfuscating resources and freedom by allowing users to anonymously and irrefutably be seen as genuine individuals on the network and to communicate with other users with total security and to securely access resources that are both their own and those that are shared by others with them. Functional mechanisms that the system are able to restore open communications and worry-free access in a manner that is very difficult to infect with viruses or cripple through denial of service attacks and spam messaging; moreover, it will provide a foundation where vendor lock-in need not be an issue.

17 Claims, 28 Drawing Sheets

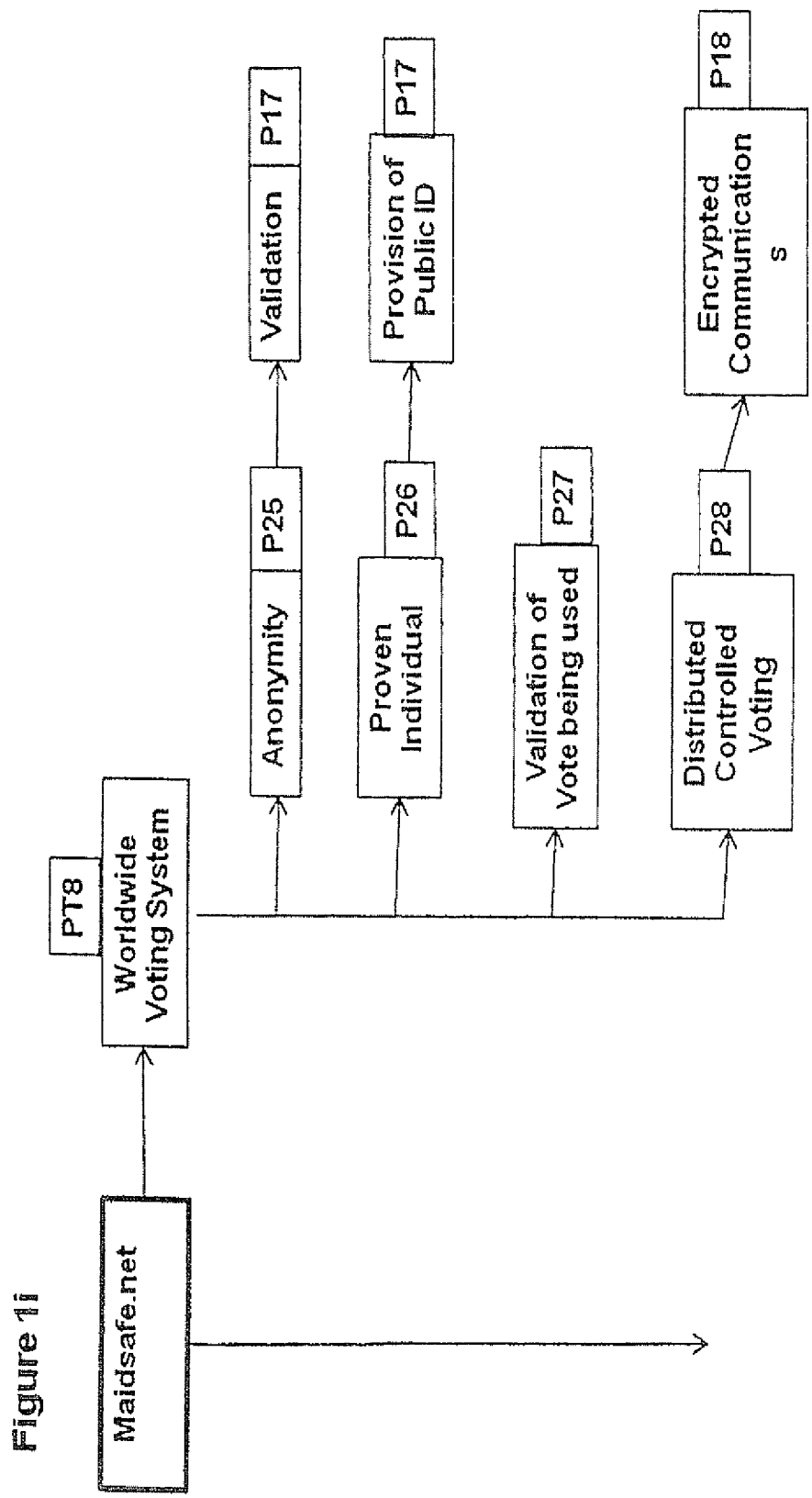

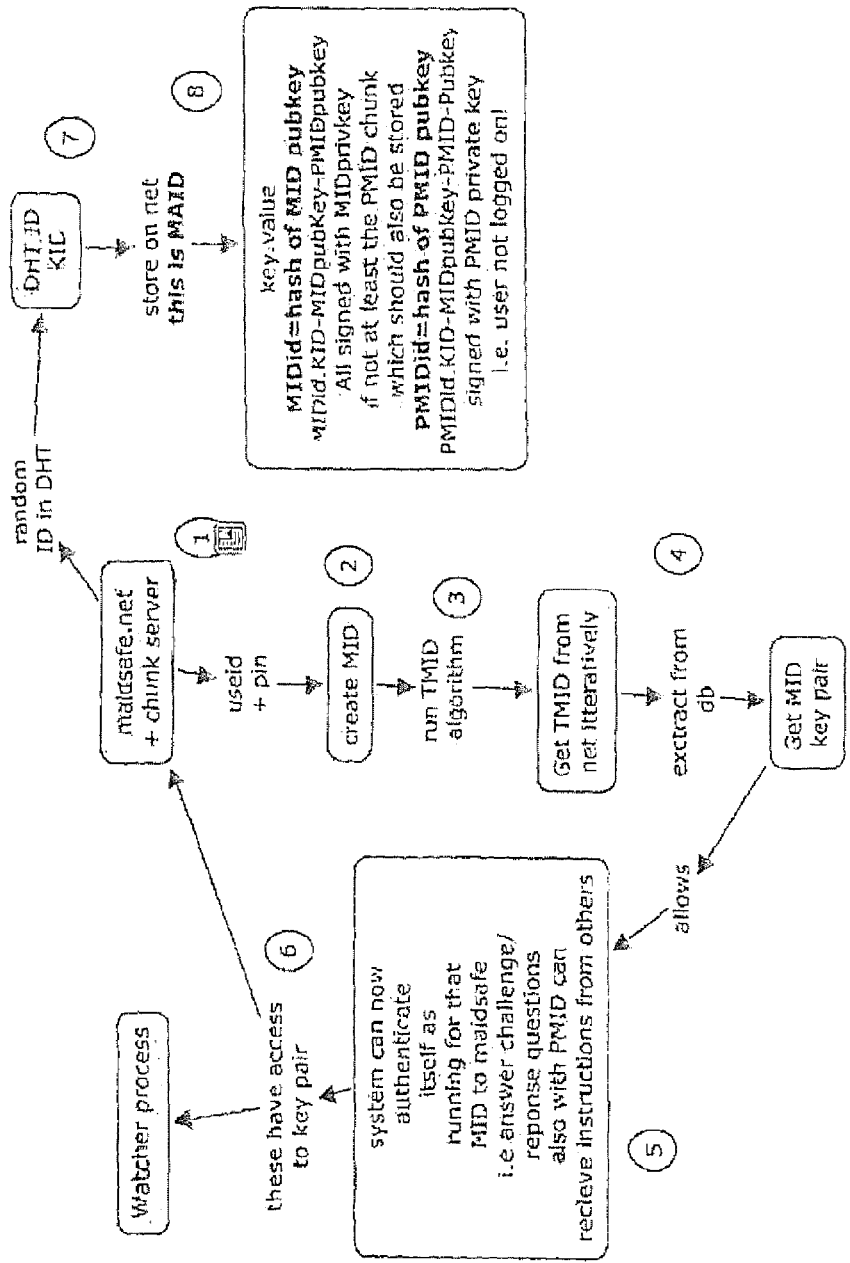
Figure 2 – Self Authentication Detail

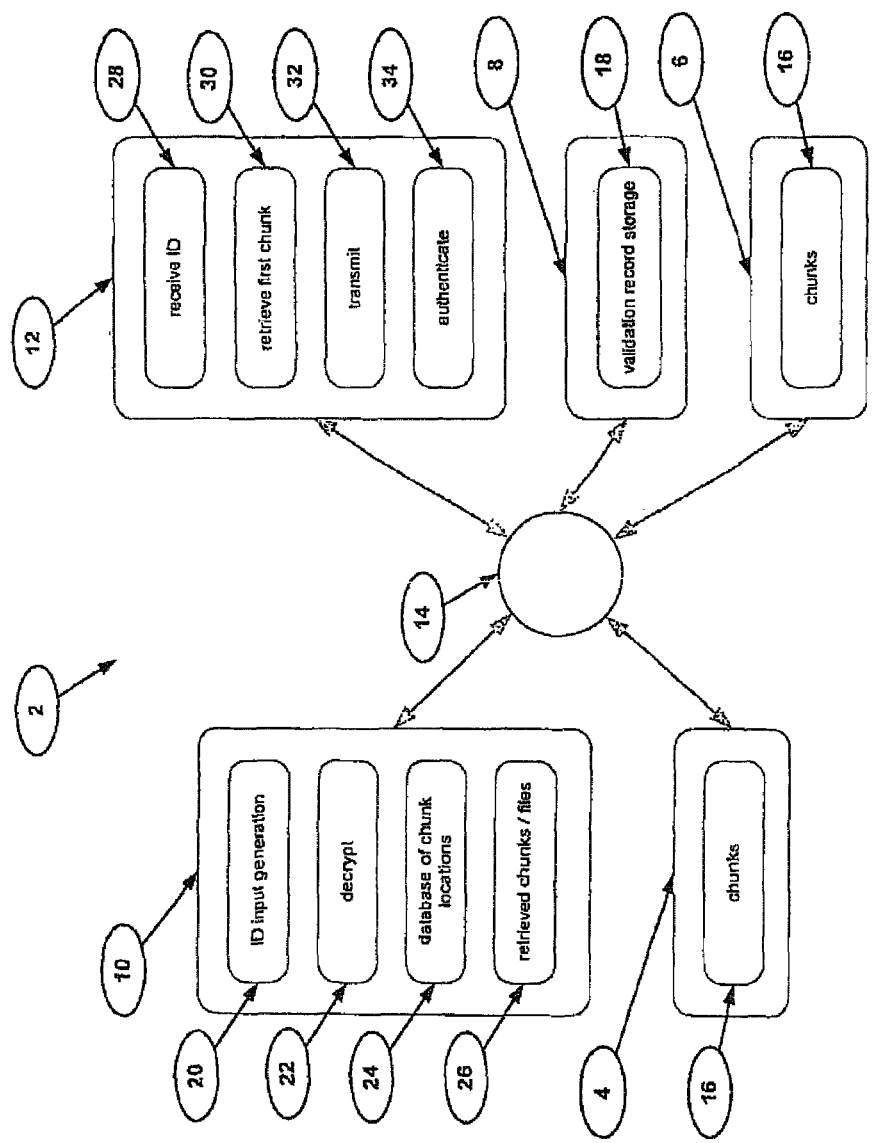
Figure 3 – Peer to Peer Schematic

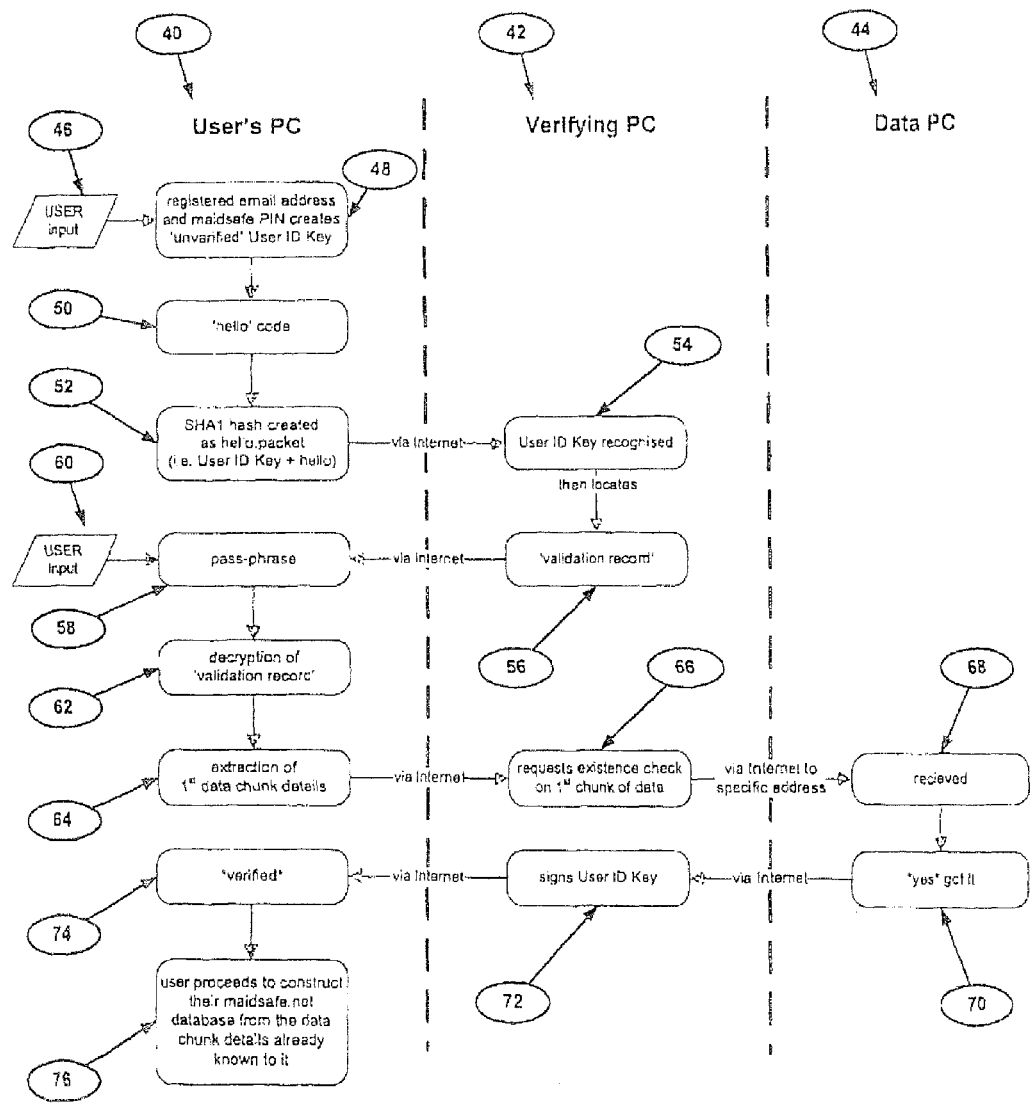

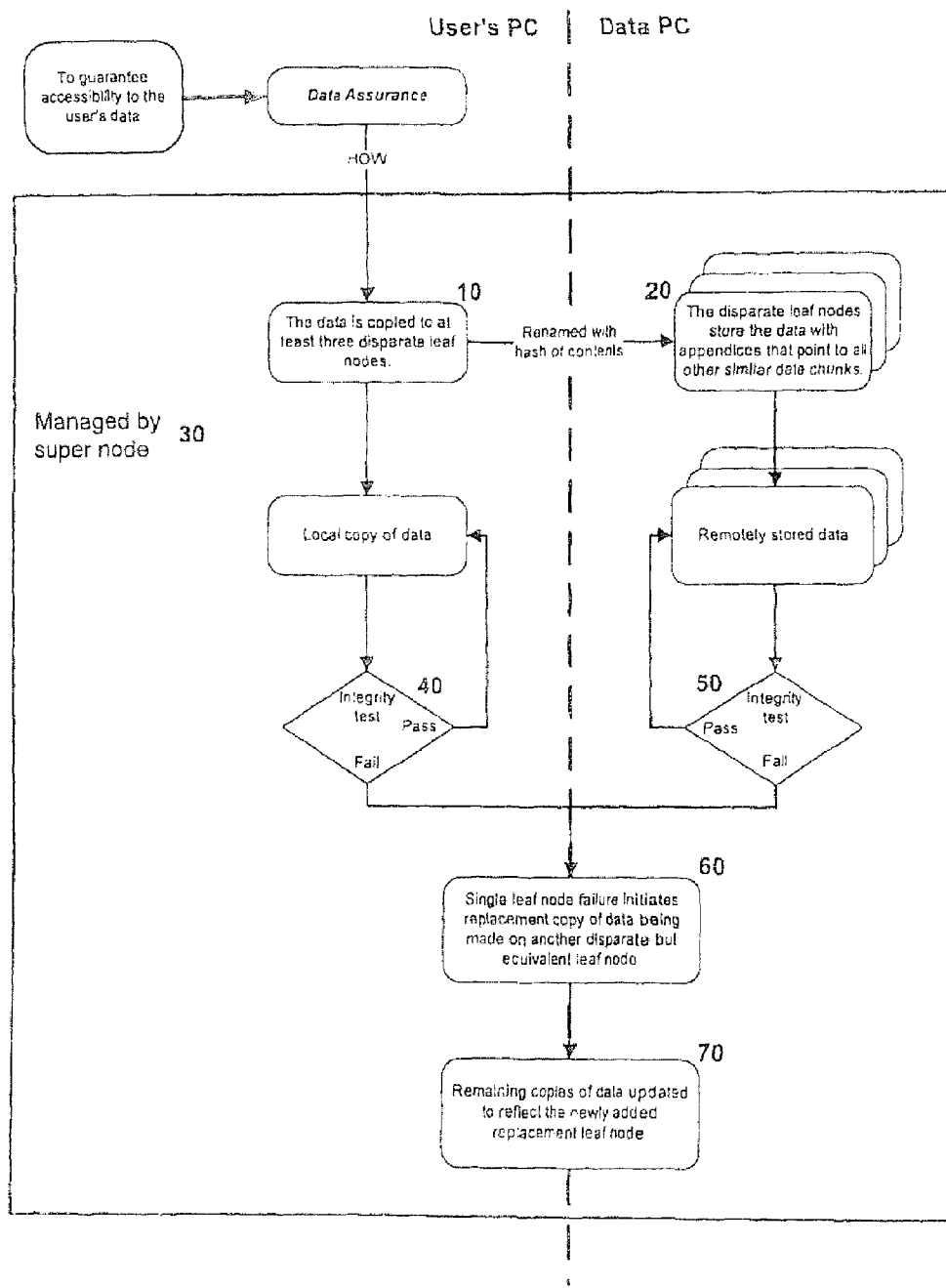
Figure 5 - Data Assurance Event Sequence

Figure 6 – Chunking Event Sequence
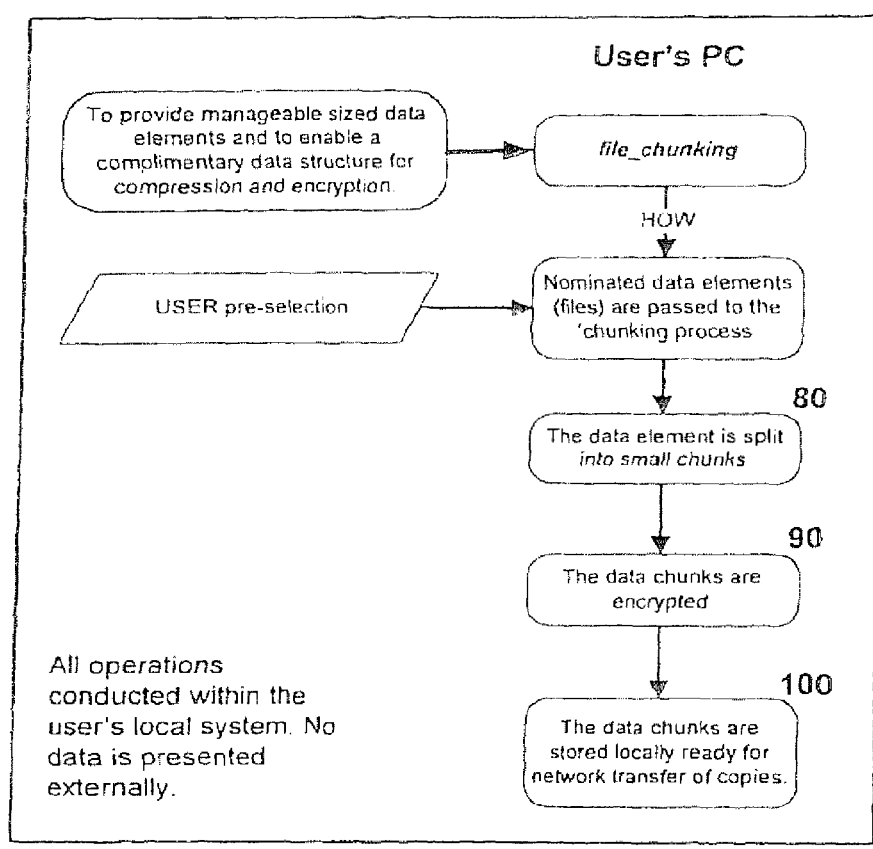

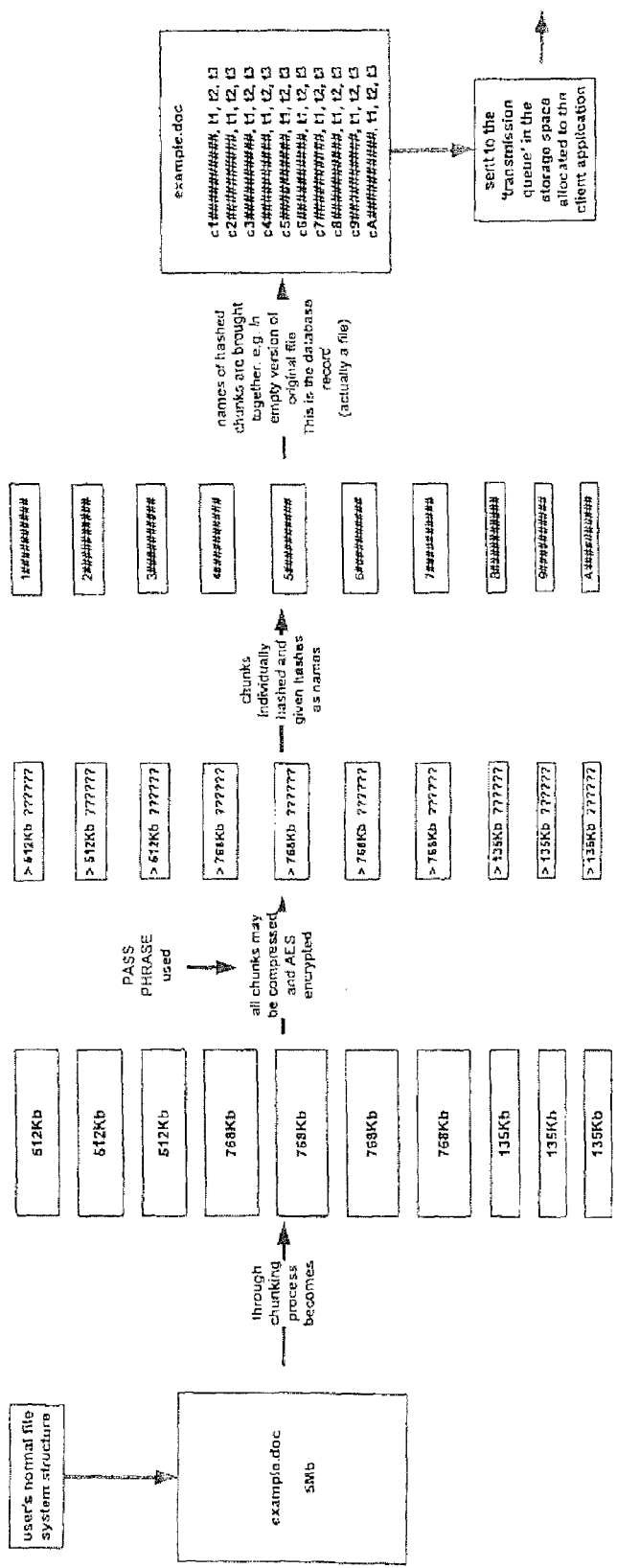
Figure 7 – Chunking Example

Figure 8 – Self Healing Event Sequence
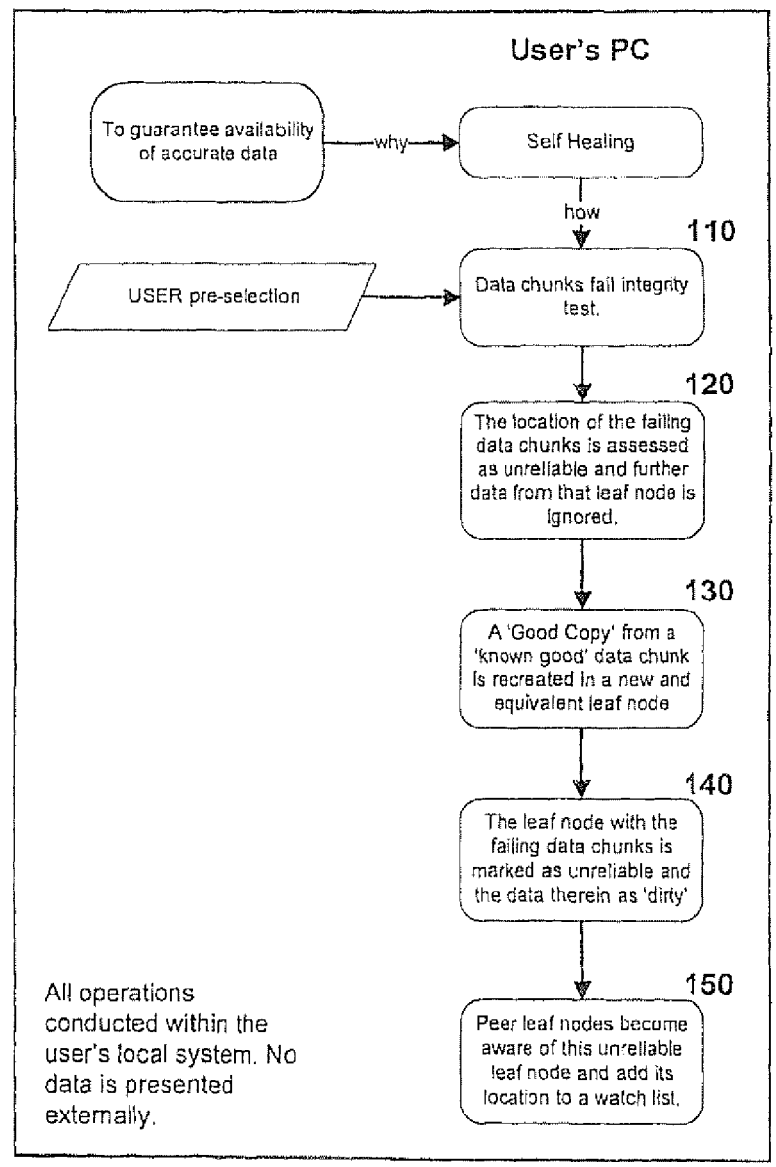

Figure 9 – Peer Ranking Event Sequence
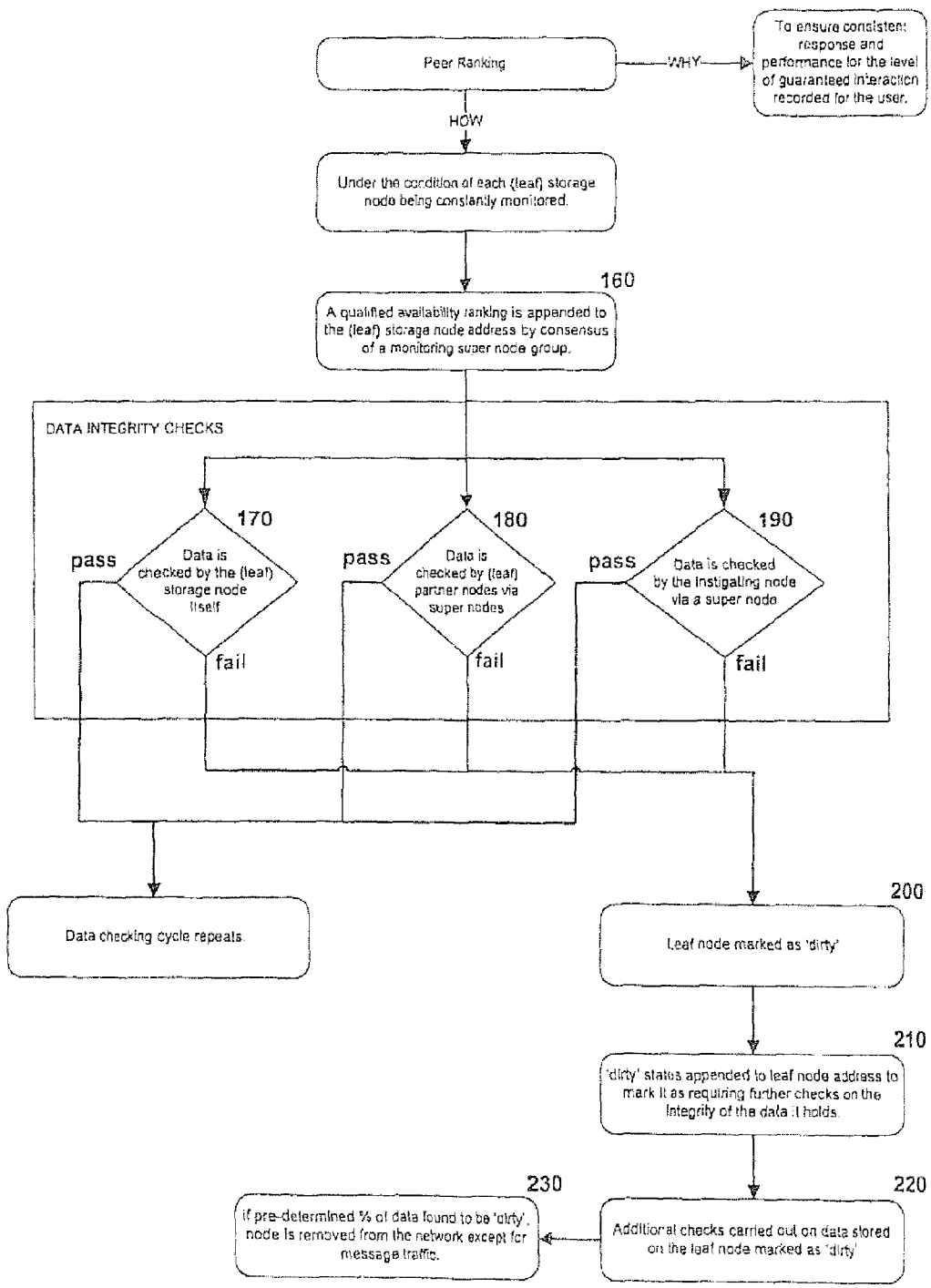

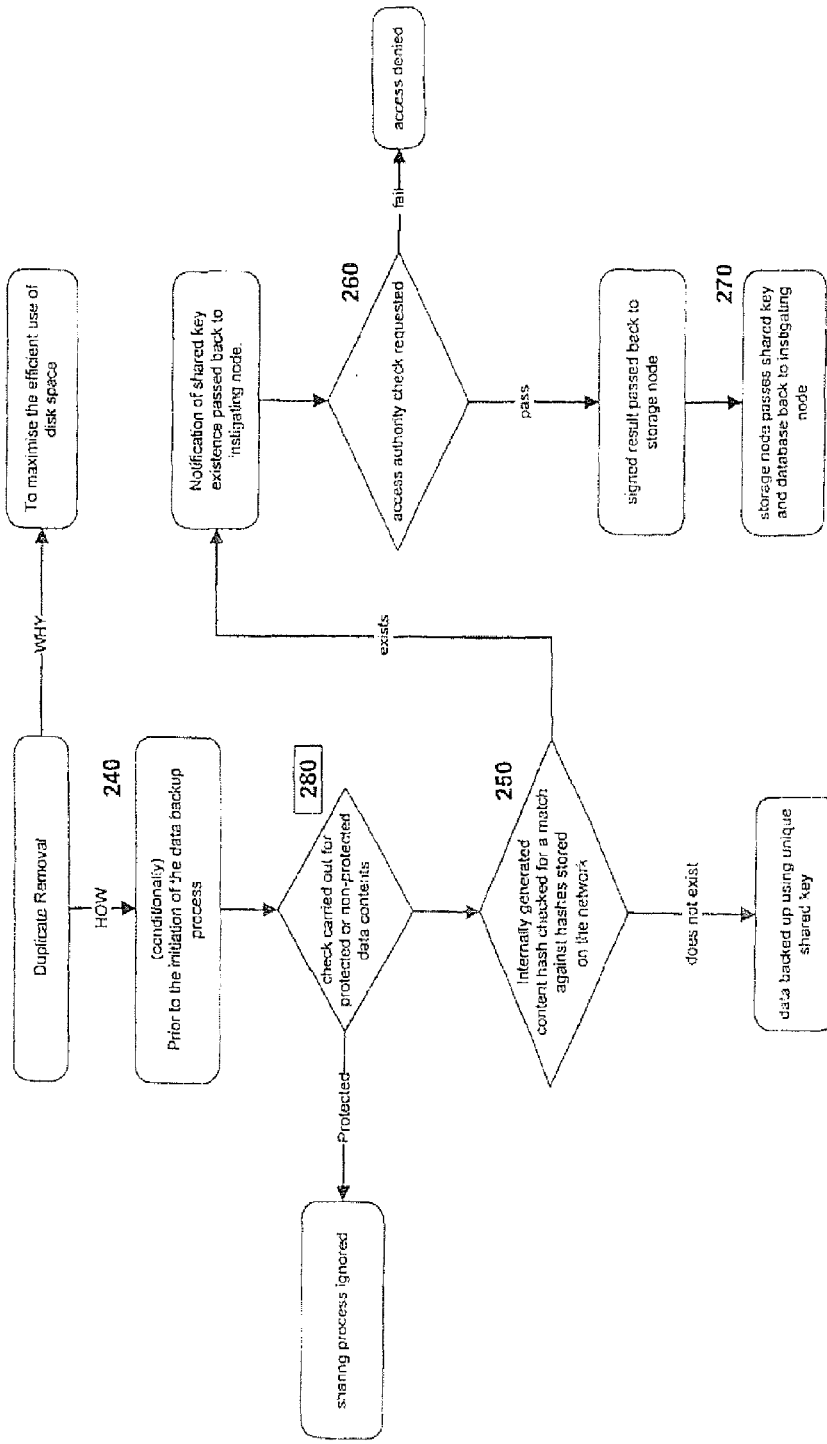
Figure 10 – Duplicate Removal Event Sequence

Figure 11 – Perpetual Data
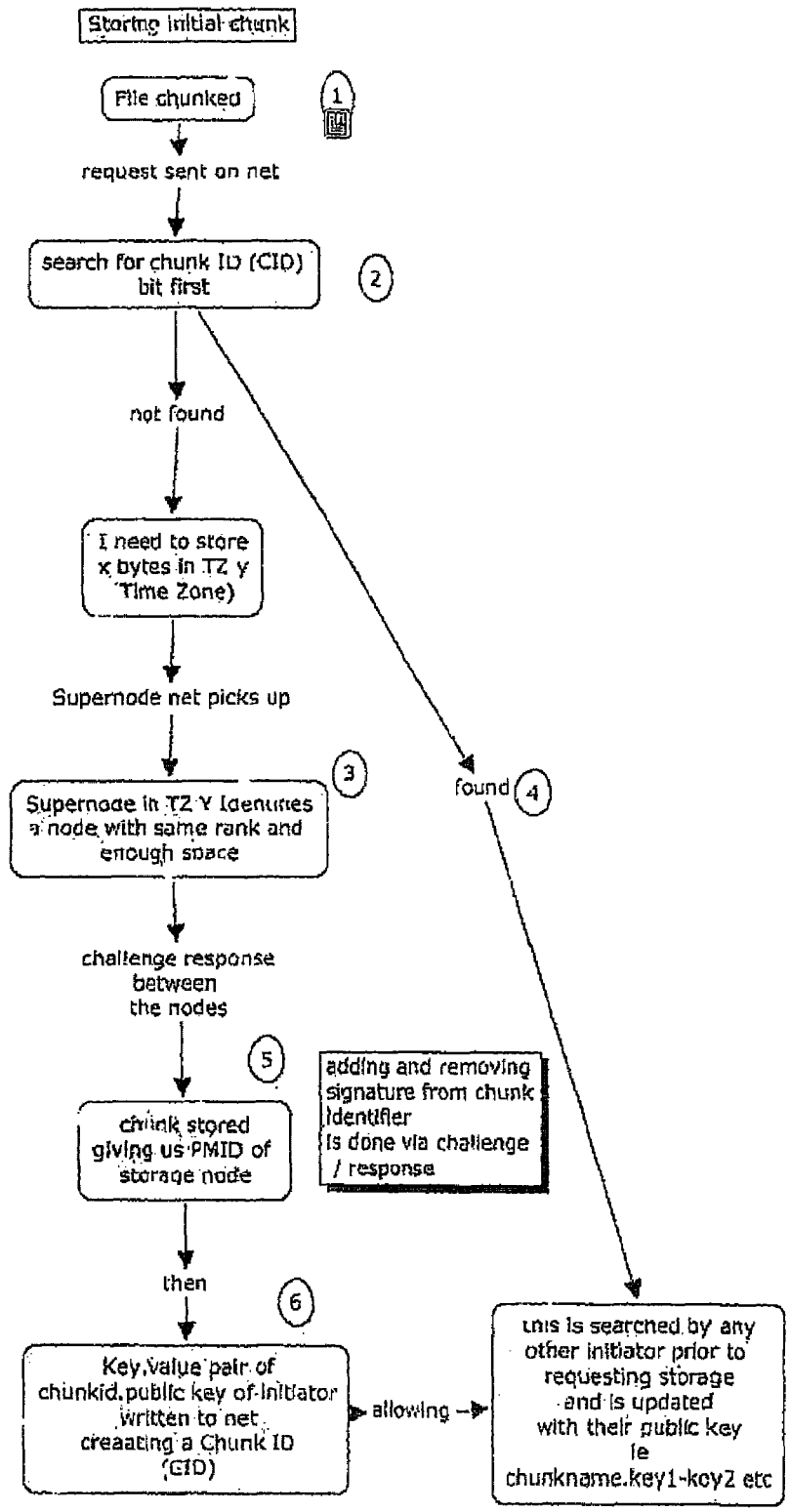

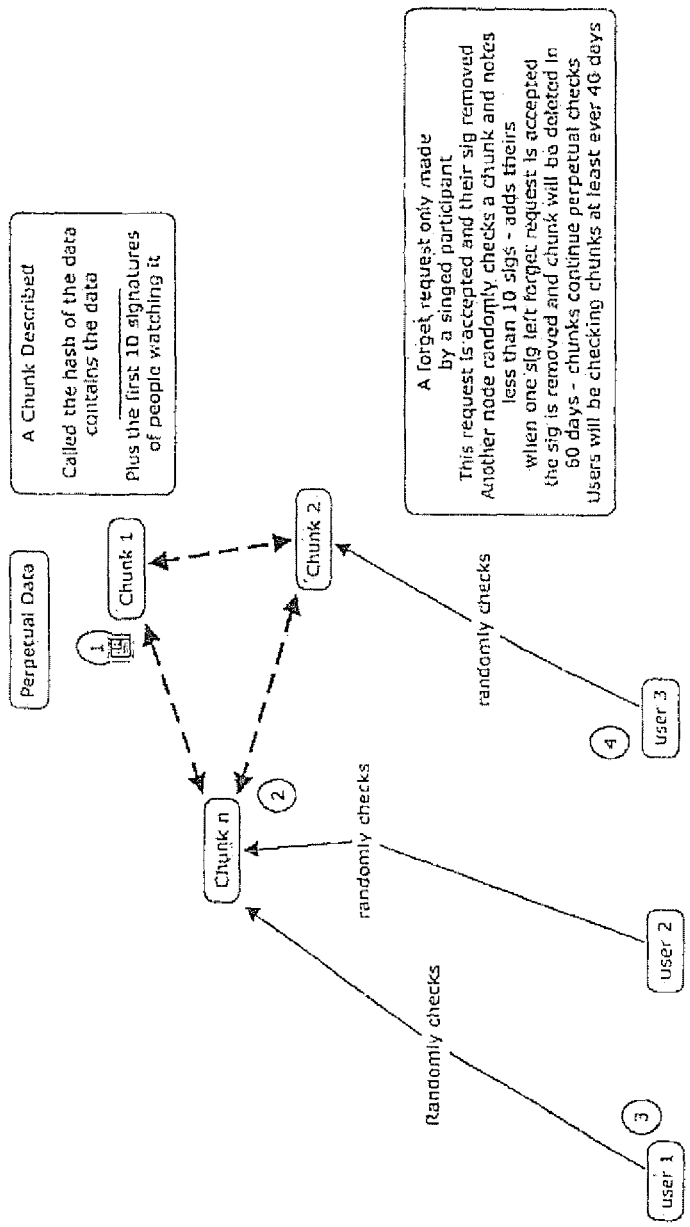
Figure 12 – Chunk Checks

Figure 13 – Storage of Additional Chunks
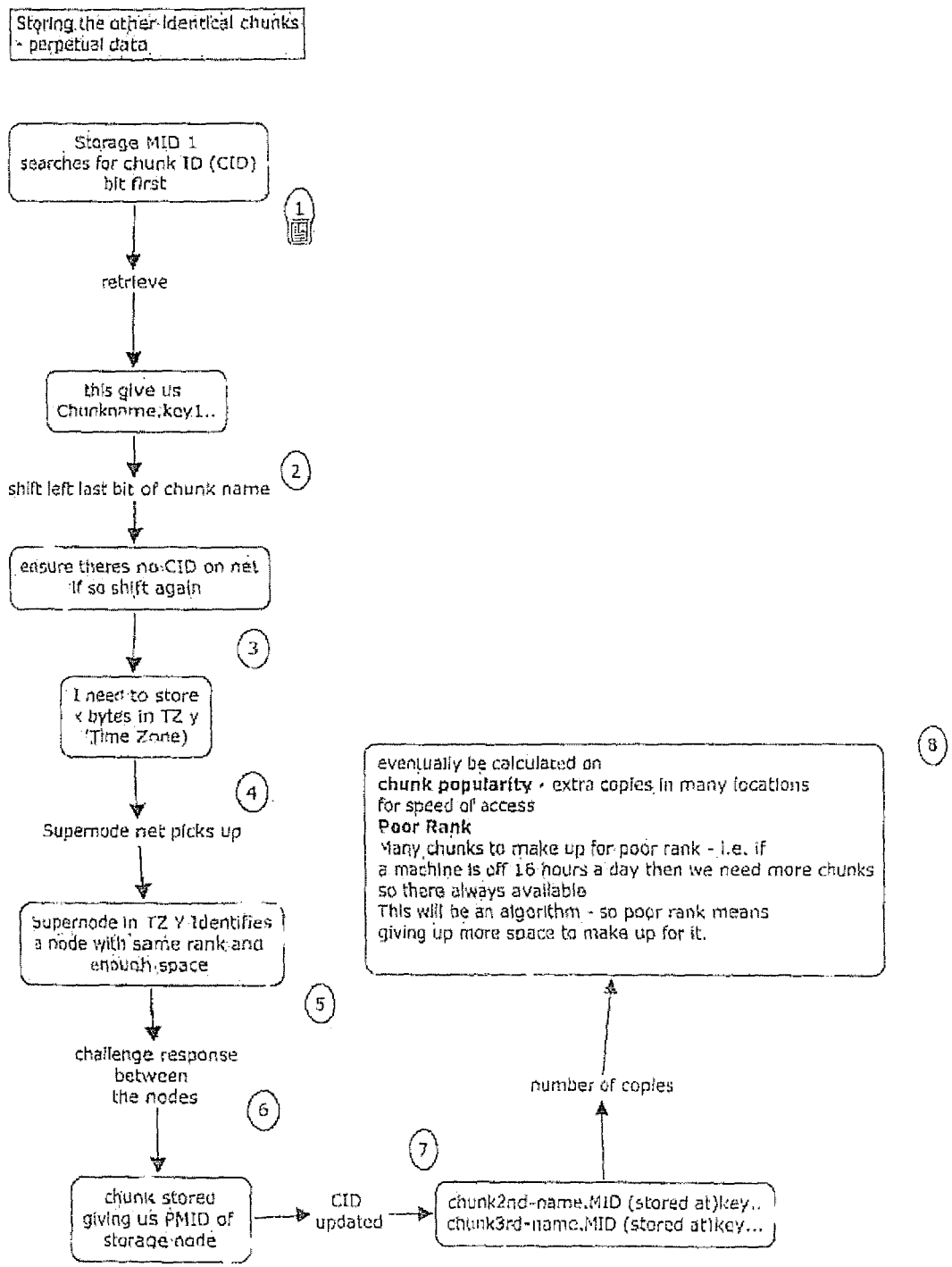

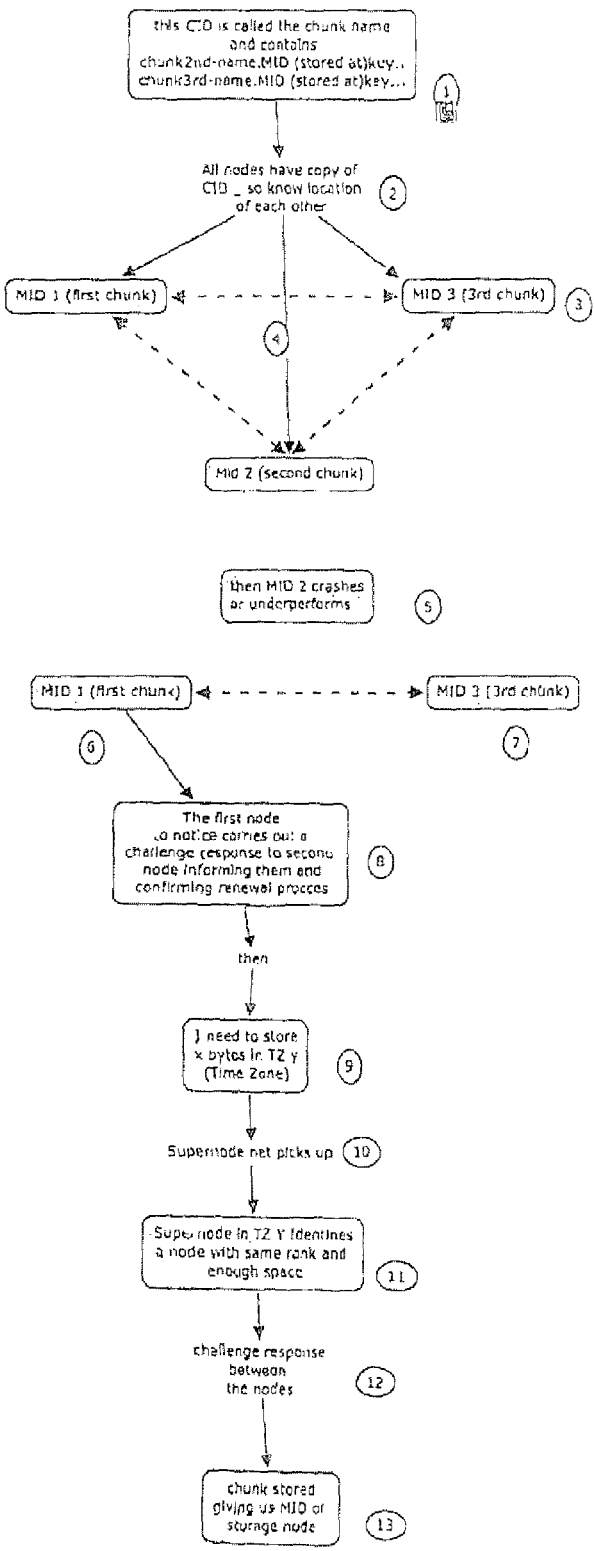
Figure 14 – Self Healing

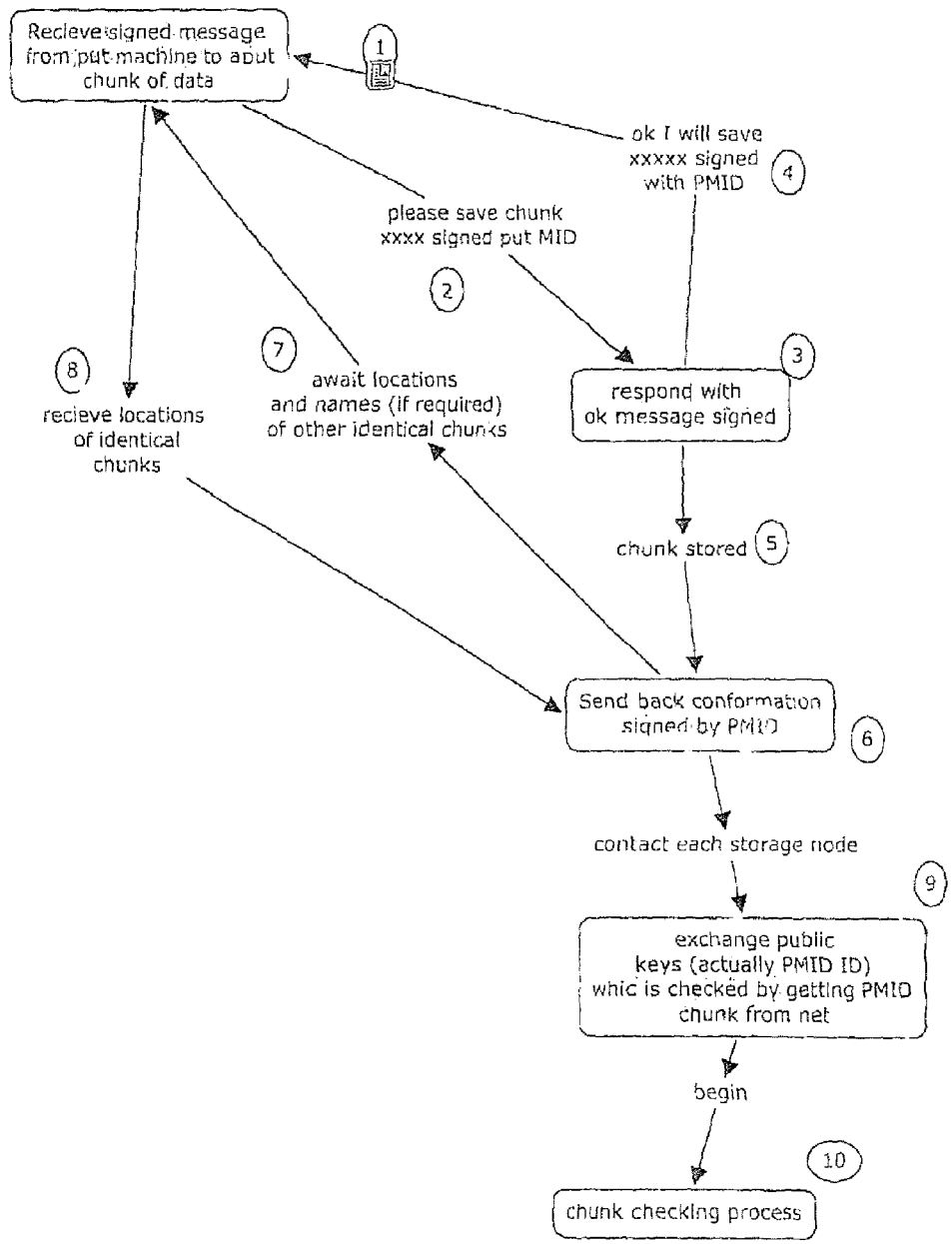
Figure 15 – Aput

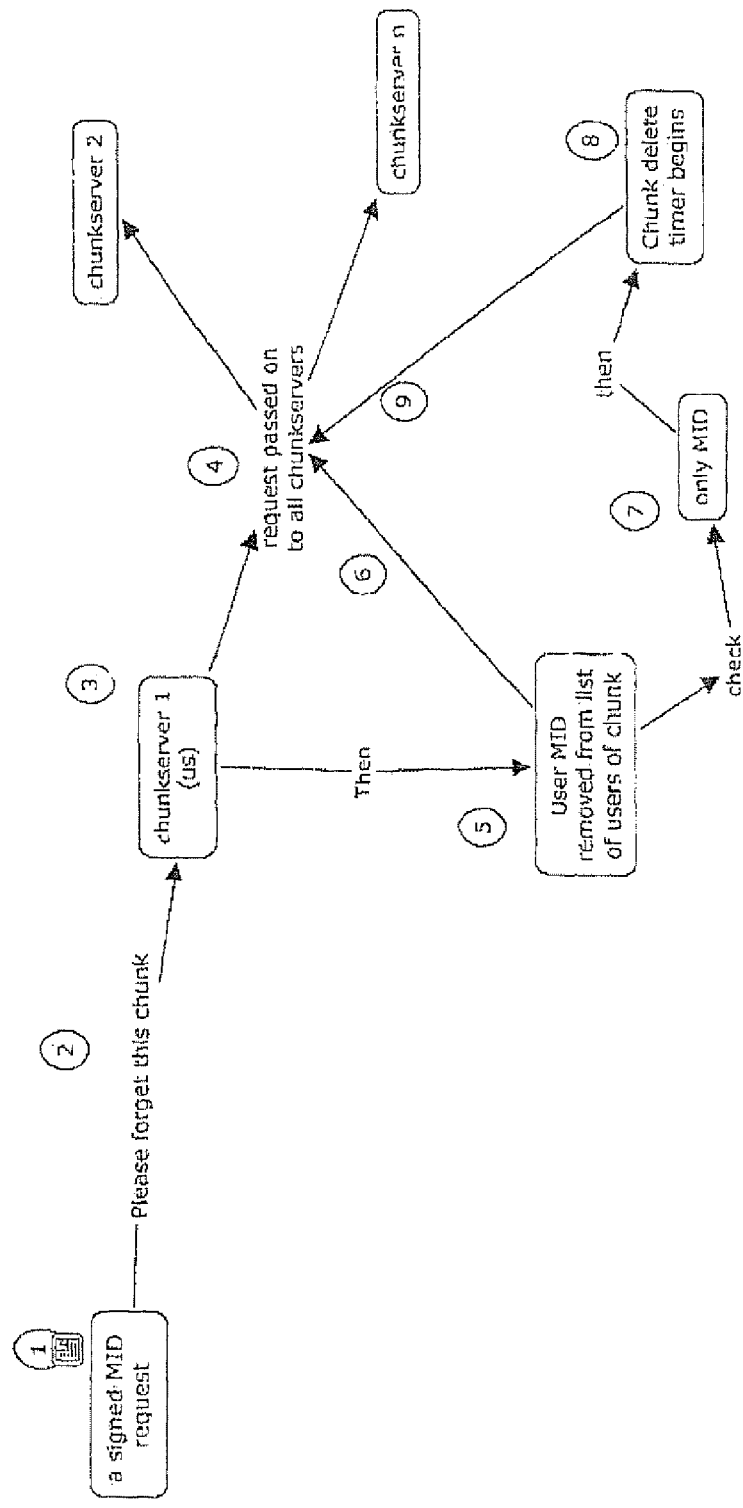
Figure 16 - Aforget

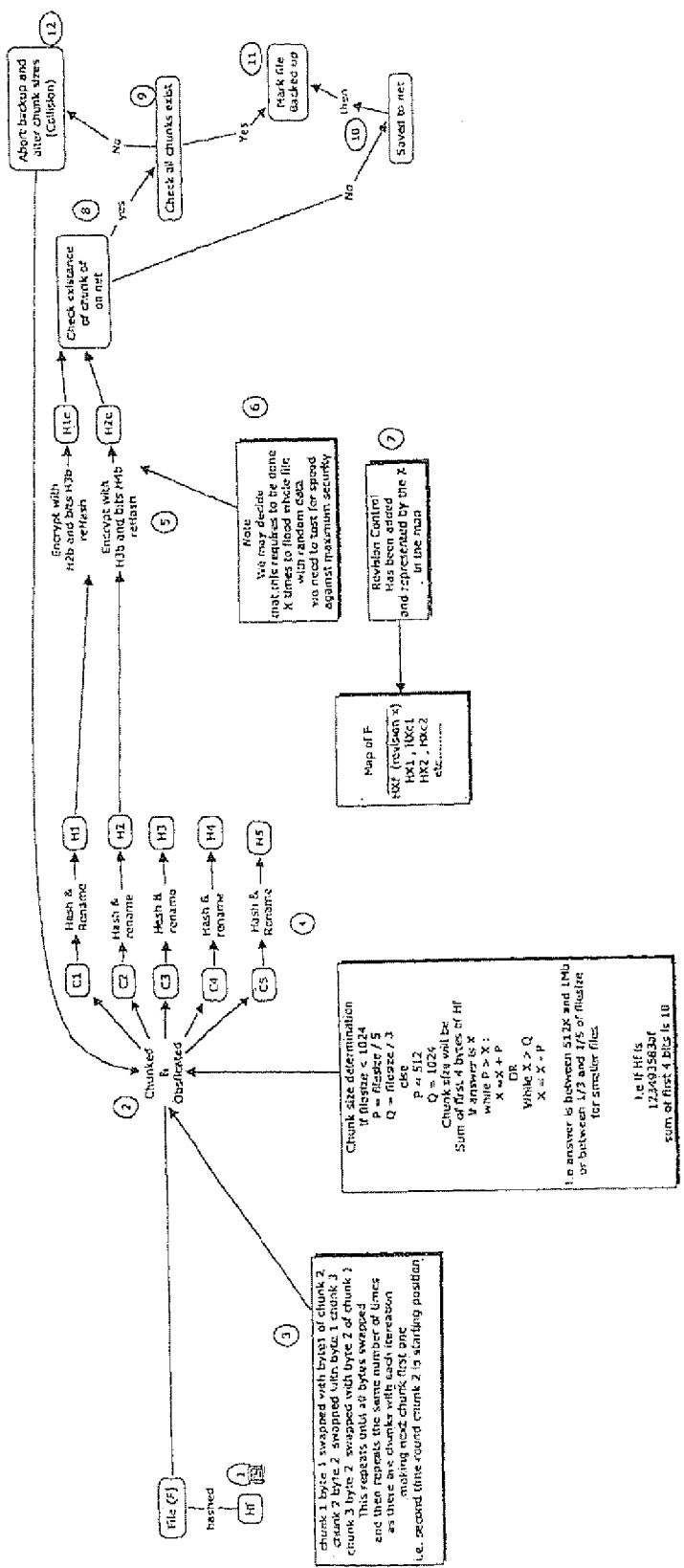
Figure 17 – Self Encrypting Files

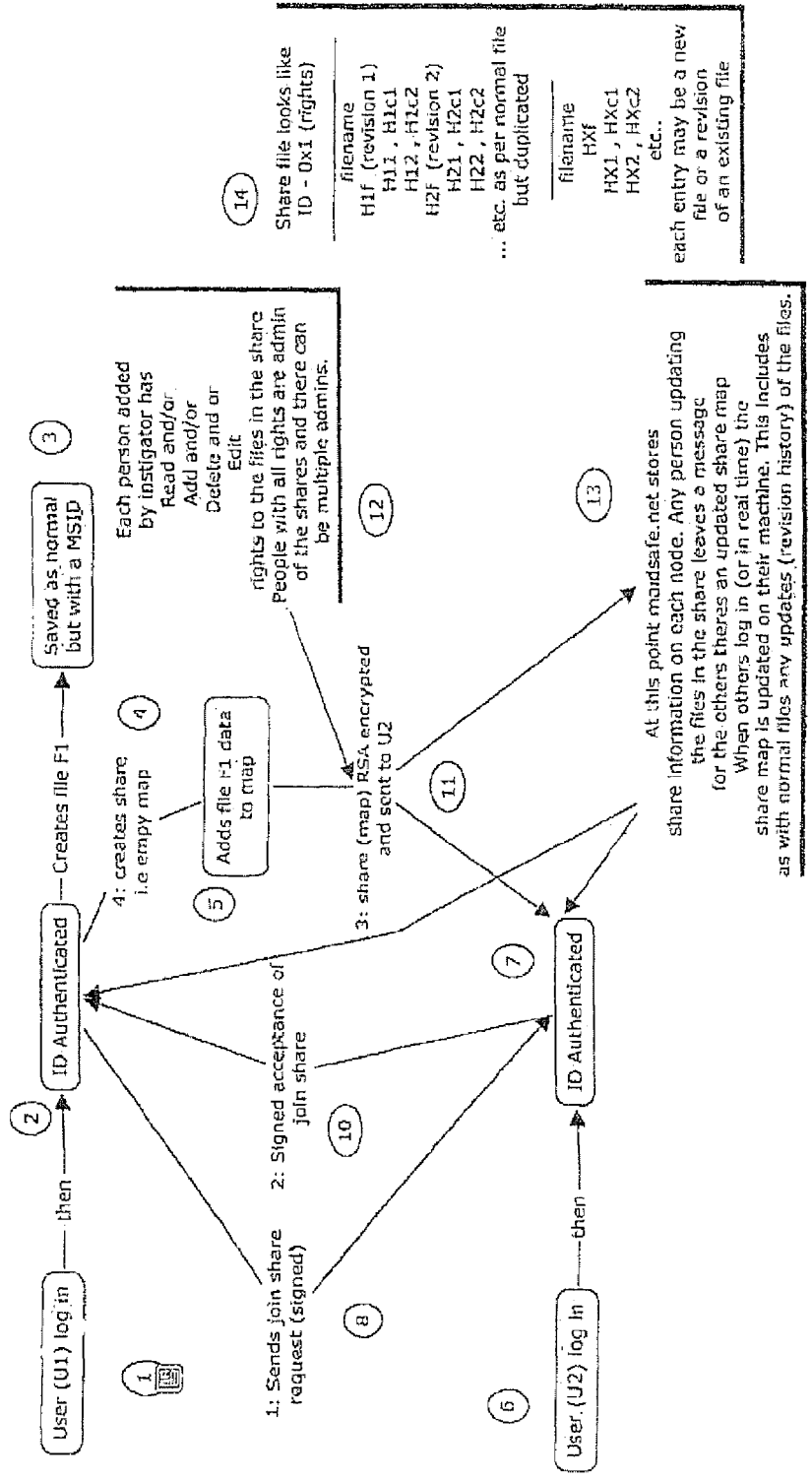
Figure 18 – Shared Access to Private Files

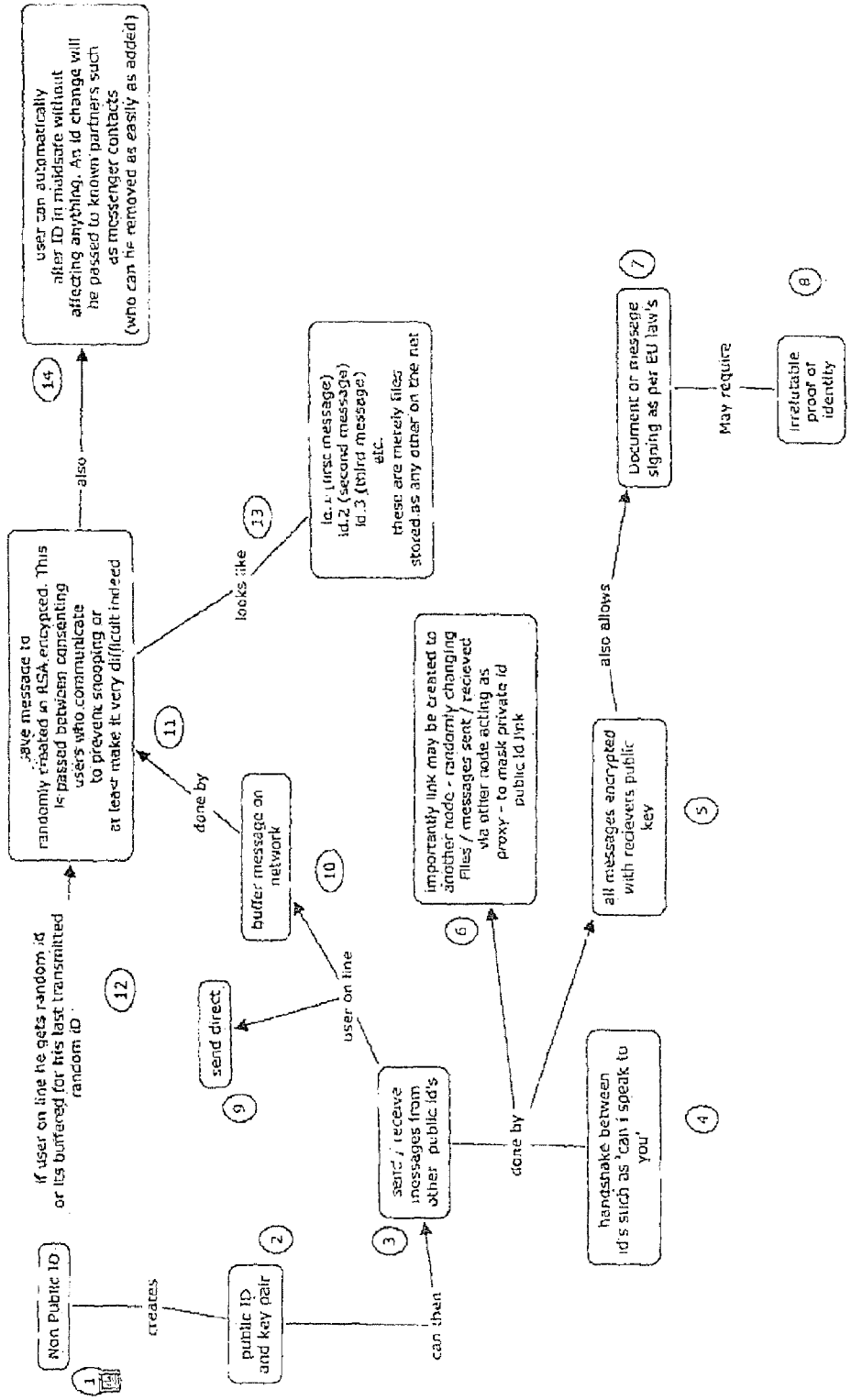

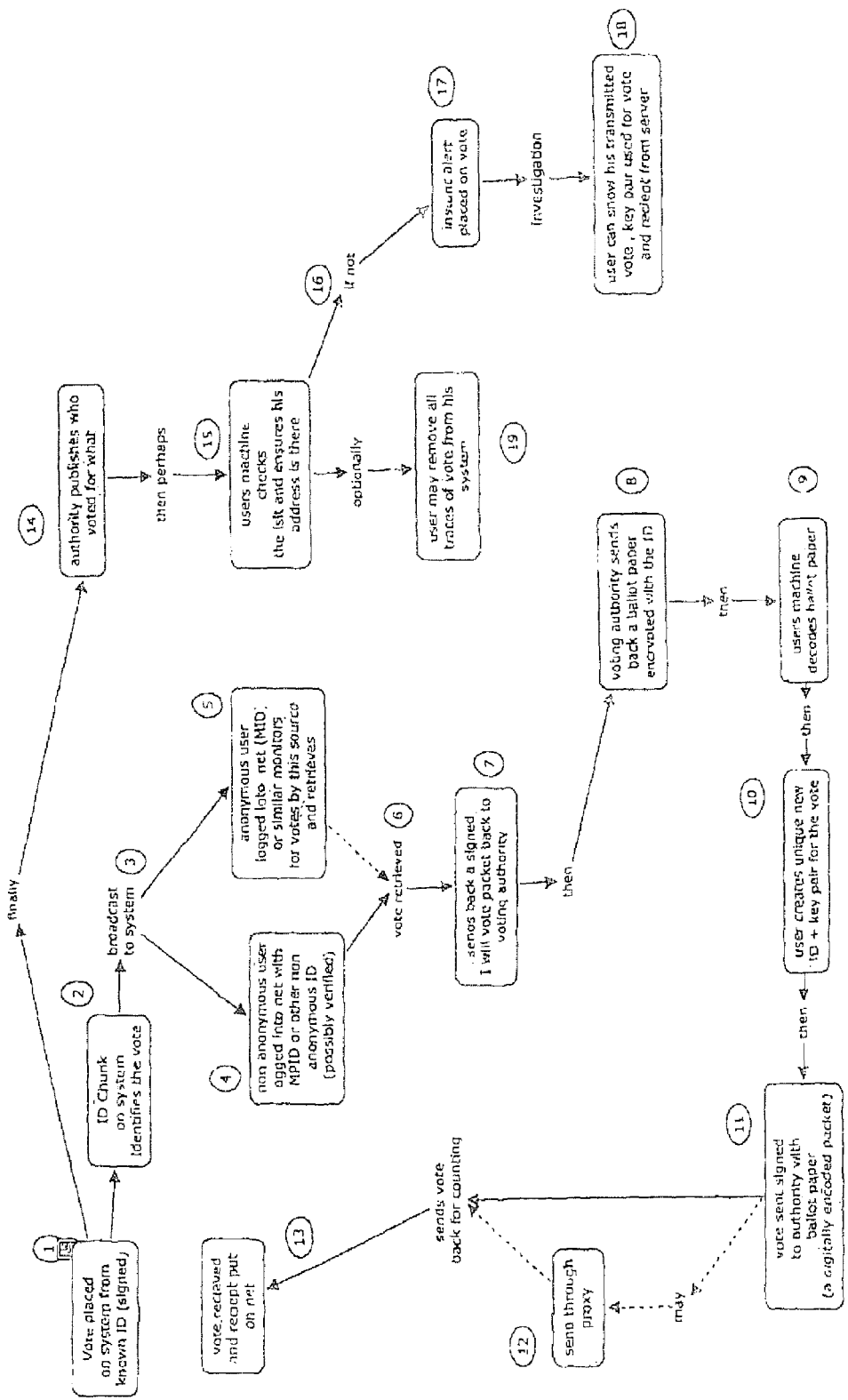
Figure 20 – Worldwide Voting

COMMUNICATION SYSTEM AND METHOD

CROSS REFERENCE TO RELATED APPLICATIONS

This application is a continuation of U.S. non-provisional patent application Ser. No. 13/362,384, filed Jan. 31, 2012, which is a continuation of U.S. non-provisional patent application Ser. No. 12/476,229, filed Jun. 1, 2009, abandoned, which is a continuation of International Application PCT/GB2007/004421 with an International Filing Date of Nov. 21, 2007, and claiming priority to Great Britain patent application GB0624053.5, filed in Dec. 1, 2006 and Great Britain patent application GB0709759.5, filed May 22, 2007, all of which are relied upon and incorporated herein by reference.

TECHNICAL FIELD

The present disclosure relates to communication systems, for example to communication systems in which data is encrypted and obfuscated by employing a method of self-encryption. Moreover, the present disclosure also concerns methods of communicating data within aforesaid communication systems, for example to methods of self-encrypting data for communication and/or storage within aforesaid communication systems. Furthermore, the present disclosure also relates to software products stored on non-transitory (non-transient) machine-readable data storage media, wherein the software products are executable upon computing hardware for implementing aforesaid methods.

BACKGROUND

Contemporary networks are characterized by a combination of vendor lock in, imposed vendor-based controls and a lack of standards; there is thus a need for an improved system and method which allow users to take charge of a new global communication network in a manner that will maintain effectiveness and promote the setting and attaining of common goals. Moreover, issues arise with contemporary communication networks regarding the security and privacy of data; there is thus a need for an improved system and method which allow for a secure private and free communication network to be provided, wherein users are able to enjoy an efficiently managed working environment that presents a guaranteed level of private and securely-protected activity. Such benefits are especially desirable when governmental surveillance services are known to eavesdrop to a major extent on users' data and data communications, for example in the contemporary Internet.

Moreover, many contemporary computer resources are underutilised to a great degree; for example, there is underutilization of disk space, data memory, data processing power and associated attached resources; such underutilization represents inefficiency and is also environmentally detrimental. There is thus a need for an improved system and method for improving utilization of these resources and for sharing them globally to people who purchase them or to people or organisations who are deemed appropriate to benefit from them, such as children in poorer countries, science laboratories, and so forth. Moreover, it is desirable that allocation from such resource pools, together with other resources, are decided by system users.

Digital data is often stored on hard disks of individual personal computers (PC's) which invariably have data memory and operational overhead restrictions. Storage of data on distributed systems such as the Internet is also possible, but requires specific data storage servers to be available. In addition to such physical systems, data management elements such as security, repair, encryption, authentication, anonymity and mapping and so forth are required to ensure successful data transactions and management of data via the Internet. Contemporary systems for messaging and voting exist, but they do not allow for either authentication on what was voted for, or on line anonymity. There have been some attempts as listed below, but none of these attempts operate in a manner of embodiments of the present disclosure.

Known self-healing techniques are divided broadly into two classes. One class pertains to a centralized control system that provides overall re-routing control from a central location of a network; in this approach, a re-routing algorithm is employed and establishing of alarm collection times becomes increasingly complex, as the number of failed channels increases in the network, and a substantial amount of time will be taken to collect alarm signals from the network and to transfer re-routing information should a large number of channels of a multiplexed transmission system fail. The other class pertains to a distributed approach in which re-routing functions are provided by distributed points of a given network.

Some attempts have been made to attain some limited aspects of self-encryption.

A range of limited methods for self-encryption have been developed.

No known systems and methods utilise self-encryption as per embodiments of the present disclosure, and are related to voice and data transmissions, or include hardware controllers or servers.

In contemporary systems, secure transactions are achieved through encryption technologies such as Secure Sockets Layer (SSL), Digital Certificates, and Public Key Encryption technologies. These systems address attacks by hackers through use of technologies such as Firewalls and Intrusion Detection systems. Associated merchant certification programs are designed to ensure a given merchant has adequate inbuilt security to assure reasonably that their consumer transactions will be secure. These systems also ensure that a given vendor will not incur a charge back by attempting to verify the consumer through secondary validation systems such as password protection and, eventually, Smart Card technology.

Network firewalls are typically based on packet filtering which is limited in principle, since rules that judge which packets to accept or reject are based on subjective decisions. Even VPNs (Virtual Private Networks) and other forms of data encryption, including digital signatures, are not really safe, because the information can be stolen before an encryption process is applied, as default programs are allowed to do whatever they like to other programs or to their data files or to critical files of an associated operating system.

There are currently several types of centralised file storage systems that are used in business environments. One such system is a server-tethered storage system that communicates with end users over a local area network (LAN). The end users send requests for storing and retrieving files over the LAN to a file server, which responds by controlling storage and/or retrieval operations to provide or store the requested files. While such a system works well for smaller networks, there is a potential bottleneck at an interface between the LAN and the file storage system.

Another type of centralised storage system is a storage area network, which is a shared, dedicated high-speed network for connecting storage resources to the servers. While the storage area networks are generally more flexible and scalable in terms of providing end user connectivity to different server-storage environments, the systems are also more complex. The systems require hardware, such as gateways, routers, switches, and are thus costly in terms of hardware and associated software acquisition. Yet another type of storage system is a network attached storage system in which one or more special-purpose servers handle file storage over the LAN.

Another known file storage system utilizes distributed storage resources resident on various nodes, or computers, operating on the system, rather than employing a dedicated centralised storage system. These are distributed systems, wherein clients communicate in a peer-to-peer manner to determine which storage resources to allocate to particular files, directories and so forth. These systems are organized as global file stores that are physically distributed over the computers on the system. A global file store is a monolithic file system that is indexed over the system as, for example, a hierarchical directory. The nodes in the systems use Byzantine agreements to manage file replications, which are used to promote file availability and/or reliability. The Byzantine agreements require rather lengthy exchanges of messages and thus are inefficient and even impractical for use in a system in which many modifications to files are anticipated.

Common e-mail communications of sensitive information is in plain text and is subject to being read by unauthorized code on a given sender's system, during transit and by unauthorized code on a corresponding receivers system. Where there is a high degree of confidentially required, a combination of hardware and software is beneficial for securing data. A high degree of security to a computer, or several computers, connected to the Internet or a LAN.

With regard to cash transfers, a truly anonymous purchase is one in which a given purchaser and a given seller are unknown to each other, wherein the purchase process is not witnessed by any other person or party, and the exchange medium is cash. Such transactions are not the norm. Even cash transactions in a place of business are typically witnessed by salespersons and other customers or bystanders, if not recorded on videotape as a routine security measure. Conversely, common transaction media such as payment by personal check or credit card represent a clear loss of anonymity, since the purchaser's identity as well as other personal information is attached to the transaction, for example driver's license number, address, telephone number, and any information attached to the name, credit card, or driver's license number. Thus, although a cash transaction is not a truly anonymous purchase, it provides a considerably higher degree of purchase anonymity than a transaction involving a personal check or credit card, and affords perhaps a highest degree of purchase anonymity which is contemporarily achievable. The use of cash, however, has limitations, especially in a context of electronic commerce.

SUMMARY

An object of the present disclosure is to provide an improved system for protecting data, which is more impervious to eavesdropping and more robust with regard to data storage.

A further object of the present disclosure is to provide an improved method of operating a system for protecting data, which is more impervious to eavesdropping and more robust with regard to data storage.

According to first aspect of the present disclosure, there is provided a system as claimed in appended claim 1: there is provided a system for protecting data, wherein the system includes a plurality of users, a plurality of data storage nodes and a data communication network linking the plurality of users to the plurality of data storage nodes, wherein the system is operable to store user data by:

(i) dividing the user data into a plurality of data chunks; and
(ii) applying encryption to the data chunks and/or obfuscating the data chunks by swapping data between the data chunks, thereby provided corresponding encrypted and/or obfuscated data chunks; and
(iii) storing the one or more encrypted and/or obfuscated data chunks at the plurality of data storage nodes, wherein locations of the plurality of data storage nodes, whereat the one or more encrypted and/or obfuscated data chunks are stored, are recorded in at least one data map.

The system is of advantage in that employing data chunks for representing the user data, wherein the data chunks are encrypted and/or obfuscated, makes it difficult for eavesdropping parties to obtain information regarding the user data from analyzing individual encrypted and/or obfuscated data chunks, namely without access to the at least one data map.

Optionally, in the system, at least one data map is stored in an encrypted form and available in at least one location in the plurality of data storage nodes.

Optionally, in the system, the data chunks are subject to an encryption process, followed by an obfuscation process, to generate corresponding encrypted and/or obfuscated data chunks, wherein the obfuscation process is implemented using a modulo division function and/or an XOR function. More optionally, in the system, the data chunks are compressed to generate compressed data chunks which are then subject to the aforementioned encryption process, followed by the aforementioned obfuscation process.

Optionally, in the system, the data communication network is configured to function as a peer-to-peer (P2P) network.

Optionally, in the system, the data storage nodes at the locations whereat the one or more encrypted and/or obfuscated data chunks are stored are operable to maintain multiple copies of their respective encrypted and/or obfuscated data chunks, and to regenerate from uncorrupted copies of the encrypted and/or obfuscated data chunks one or more replacement encrypted and/or obfuscated data chunks to replace any copy of the encrypted and/or obfuscated data chunks which have been corrupted.

Optionally, the system is operable to enable the plurality of users to access their respective user data, by retrieving at least one encrypted data map against a user ID, to decrypt the at least one data map to determine the locations whereat one or more encrypted and/or obfuscated data chunks are stored, to fetch the one or more encrypted and/or obfuscated data chunks from the locations, to decrypt and/or de-obfuscate the one or more encrypted and/or obfuscated data chunks to generate one or more corresponding decoded data chunks, and to assemble the one or more decoded data chunks to regenerate the user data.

Optionally, in the system, the user data corresponds to a currency value (cyber) which is authenticated by an authenticating arrangement of the system serving the users. More optionally, the system is operable to transfer ownership of the currency value from one given user to another, by way of registering a change of value ownership at the authenticating arrangement of the system. More optionally, the system is operable to enable the value to be traded to and/or from corresponding fiat currency, physical items and/or services.

Optionally, in the system, known information from the user data is used by the system as an encryption key for encrypting the data chunks and/or for encrypting the data map.

Optionally, the system is operable to encrypt each data chunk separately, and wherein, for each data chunk, known information from another chunk is data used as the encryption key.

Optionally, the system is operable to determine a hash value for the user data, and to use the determined hash value to determine at least one of: sizes of the data chunks, the number of data chunks corresponding to the user data.

Optionally, in the system, a symmetric encryption algorithm is employed to encrypt the data chunks and/or the at least one data map. Such symmetric encryption is beneficially used to obfuscate and produce pseudo-random data, for example for storage at data storage nodes. Moreover, such encryption additionally, or alternatively, renders it difficult for any eavesdropping parties to guess uncompressible output.

Optionally, the system is operable to swap data between the data chunks, wherein a byte of a first given chunk is swapped with a byte of a second chunk.

Optionally, the system is operable to determine a hash value of each data chunk and to rename the chunk using the determined hash value of the data chunk.

Optionally, the system is operable to store the encrypted and/or obfuscated data chunks on a distributed nodal network.

Optionally, the system is operable to determine if each encrypted and/or obfuscated data chunk already exists on the data communication network and, if each chunk of the data already exists, not storing the encrypted and/or obfuscated data chunk.

Optionally, the system is implemented as a voting system.

Optionally, in the system, the encrypted and/or obfuscated data chunks are generated by a first user and stored at the storage nodes, and the encrypted and/or obfuscated data chunks are decrypted and/or de-obfuscated by the second user, wherein the first and second users are mutually cooperating parties of a secure data, video and/or audio communication link.

Optionally, the system is operable to employ deterministic encryption that encrypts parts of files individually by chunking the data into determinable fixed-size data in a sliding window of several data chunks, wherein the deterministic encryption requires no input except the data of the files itself, and wherein the system provides in operation decryption that requires only the at least one data map produced (FIG. 2) for executing decryption of the encrypted data chunks.

Optionally, the system is operable to employ encryption keys when encrypting the data chunks and/or the data map, wherein the encryption keys are never reused.

Optionally, in the system, encryption keys that are used are at least as long as one or more messages in the user data to be encrypted.

Optionally, the system is operable to employ a finger printing algorithm to create pseudorandom data for use when encrypting the data chunks and/or the at least one data map. More optionally, in the system, the finger printing algorithm is implemented by hashing to generate the pseudorandom data.

Optionally, the system is operable to increase its security of the encrypted and/or obfuscated data chunks proportionately to a chosen hashing algorithm employed by the system. More optionally, in the system, the chosen hashing algorithm is a substantially perfect hashing algorithm, wherein the substantially perfect hashing algorithm approximates to a one time pad. However, it will be appreciated that a perfect one time pad may potentially not be technically feasible. In general, a "one time pad", as defined by Shannon, is defined by conditions:

(i) such pads cannot be reused;
(ii) such pads must be as long (for example, as expressed in bits or bytes) as a corresponding message to be encrypted; and
(iii) such pads must contain only random data.

Aforesaid conditions (i) to (iii) are very difficult, or potentially impossible, to achieve in practice, but an approximation thereto is feasible using contemporary computing resources.

Optionally, in the system, fingerprinting information from a given data chuck is harvested to transform mathematically other data chucks for the purpose of encrypting and/or obfuscating the other data chunks to generate corresponding encrypted and/or obfuscated data chunks for storage at the storage nodes.

Optionally, the system is additionally operable to filter the user data to generate corresponding metadata, and to make the corresponding metadata available for data mining processes associated with third parties. More optionally, the system is operable to filter the user data using a filter whose data filtering characteristics are controllable via one or more user-adjustable parameters.

According to a second aspect of the present disclosure, there is provided a method as claimed in appended claim 30: there is provided a method of protecting data, wherein the system includes a plurality of users, a plurality of data storage nodes and a data communication network linking the plurality of users to the plurality of data storage nodes, wherein the method includes storing user data by:

(i) dividing the user data into a plurality of data chunks; and
(ii) applying encryption to the data chunks and/or obfuscating the data chunks by swapping data between the data chunks, thereby provided corresponding encrypted and/or obfuscated data chunks; and
(iii) storing the one or more encrypted and/or obfuscated data chunks at the plurality of data storage nodes, wherein locations of the plurality of data storage nodes, whereat the one or more encrypted and/or obfuscated data chunks are stored, are recorded in at least one data map.

Optionally, the method includes storing at least one data map in encrypted form in at least one location on one or more data storage nodes.

Optionally, the method includes subjecting the data chunks to an encryption process, followed by an obfuscation process, to generate corresponding encrypted and/or obfuscated data chunks, wherein the obfuscation process is implemented using a modulo division function and/or an XOR function. More optionally, in the method, the data chunks are compressed to generate compressed data chunks which are then subject to the aforementioned encryption process, followed by the aforementioned obfuscation process; in other words a sequence of chunk→compress→encrypt→XOR→store is beneficially employed.

Optionally, in the method, the data communication network is configured to function as a peer-to-peer (P2P) network.

Optionally, in the method, the data storage nodes at the locations whereat the one or more encrypted and/or obfuscated data chunks are stored are operable to maintain multiple copies of their respective encrypted and/or obfuscated data chunks, and to regenerate from uncorrupted copies of the encrypted and/or obfuscated data chunks one or more replacement encrypted and/or obfuscated data chunks to replace any copy of the encrypted and/or obfuscated data chunks which have been corrupted.

Optionally, the method includes arranging for the system to enable the plurality of users to access their respective user data, by retrieving the at least one encrypted data map against a user ID, to decrypt the at least one data map to determine the locations whereat the one or more encrypted and/or obfuscated data chunks are stored, to fetch the one or more encrypted and/or obfuscated data chunks from the locations, to decrypt and/or de-obfuscate the one or more encrypted and/or obfuscated data chunks to generate one or more corresponding decoded data chunks, and to assemble the one or more decoded data chunks to regenerate the user data.

Optionally, in the method, the user data corresponds to a currency value (cyber) which is authenticated by an authenticating arrangement of the system serving the users.

Optionally, the method includes arranging for the system to transfer ownership of the currency value from one given user to another, by way of registering a change of value ownership at the authenticating arrangement of the system.

Optionally, the method includes arranging for the system to enable the value to be traded to and/or from corresponding fiat currency, physical items and/or services.

Optionally, in the method, known information from the user data is used by the system as an encryption key for encrypting the data chunks and/or for encrypting the data map.

Optionally, the method includes arranging for the system to encrypt each data chunk separately, and wherein, for each data chunk, known information from another chunk is data used as the encryption key.

Optionally, the method includes arranging for the system to determine a hash value for the user data, and to use the determined hash value to determine at least one of: sizes of the data chunks, the number of data chunks corresponding to the user data.

Optionally, in the method, a symmetric encryption algorithm is employed to encrypt the data chunks and/or the at least one data map.

Optionally, the method includes arranging for the system to swap data between the data chunks, wherein a byte of a first given chunk is swapped with a byte of a second chunk.

Optionally, the method includes arranging for the system to determine a hash value of each data chunk and to rename the chunk using the determined hash value of the data chunk.

Optionally, the method includes arranging for the system to store the encrypted and/or obfuscated data chunks on a distributed nodal network.

Optionally, the method includes arranging for the system to determine if each encrypted and/or obfuscated data chunk already exists on the data communication network and, if each chunk of the data already exists, not storing the encrypted and/or obfuscated data chunk.

Optionally, the method includes implementing the system as a voting system.

Optionally, in the method, the encrypted and/or obfuscated data chunks are generated by a first user and stored at the storage nodes, and the encrypted and/or obfuscated data chunks are decrypted and/or de-obfuscated by the second user, wherein the first and second users are mutually cooperating parties of a secure data, video and/or audio communication link.

Optionally, the method includes arranging for the system to employ deterministic encryption that encrypts parts of files individually by chunking the data into determinable fixed-size data in a sliding window of several data chunks, wherein the deterministic encryption requires no input except the data of the files itself, and wherein the system provides in operation decryption that requires at least one data map to be produced (FIG. 2) for executing decryption of the encrypted data chunks.

Optionally, the method includes arranging for the system to employ encryption keys when encrypting the data chunks and/or the data map, wherein the encryption keys are never reused.

Optionally, in the method, encryption keys that are used are at least as long as one or more messages in the user data to be encrypted.

Optionally, the method includes arranging for the system to employ a finger printing algorithm to create pseudorandom data for use when encrypting the data chunks and/or the at least one data map. More optionally, in the method, the finger printing algorithm is implemented by hashing to generate the pseudorandom data.

Optionally, the method includes arranging for the system to increase its security of the encrypted and/or obfuscated data chunks proportionately to a chosen hashing algorithm employed by the system. More optionally, in the method, the chosen hashing algorithm is a substantially perfect hashing algorithm, wherein the substantially perfect hashing algorithm approximates to a one time pad. However, it will be appreciated that a perfect one time pad may potentially not be technically feasible. However, it will be appreciated that a perfect one time pad may potentially not be technically feasible. In general, a "one time pad", as defined by Shannon, is defined by conditions:

(i) such pads cannot be reused;
(ii) such pads must be as long (for example, as expressed in bits or bytes) as a corresponding message to be encrypted; and
(iii) such pads must contain only random data.

Aforesaid conditions (i) to (iii) are very difficult, or potentially impossible, to achieve in practice, but an approximation thereto is feasible using contemporary computing resources.

Optionally, the method includes harvesting fingerprinting information from a given data chuck to transform mathematically other data chucks for purpose of encrypting and/or obfuscating the other data chunks to generate corresponding encrypted and/or obfuscated data chunks for storage at the storage nodes.

Optionally, the method includes arranging for the system to be additionally operable to filter the user data to generate corresponding metadata, and to make the corresponding metadata available for data mining processes associated with third parties. More optionally, the method includes arranging for the system to filter the user data using a filter whose data filtering characteristics are controllable via one or more user-adjustable parameters.

According to a third aspect of the present disclosure, there is provided a software product recorded on non-transitory (non-transient) machine-readable data storage media, characterized in that the software product is executable upon computing hardware for executing a method pursuant to the second aspect of the present disclosure.

It will be appreciated that features of the invention are susceptible to being combined in various combinations without departing from the scope of the invention as defined by the appended claims.

BRIEF DESCRIPTION OF THE SEVERAL VIEWS OF THE DRAWINGS

Embodiments of the present disclosure will now be described, by way of example only, with reference to the accompanying drawings in which:

FIG. 1b is a diagram of perpetual data elements of the system of FIG. 1a;

FIG. 1c is a diagram of self encryption elements of the system of FIG. 1a;

FIG. 1*i* is a diagram of voting system elements of the system of FIG. 1*a*;

FIG. 2 is a flow chart of the self authentication process for the system of FIG. 1*a*;

FIG. 3 is a diagram of peer to peer interaction for the system of FIG. 1*a*;

FIG. 4 is a flow chart of the authentication process for the system of FIG. 1*a*;

FIG. 5 is a flow chart of the data assurance event for the system of FIG. 1*a*;

FIG. 6 is a flow chart of the chunking event for the system of FIG. 1*a*;

FIG. 7 is an example of chunking performed by the system of FIG. 1*a*;

FIG. 8 is a flow chart of the self healing event for the system of FIG. 1*a*;

FIG. 9 is a flow chart of the peer ranking event for the system of FIG. 1*a*;

FIG. 10 is a flow chart of the duplicate removal event for the system of FIG. 1*a*;

FIG. 11 is a flow chart for storing perpetual data performed by the system of FIG. 1*a*;

FIG. 12 is a diagram of a chunk checking process performed by the system of FIG. 1*a*;

FIG. 13 is a flow chart of the storage of additional chunks for the system of FIG. 1*a*;

FIG. 14 is a flow chart of the self healing process for the system of FIG. 1*a*;

FIG. 15 is a flow chart of saving data for the system of FIG. 1*a*;

FIG. 16 is a flow chart of deleting data for the system of FIG. 1*a*;

FIG. 17 is a flow chart of a self encryption process of the system of FIG. 1*a*;

FIG. 18 is a flow chart of a shared access process of the system of FIG. 1*a*;

FIG. 19 is a flow chart of a messenger application for the system of FIG. 1*a*; and FIG. 20 is a flow chart of a voting application for the system of FIG. 1*a*.

DETAILED DESCRIPTION

Figure 1A:
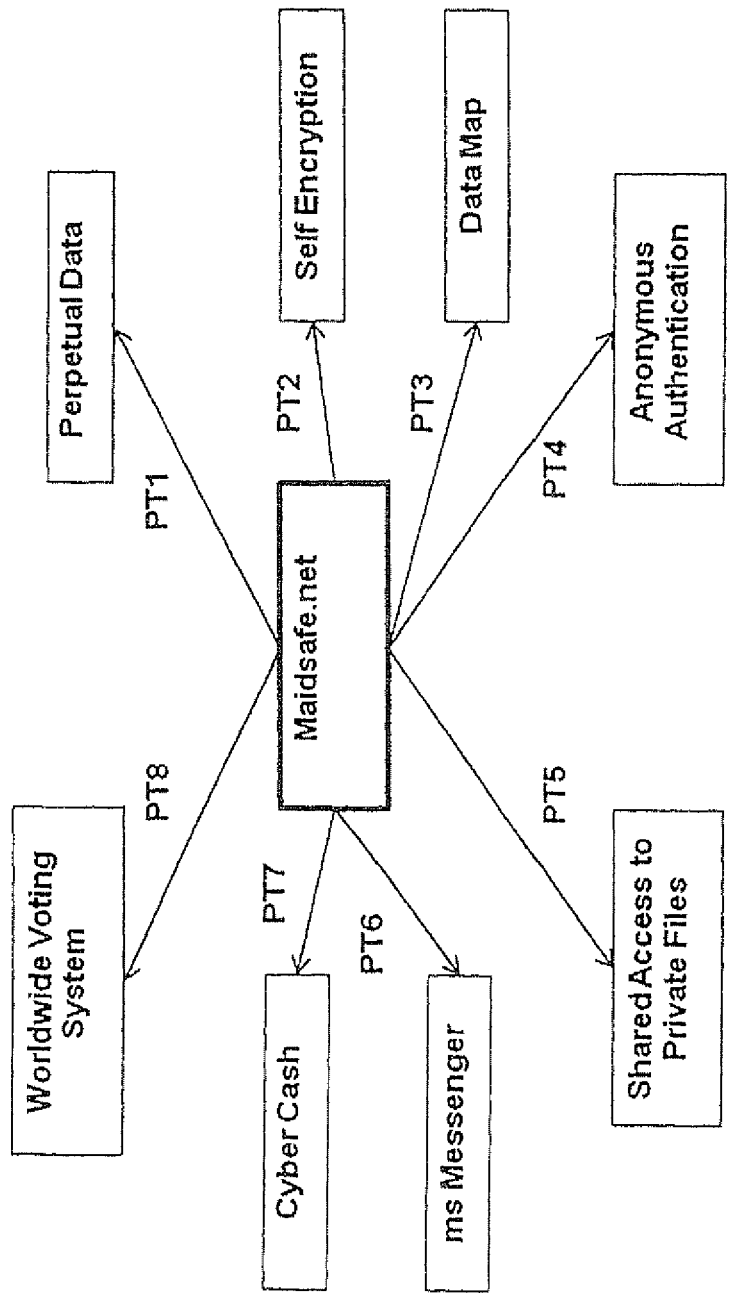
FIG. 1a is a system diagram according to an embodiment of the disclosure.

Embodiments of the present disclosure will now be described, wherein reference is made to identifications (IDs) as provided in Table 5 when describing the embodiments.

TABLE 5

ID references used for describing embodiments

| ID reference | Detail |
|---|---|
| MID | This is a base ID and is mainly used to store and forget files. Each of these operations requires a signed request. Restoring simply requires a request with an ID attached. |
| PMID | This is the proxy MID which is used to manage receipt of instructions to a given node from any network node such as get/put/forget, and so forth. This proxy MID is a key pair which is stored on the given node; if stolen, the key pair can be regenerated by simply disabling the thief's stolen PMID, although there is not much that can be done with a PMID key pair. |
| CID | Chunk Identifier, which is simply a chunkid.KID message on a data communication network, for example Internet or www. |
| TMID | This is today's ID, namely a one time ID as opposed to a one time password. Its purpose is to disguise further users and also ensure that their MID stays as secret as possible. |
| MPID | This is a public ID. This is the ID to which users allocate their own name and actual data if required. This is the ID for messaging via a messenger, for sharing, for non-anonymous voting and for any other method that requires that the user is known. |
| MAID | This is basically a hash of ad actual public key of the MID, wherein this ID is used to identify user-actions such as put/forget/get implemented on the network. This allows a distributed PKI infrastructure to exist and to be automatically checked. |
| KID | Kademlia ID: this can be randomly generated or derived from known and preferably anonymous information, such as an anonymous public key hash as with the aforesaid MAID. In this case, it is feasible to use Kademlia as an example overlay network, although this can be almost any type of network in practice. |
| MSID | Share ID, namely an ID and key pair specifically created for each share to allow users to interact with shares using a unique key which is not related to their MID, which should always be anonymous and separate. |

Anonymous authentication employed in embodiments of the present disclosure relates to a system authentication and, in particular, authentication of users for accessing resources stored on a distributed or peer-to-peer (P2P) file system. Moreover, such anonymous authentication has an aim to preserve the anonymity of the users and to provide secure and private storage of data and shared resources for users on a distributed data communication system. There is therefore provided a method of authenticating access to a distributed system comprising steps of:

(i) receiving a user identifier;
(ii) retrieving an encrypted validation record identified by the user identifier;

(iii) decrypting the encrypted validation record, so as to provide corresponding decrypted information; and (iv) authenticating access to data in the distributed system using the decrypted information.

Receiving, retrieving and authenticating activities in the steps (i), (ii) and (iv) are optionally performed on a node in the distributed system, preferably separate from a node performing the step of decrypting in the step (iii). The method further comprises a step of:

(v) generating the user identifier using a hash.

Therefore, the user identifier may be considered unique, and optionally altered if a coincidental collision of identical generation of user identities occurs, and suitable for identifying unique validation records. The step of authenticating access may preferably further comprise a step of digitally signing the user identifier. This provides authentication that can be validated against trusted authorities. The method further optionally comprises a step of using the signed user identifier as a session passport to authenticate a plurality of accesses to the distributed system. This allows persistence of the authentication for an extended session.

The step of decrypting preferably comprises decrypting an address in the distributed system of a first chunk of data and the step of authenticating access further comprises a step of determining the existence of the first chunk at the address, or providing the location and names of specific data elements in the network in the form of a data map as previously describe. This efficiently combines tasks of authentication and starting to retrieve the data from the system. The method optionally further comprises a step of using the content of the first chunk to obtain further chunks from the distributed system. Additionally, the decrypted data from the additional chunks optionally contain a key pair allowing the user at that stage to sign a packet sent to the network for packet-validation purposes, e them additionally is optionally employed to self-sign their own identification (ID).

Therefore, embodiments of the present disclosure provide an advantage that there is no need to have a potentially vulnerable record of a file structure persisting in one place on the distributed system, as the user's node constructs its database of file locations after logging onto the system. Moreover, this allows for a higher degree of data security and/or user anonymity.

In respect of embodiments of the present disclosure, there is provided a distributed system comprising:

(a) a storage module which is operable, namely adapted, to store an encrypted validation record;

(b) a client node comprising a decryption module which is operable, namely adapted, to decrypt an encrypted validation record so as to provide decrypted information; and (c) a verifying node comprising:

(i) a receiving module which is operable, namely adapted, to receive a user identifier;

(ii) a retrieving module which is operable, namely adapted, to retrieve from the storage module an encrypted validation record identified by the user identifier;

(iii) a transmitting module which is operable, namely adapted, to transmit the encrypted validation record to the client node; and (iv) an authentication module which is operable, namely adapted, to authenticate access to data in the distributed file system using the decrypted information from the client node.

The client node is further operable, namely adapted, to generate the user identifier using a hash. The authentication module is further adapted to authenticate access by digitally signing the user identifier. The signed user identifier is used as a session passport to authenticate a plurality of accesses by the client node to the distributed system. The decryption module is further operable, namely adapted, to decrypt an address in the distributed system of a first chunk of data from the validation record and the authentication module is further adapted to authenticate access by determining the existence of the first chunk at the address. The client node is further operable, namely, adapted to use the content of the first chunk to obtain further authentication chunks from the distributed system.

There is provided at least one computer program, namely at least one software product, comprising program instructions for causing computing hardware, for example at least one computer, to perform the aforementioned method employed in embodiments of the present disclosure. At least one computer program is embodied on a recording medium or read-only memory, stored in at least one computer memory, and/or carried on an electrical carrier signal. Optionally, the at least one computer program is stored on non-transitory (non-transient) machine-readable data storage media.

Additionally, there is optionally performed a check on the system to ensure that the user is logged into, namely "login", a valid node, implemented, for example, by executing a software product package. This check on the system optionally includes an ability of the system to check validity of running d.net software by running content hashing or preferably certificate checking of the node and also the software code itself.

Figure 1B:
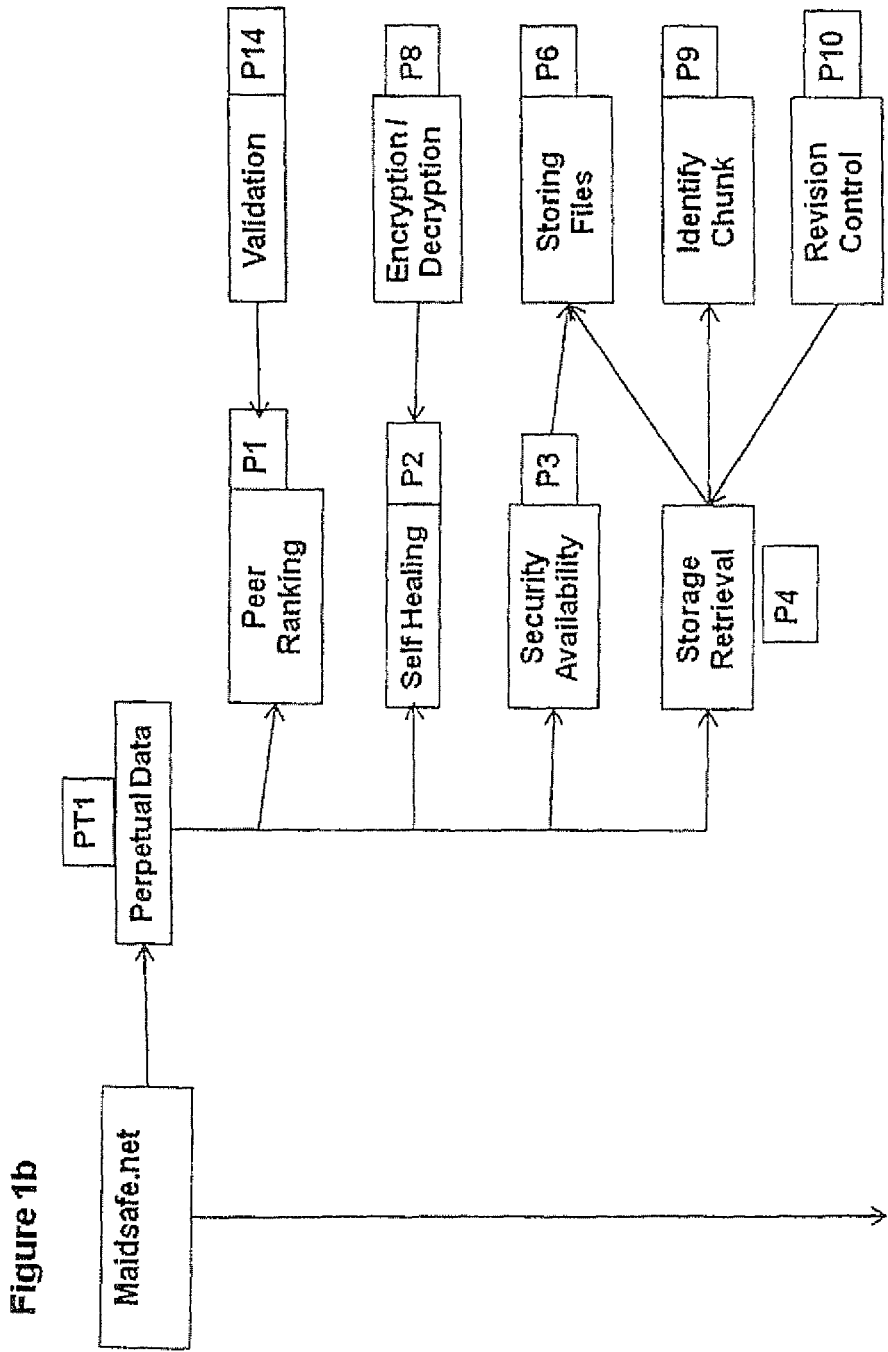
Figure 1C:
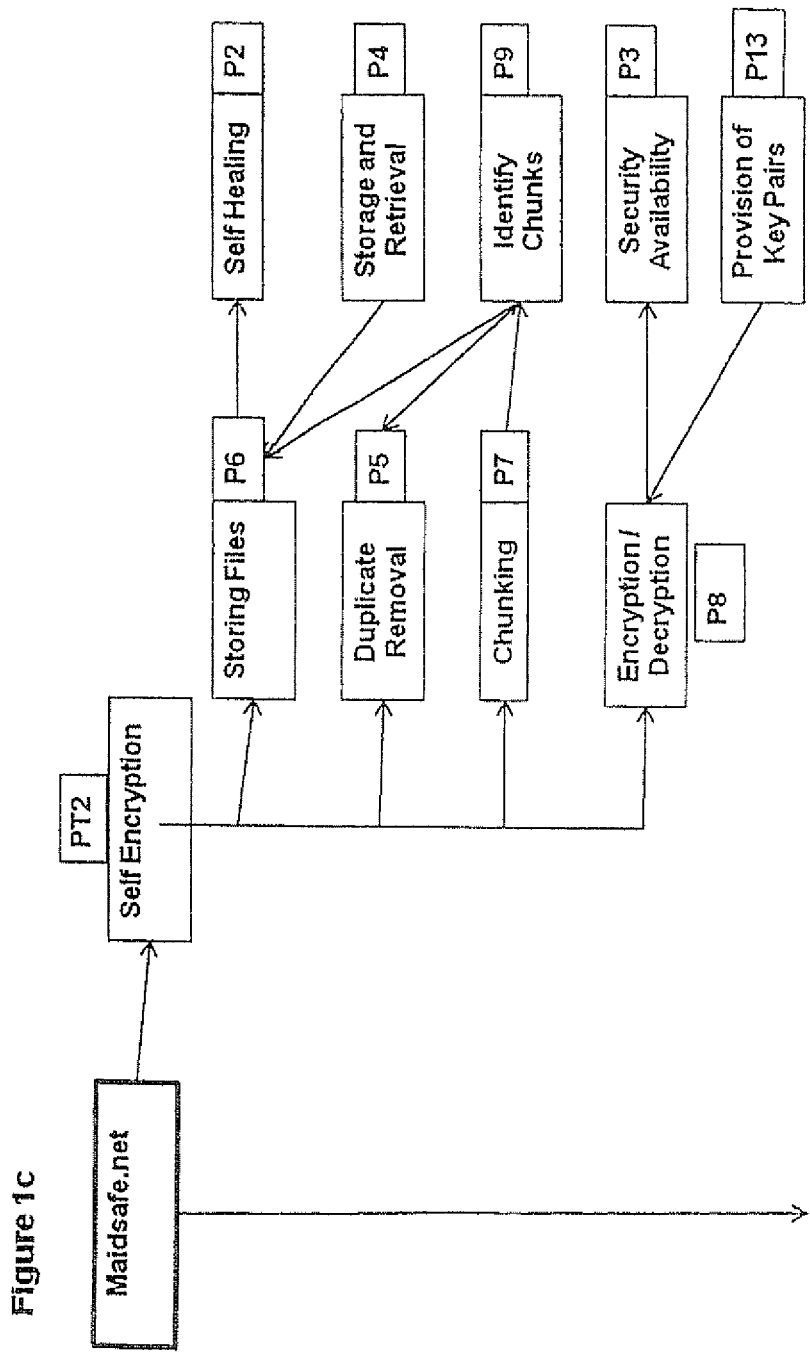
Figure 1D:
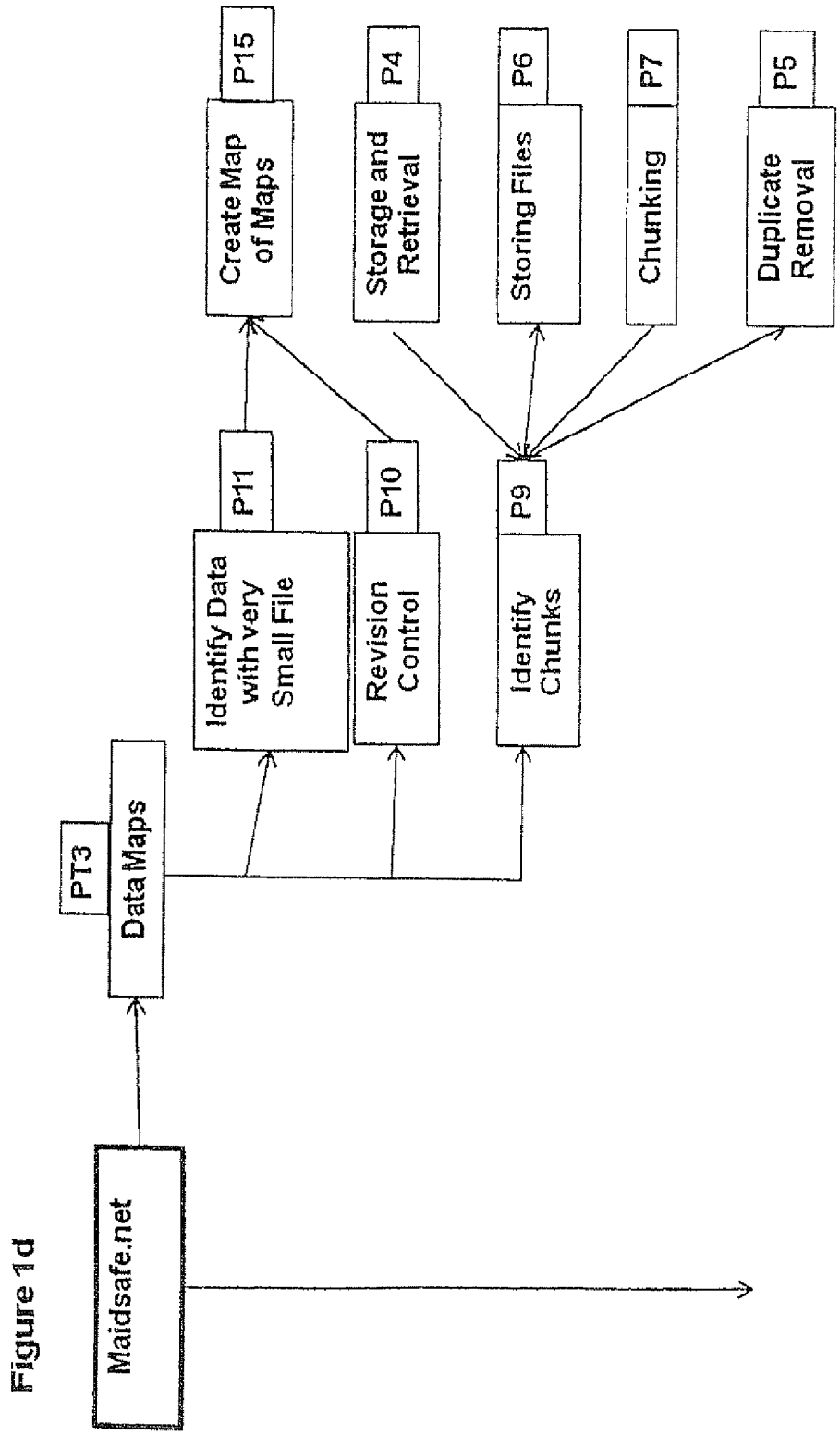
FIG. 1*d* is a diagram of datamap elements of the system of FIG. 1*a*.
Figure 1E:
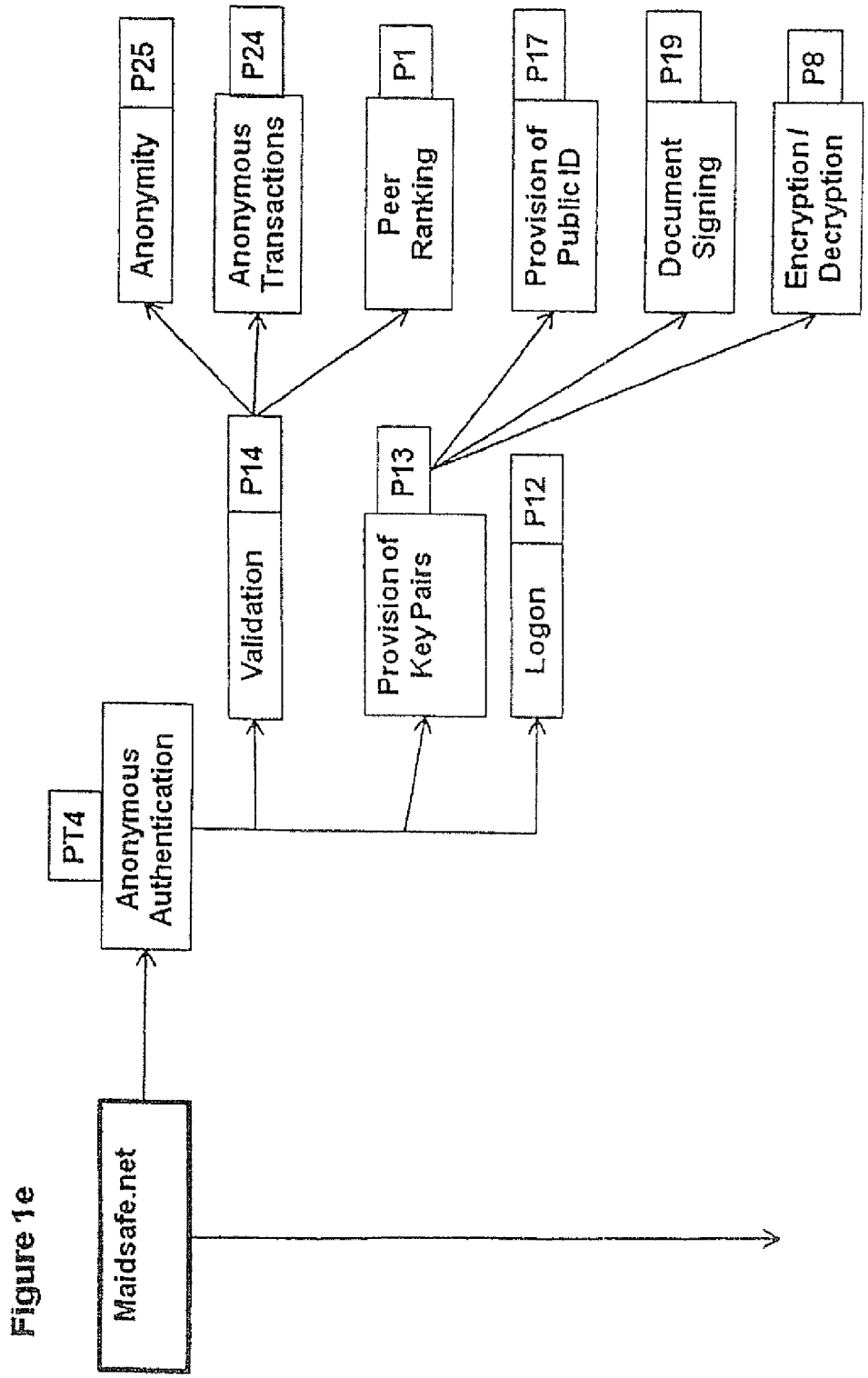
FIG. 1*e* is a diagram of anonymous authentication elements of the system of FIG. 1*a*.
Figure 1F:
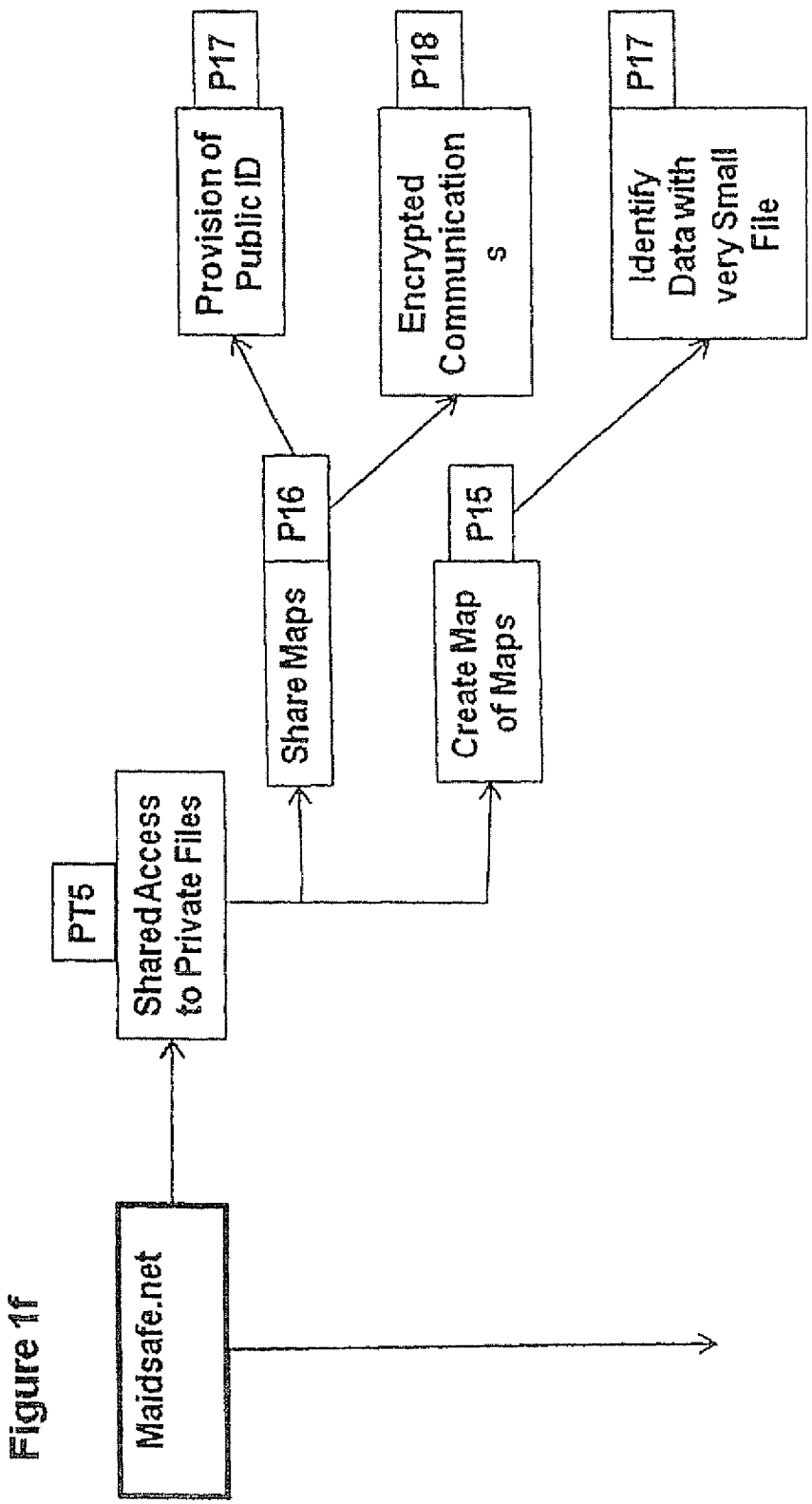
FIG. 1*f* is a diagram of shared access elements of the system of FIG. 1*a*.
Figure 1G:
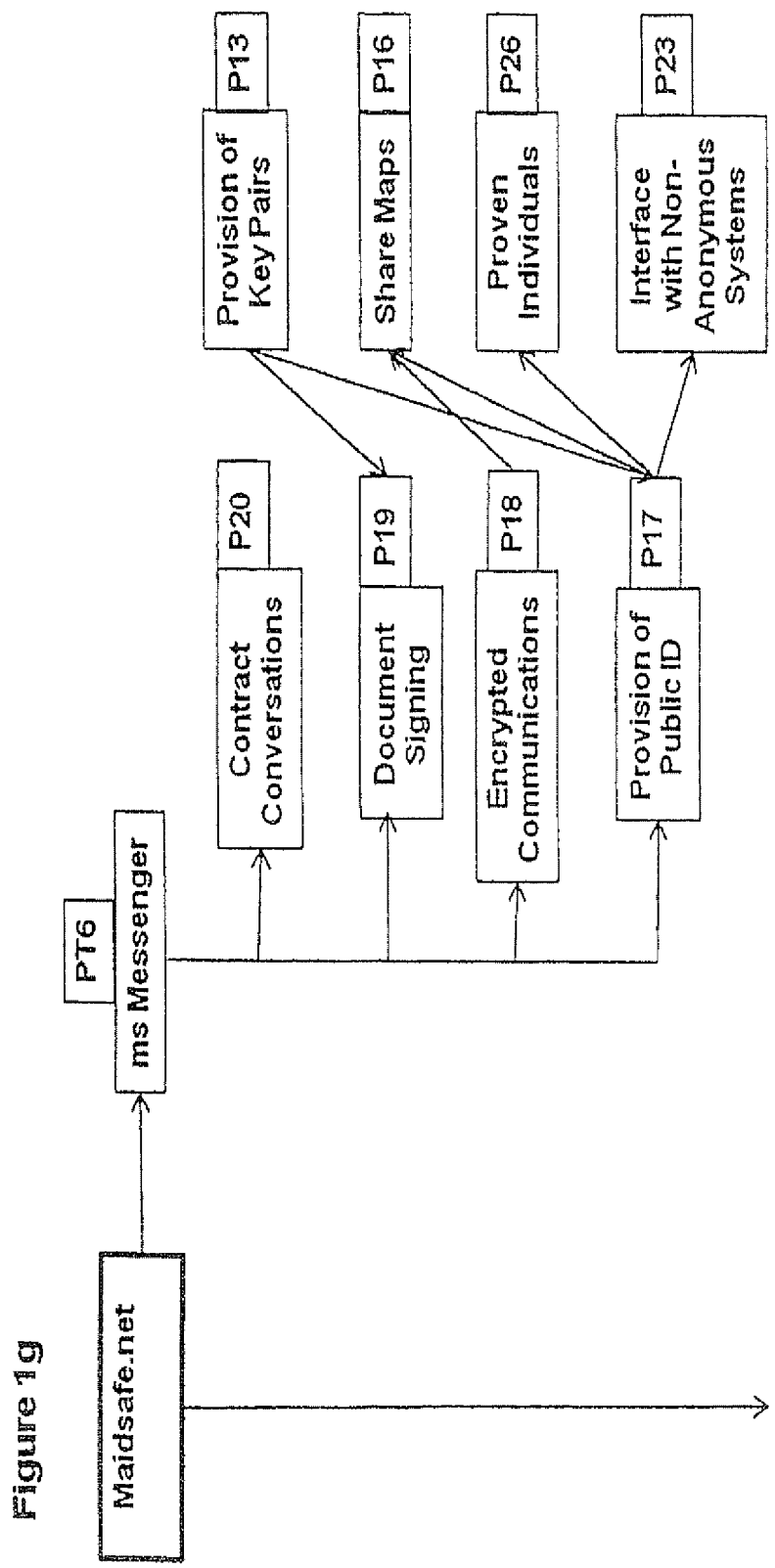
FIG. 1*g* is a diagram of messenger elements of the system of FIG. 1*a*.
Figure 1H:
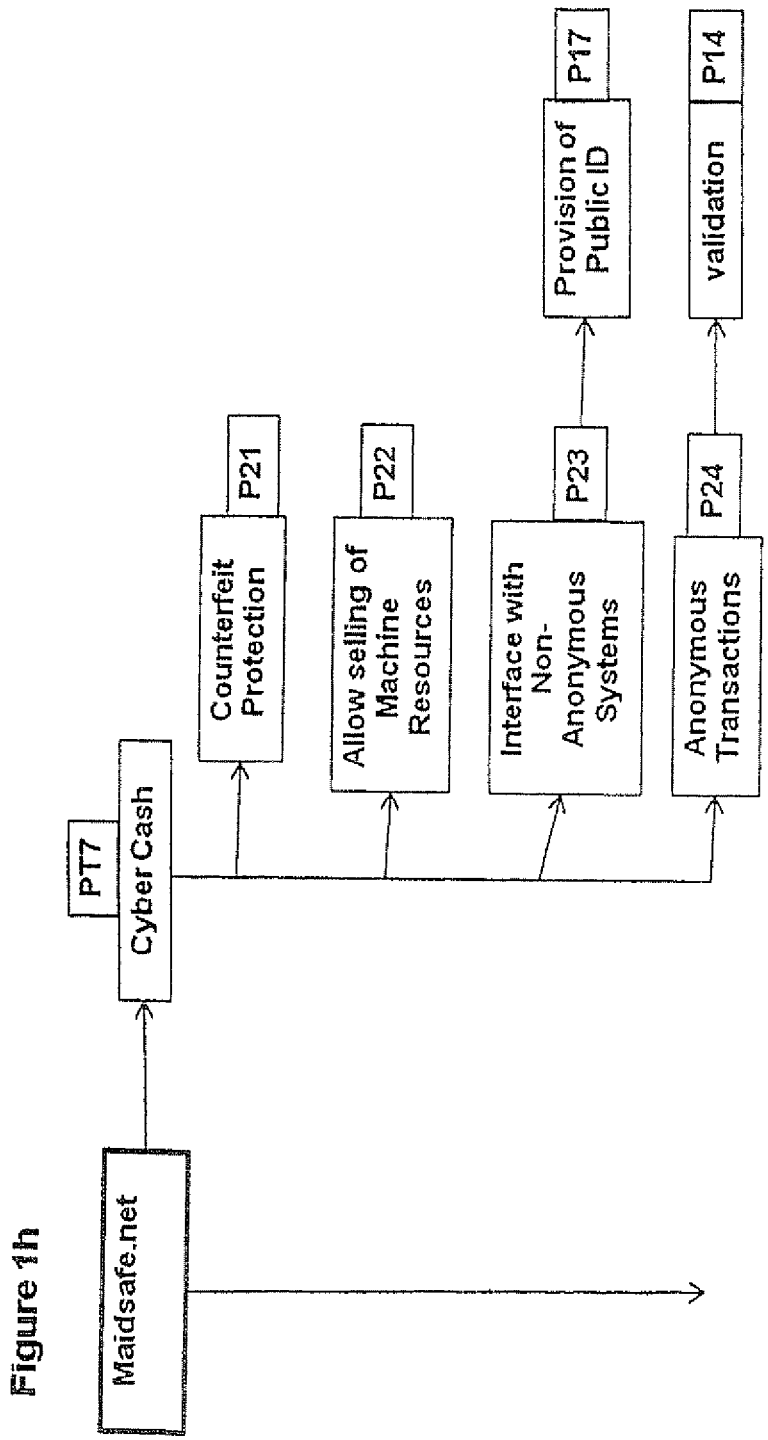
FIG. 1*h* is a diagram of cyber cash elements of the system of FIG. 1*a*.

The private communication software is operable to provide a very secure and distributed data communication and storage system, which is in contradistinction to the contemporary Internet which allows for eavesdropping by governmental spying institutions, and which allows for user-stored data potentially to be rendered non-confidential by data mining activities undertaken by third parties. An example implementation of such a secure and distributed data communication and storage system employs a plurality of innovative elements; linked elements for the private communication system are shown in FIG. 1. In FIG. 1, the communication system includes eight elements PTx, as provided in Table 6, which includes twenty eight interlinked functional elements Py, as provided in Table 7.

TABLE 6

Elements of the communication system

| Element PTx | Detail |
| --- | --- |
| PT1 | Perpetual Data |
| PT2 | Self encryption |
| PT3 | Data Maps |
| PT4 | Anonymous Authentication |
| PT5 | Shared access to Private files |
| PT6 | ms Messenger |
| PT7 | Cyber Cash |
| PT8 | Worldwide Voting System |

TABLE 7

Interlinked functional elements of the communication system

| Functional element Py | Detail |
| --- | --- |
| P1 | Peer Ranking |
| P2 | Self Healing |
| P3 | Security Availability |
| P4 | Storage and Retrieval |
| P5 | Duplicate Removal |

TABLE 7-continued

Interlinked functional elements of the communication system

| Functional element Py | Detail |
|---|---|
| P6 | Storing Files |
| P7 | Chunking |
| P8 | Encryption/Decryption |
| P9 | Identify Chunks |
| P10 | Revision Control |
| P11 | Identify Data with Very Small File |
| P12 | Logon |
| P13 | Provide Key Pairs |
| P14 | Validation |
| P15 | Create Map of Maps |
| P16 | Share Map |
| P17 | Provide Public ID |
| P18 | Encrypted Communications |
| P19 | Document Signing |
| P20 | Contract conversations |
| P21 | Counterfeit Prevention |
| P22 | Allow Selling of Machine Resources |
| P23 | Interface with Non-Anonymous Systems |
| P24 | Anonymous Transactions |
| P25 | Anonymity |
| P26 | Proven Individual |
| P27 | Validation of Vote Being Used |
| P28 | |

Use of the communication system for distributed controlled voting will next be described. Such a controlled voting system requires self-authentication functionality which will not be described in greater detail, with reference to FIG. 2. In FIG. 2, a computer program product is denoted by 1, and consists of a user interface and a chuck server, namely a sub-system for processing in an anonymous manner chunks of data; the computer program product is optionally continuously running on computing hardware, or is executed by way of a user selecting an icon or similar on a user-present graphical interface. Moreover, as denoted by 2, a user is able to input some data known to them such as a user id, beneficially a random ID, and a personal identity number (PIN) in this example case. These pieces of information, namely the user id and the PIN, may be concatenated together and hashed to create a unique identifier; the unique identify is optionally confirmed via a search in one or more databases to avoid coincidental duplication, as aforementioned. In this example case this is called the MID (communication network ID), as provided in aforementioned Table 5.

Furthermore, as denoted by 3, a TMID, namely today's MID, is retrieved from the communication network, the TMID is then calculated as will be described next The TMID is a single use or single day ID that is constantly changed. This allows the communication system to calculate a hash value based on the user ID pin and another known variable which is calculable. For this known variable, it is convenient, for example, to use a day variable which is the number of days since a beginning of an epoch, for example Jan. 1, 1970. This allows for a new ID daily, which assists in maintaining the anonymity of the user. This TMID will create a temporary key pair to sign database chunks and accept a challenge response from one of more holders of these database chunks. After retrieval and generation of a new key pair, the database is put again in new locations-rendering everything that was contained in the TMID chunk useless. The TMID cannot be signed by anyone, therefore hackers and similar cannot ban an unsigned user from retrieving data chunks corresponding to this; for example in a DOS attack, it is a special chunk where the data hash does not match the name of the chunk, as the name is a random number calculated by hashing other information, namely it is a hash of the TMID as described below:

An example sequence of events in the communication system is as follows:

(i) take "dave" as user ID and "1267" as the PIN;
(ii) combine user ID+PIN, namely dave+1267=dave1267, and then hash this to generate the MID;
(iii) compute the day variable, for example today is the 13416$^{th}$ day since the aforesaid epoch=13416;
(iv) thereafter take the PIN, and, for example, add in the number where the pin states, namely 613dav41e1267, wherein "6" is at beginning and is going around the PIN again;
(v) so this is done by taking 1$^{st}$ PIN 1, so put first day value at position 1,
then next PIN number 2, so that day value 2 is at position 2,
then next PIN number 6 so that day value 3 is at position 6,
then next PIN number 7 so that day value 4 is at position 7,
then next PIN number is 1, so that day value 5 is at position 1, again,
so the TMID is a hash of 613dav41e1267 and the MID is simply a hash of dave 1267.

It will be appreciated that (i) to (v) is merely an example algorithm and many other types of algorithms are alternatively or additional employed to enforce security to a further degree.

As denoted by 4 in FIG. 2, from the TMID chunk, a map of the users database, or one or more lists of files maps, is identified. The database is recovered from a data communication network supporting operation of the communication system, which includes the data maps for the user and any keys passwords, and so forth. The database chunks are stored in another location immediately and the old chunks forgotten. This can be done now as the MID key pair is also in the database and can now be used to manipulate the users data.

As denoted by 5 in FIG. 2, the communication system computer program product or application, can now authenticate itself as acting for this MID and put, get or forget data chunks belonging to the user, as appropriate.

As denoted by 6 in FIG. 2, a watcher process and Chunk server always have access to the PMID key pair as they are stored on the user's computing hardware, namely the user's machine, itself, so the computing hardware can start, receive and authenticate anonymous put/get/forget commands. Moreover, as denoted by 7 in FIG. 2, a DHT ID is required for a node in a DHT network; the DHT ID is optionally randomly generated, or alternatively, it is feasible to use the hash of the PMID public key to identify the node.

As denoted by 8 in FIG. 2, pertaining MAID, the user is successfully logged into the communication system, he/she is able to check whether or not his/her authentication validation records exist on the network of the system. These validation records may be as follows:

(i) 1: This is a data element stored on the network of the system, and preferably named with the hash of the MID public Key;
(ii) 2: It contains the MID public key+any PMID public keys associated with this user;
(iii) 3: This is digitally signed with the MID private key to prevent forgery; and
(iv) 4: Using this mechanism, there is thereby allowed validation of MID signatures by allowing any users access to this data element and checking the signature of it against any challenge response from any node pertaining to be this MID, as only the MID owner has the private key that signs this MID. Any adversary or unauthorized party could not create a private key that matches the public key to enable a valid digital signature, so forgery is made impossible given contemporarily available computer resources;

(v) 5: This mechanism also allows a user to add or remove PMIDS, or chunk servers acting on their behalf like a proxy), at will and replace PMID's at any time in case of the PMID machine becoming compromised. Therefore, this can be regarded as being the PMID authentication element.

There will next be described PMID (Proxy MID):

(i) 1: This is a data element stored on the network and preferably named with the hash of the PMID public key;

(ii) 2: It contains the PMID public key and the MID ID, namely the hash of the MID public key, and is signed by the MID private key, namely is authenticated;

(iii) 3: This allows a machine to act as a repository for anonymous chunks and supply resources to the net for a MID;

(iv) 4: When answering challenge responses, any other machine will confirm the PMID by seeking and checking the MAID for the PMID, and by making sure that the PMID is mentioned in the MAID data element, otherwise the PMID is considered invalid;

(v) 5: The key pair is stored on the machine itself, and may be encoded or encrypted against a password that has to be entered upon start-up, optionally, in the case of a proxy provider who wishes to further enhance PMID security; and (vi) 6: The design allows for recovery from attack and theft of the PMID key pair as the MAID data element can simply remove the PMID ID from the MAID rendering it unauthenticated.

In FIG. 3, an illustration is provided, in schematic form, of a peer-to-peer (P2P) network in accordance with an embodiment of the present disclosure. In FIG. 4, there is provided an illustration of a flow chart of the authentication, in accordance with a preferred embodiment of the present disclosure.

With reference to FIG. 3, a peer-to-peer network 2 is shown with data nodes 4 to 12 connected by a data communication network 14. The data nodes 4 to 12 may be Personal Computers (PCs) or any other computing hardwire and/or hardwired logic device that can perform the processing, communication and/or storage operations required to operate the embodiments of the present disclosure. There is employed a file system which typically has many more data nodes of all types than shown in FIG. 3; moreover, a PC may act as one or many types of data node described herein. The data nodes 4 and 6 store chunks 16 of files in the data communication network 14. A validation record node 8 has a storage module 18 for storing encrypted validation records identified by a user identifier.

A client node 10 has a module 20 for input of, and generation of, user identifiers. It also has a decryption module 22 for decrypting an encrypted validation record, so as to provide decrypted information, a database or data map of chunk locations 24 and storage 26 for retrieved chunks and files assembled from the retrieved chunks.

A verifying node 12 has a receiving module 28 for receiving a user identifier from the client node 10. A retrieving module 30 is configured to retrieve from the data node an encrypted validation record identified by the user identifier. Alternatively, in the preferred embodiment, the validation record node 8 is the same node as the verifying node 12, namely the storage module 18 is part of the verifying node 12 (not as shown in FIG. 3). A transmitting module 32 is operable to send the encrypted validation record to the client node 10. An authentication module 34 authenticates access to chunks of data distributed across the data nodes 8 to 12 using the decrypted information.

With reference to FIG. 4, a more detailed flow of the operation of an embodiment of the present disclosure is shown laid out on the diagram with steps being performed at the User's PC, namely client node 10, on a left side 40, those of the verifying PC, namely the verifying node 12, in a centre 42 and those of the data PC (node) on the right 44.

A login box 46 is presented, that requires the user's name or other detail, for example an e-mail address, namely the same one used in the client node software installation and registration process, or simply a name, for example a nickname, and the user's unique number, preferably the user's PIN number. If the user is a "main user", then some details may already be stored on the PC. If the user is a visitor, then the login box appears for the visitor to enter appropriate details.

A content hashed number such as SHA (Secure Hash Algorithm), optionally beneficially 160 bits in length, is created in 48 from these two items of data, namely user name and PIN number. This 'hash' is now known as the 'User ID Key' (MID), which at this point is classed as "unverified" within the communication system. This is stored on the network of the communication system as the MAID and is simply the hash of the public key containing an unencrypted version of the public key for later validation by any other node. This obviates a requirement for a validation authority The software on the users PC then combines this MID with a standard "hello" code element 50, to create a 'hello.packet' as denoted by 52. This "hello.packet" is then transmitted with a timed validity on the Internet, for example in a situation where the communication system is implemented via use of the Internet.

The hello.packet will be picked up by the first node (for this description, now referring as being the "verifying node"), that recognises, as denoted by 54, the User ID Key element of the hello.packet as matching a stored, encrypted validation record file, denoted by 56, that it has in its storage area. A login attempt monitoring system optionally ensures a maximum of three responses. Upon too many attempts, the verifying PC creates a "black list" for transmission to peers. Optionally, an alert is returned to the user if a 'black list' entry is found and the user may be asked to proceed or perform a virus check.

The verifying node then returns this encrypted validation record file to the user via the data communication network, for example the Internet. A users pass phrase denoted by 58 is requested by a dialog box 60, which then will allow decryption of this validation record file.

When the validation record file is decrypted, as denoted by 62, the first data chunk details, including a "decrypted address", are extracted, as denoted by 64, and the user PC sends back a request, as denoted by 66, to the verifying node for it to initiate a query for the first "file-chunk ID" at the 'decrypted address' that it has extracted from the decrypted validation record file, or preferably the data map of the database chunks to recreate the database and provide access to the key pair associated with this MID. The verifying node then acts as a 'relay node' and initiates a "notify only" query for this "file-chunk ID" at the "decrypted address".

Given that some other node, for this embodiment, referred to as being the "data node", has recognised, as denoted by 68, this request and has sent back a valid "notification only" message 70 that a "file-chunk ID" corresponding to the request sent by the verifying node does indeed exist, the verifying node then digitally signs, as denoted by 72, the initial User ID Key, which is then sent back to the user. On reception by the user, as denoted by 74, this verified User ID Key is used as the user's session passport. The user's PC proceeds to construct, as denoted by 76, the database of the file system as backed up by the user onto the network of the communication system. This file system, namely database, describes the location of all chunks that make up the user's file system. Preferably, the ID Key contains irrefutable evidence, such as a public/private key pair, to allow signing onto the network as authorised users; preferably, this is a case of self signing his/her own ID—in which case the ID Key is decrypted and the user is valid-self validating.

Furthermore, details of the embodiment will now be described in greater detail. A "proxy-controlled" handshake routine is employed through an encrypted point-to-point channel, to ensure only authorised access by the legal owner to the communication system, then to the users file storage database, then to the files therein. The handshaking check is initiated from the PC onto which the user logs, namely the "user PC", by generating the "unverified encrypted hash" known as the "User ID Key", this preferably being created from the user's information, preferably e-mail address and their PIN number. This "hash" is transmitted as a "hello-.packet" on the Internet, to be picked up by any system that recognises the User ID as being associated with specific data that it holds. This PC then becomes the "verifying PC" and will initially act as the User PC's "gateway" into the communication system during the authentication process. The encrypted item of data held by the verifying PC will temporarily be used as a "validation record", it being directly associated with the user's identity and holding the specific address of a number of data chunks belonging to the user and which are located elsewhere in the peer-to-peer (P2P) distributed file communication system. This "validation record" is returned to the User PC for decryption, with the expectation that only the legal user can supply the specific information that will allow its accurate decryption. Preferably, this data may be a signed response being given back to the validating node which is possible as the ID chunk when decrypted, preferably symmetrically, contains the user's public and private keys allowing non refutable signing of data packets. Preferably, after successful decryption of the TMID packet, as described above, the machine will now have access to the data map of the database and public/private key pair allowing unfettered access to the system.

It should be noted that, in this embodiment, preferably no communication is carried out via any nodes without an encrypted channel such as TLS, namely Transport Layer Security, or SSL, namely Secure Sockets Layer, being firstly being set up. In a communication system in accordance with the present disclosure, a peer talks to another peer via an encrypted channel and the other peer, namely proxy, requests the information, for example for some space to save information on or for the retrieval of a file. An encrypted link is formed between all peers at each end of communications and also through the proxy during the authentication process. This effectively bans snoopers from detecting who is talking to whom and also what is being sent or retrieved. The initial handshake for self authentication is also over an encrypted link. Such security is effective at preventing, for example, governmental authorities eavesdropping on the user's data and communications, even when considerable computing resources are employed to implement such eavesdropping.

Secure connection is provided via certificate passing nodes, in a manner that does not require intervention, with each node being validated by another, where any invalid event or data, for whatever reason, for example fraud detection, snooping from node or any invalid algorithms that catch the node, will invalidate the chain created by the node. This is all transparent to the user, who merely experiences a highly secure and reliable data communication data communication and data storage service provided by the present communication system.

Further modifications and improvements may be added to the communication system and its methods of operation, without departing from the scope of the disclosure herein described.

In FIG. 5, there is provided an illustration of a flow chart of a data assurance event sequence in accordance with first embodiment of this present disclosure.

In FIG. 6, there is provided an illustration a flow chart of a file chunking event sequence in accordance with second embodiment of this present disclosure.

In FIG. 7, there is provided an illustration of a schematic diagram of a file chunking example, pursuant to the present disclosure.

In FIG. 8, there is provided an illustration of a flow chart of self healing event sequence, as employed in embodiments of the present disclosure.

In FIG. 9, there is provided an illustration of a flow chart of peer ranking event sequence, as employed in embodiments of the present disclosure.

In FIG. 10, there is provided an illustration of a flow chart of duplicate removal event sequence, as employed in embodiments of the present disclosure.

With reference to FIG. 5, guaranteed accessibility to user data by data assurance is demonstrated by the flow chart. The user data is copied to at least three disparate locations at a step, denoted by 10. The disparate locations store data with an appendix pointing to the other two locations by a step, denoted by 20, and is renamed with a hash of contents. Preferably, such an action is managed by another node, namely a super node acting as an intermediary by a step, as denoted by 30.

Each local copy at users PC is checked for validity by integrity test by a step, denoted by 40, and in addition validity checks by performing one or more integrity tests, are made that the other two copies are also still OK by step, denoted by 50.

Any single node failure initiates a replacement copy of equivalent leaf node being made in another disparate location by a step, denoted by 60, and the other remaining copies are updated to reflect this change to reflect the newly added replacement leaf node by a step, denoted by 70.

The steps of storing and retrieving are beneficially carried out via other network nodes to mask the initiator, namely the super node, as in the step 30.

The method further comprises a step of renaming all files with a hash of their contents; such an approach increases obfuscation of data within the communication system, from a perspective of any eavesdropping third parties. Therefore, each file can be checked for validity or tampering by running a content hashing algorithm such as, for example, MD5 or an SHA variant, the result of this being compared with the name of the file.

With reference to FIG. 6, there is provided a methodology to achieve manageable sized data elements and to enable a complimentary data structure for compression and encryption, wherein the methodology employs a step of file chunking. By users pre-selection, the nominated data elements, namely files, are passed to undergo a chunking process. Each data element, namely, is split into smaller chunks by a step, denoted by 80, and the data chunks are encrypted by a step, denoted by 90, to provide an enhanced degree of security for the data chunks. The data chunks are stored locally at step, denoted by 100, ready for performing network transfer of copies within the communication system. The person, namely user, or the group, to whom the overall data belongs, may, alternatively may not, know the location of these data chunks, in the step 100, or the other related but dissimilar chunks of data in the step 100, or the other related but dissimilar chunks of data. All operations are conducted within the users local system. No data is presented externally, which represents a fundamentally different approach to convention data communication and storage, for example in a known contemporary "cloud computing" system which is highly susceptible to eavesdropping and snooping by governmental organisations and third parties performing data mining of user data.

Each of the aforementioned data chunks does not contain location information for any other dissimilar data chunks. This provides for, security of data content, a basis for integrity checking and redundancy.

The method further comprises a step of only allowing the person, namely the user, or group to whom the data belongs, to have access to it, preferably via a shared encryption technique. This allows persistence of the data within the madisafe.net system.

The checking of data or chunks of data between machines in the communication system is carried out via any presence-type protocol such as a distributed hash table network.

In an event that all data chunks have been relocated, for example when the user has not logged on for a while, a redirection record is created and stored in a super node network of the communication system, for example a three copy process-similar to data, therefore when a user requests a check, the redirection record is given to the user to update their database. This efficiently allows data resilience in cases where a network churn of the communication system is a problem, as in peer to peer or distributed networks.

With reference to FIG. 7, there is an illustration of an example of flow chart of a method of file chunking. The User's normal file has, for example, a 5 Mbyte document, which is chunked into smaller variable sized data chunks, for example 135 kbyte, 512 kbyte, 768 kbyte in any order. All data chunks may be compressed and encrypted by using a pass phrase. In a next step, the method involves individually hashing data chunks and given hashes as names for the hashed data chunks. Then, a database record as a file is made from names of the hashed data chunks brought together, for example in an empty version of the original file (C1########,t1,t2,t3: C2########,t1,t2,t3, and so forth); this file is then sent to a transmission queue in a storage space allocated to the client, namely user, application.

Referring next to FIG. 8, there is provided a self-healing event sequence methodology. Such self healing is required to guarantee availability of accurate data within the communication system. As data or data chunks become invalid by failing integrity test by a step, denoted by 110, the location of failing data chunks is assessed as unreliable and further data from the leaf node is ignored from that location by a step, denoted by 120. A 'Good Copy' from a 'known good' data chunk is recreated in a new and equivalent leaf node. Data or data chunks are recreated in a new and safer location by a step, denoted by 130. The leaf node with failing data chunks is marked as unreliable, and the data therein as "dirty" by a step, denoted by 140. Peer leaf nodes become aware of this unreliable leaf node and add its location to watch list by a step, denoted by 150. All operations associated with the steps in FIG. 8 are conducted within the users local system, for example on his/her PC. Beneficially, no data is presented externally, thereby maintaining a high degree of security and anonymity, for example to unauthorized surveillance by governmental authorities. Therefore, the introduction of viruses, worms, spy-bots, and so forth, will be prevented and faulty machines/equipment identified automatically in the communication system. Beneficially, the network of the communication system optionally uses SSL- or TLS-type encryption to prevent unauthorized access or snooping.

Referring next to FIG. 9, Peer Ranking ID is required to ensure consistent response and performance for a level of guaranteed interaction recorded for the user. For Peer Ranking, each node, namely leaf node, monitors its own peer node's resources and availability in a scalable manner, wherein each leaf node is constantly monitored.

In the communication system, each data store, whether a network service, physical drive and so forth, is monitored for availability. Beneficially, a qualified availability ranking is appended to one or more leaf storage node addresses by consensus of a monitoring super node group by a step, denoted by 160. A ranking figure will be appended by the step 160, and signed by the supply of a key from the monitoring super node; this is optionally agreed by more super nodes to establish a consensus for altering the ranking of the node. The new rank will preferably be appended to the node address, or by a similar mechanism to allow the node to be managed preferably in terms of what is stored there, and how many copies there has to be of the data for it to be seen as perpetual.

In the communication system, each piece of data is checked via a content hashing mechanism for ensuring its data integrity, which is carried out by the storage node itself by a step, denoted by 170, or by its partner nodes via super nodes by a step, denoted by 180, or by an instigating node via super nodes by a step, denoted by 190, by retrieving and running the hashing algorithm against that piece of data. The data checking cycle optionally repeats itself.

In the communication system, as a peer, whether an instigating node or a partner peer, namely one that has a same data chunk, checks the data, wherein the super node querying the storage peer will respond with the result of the integrity check and update this status on the storage peer. The instigating node or partner peer will decide to forget this data and will replicate it in a more suitable location. If data fails the integrity check, the node itself will be marked as 'dirty' by a step, denoted by 200, and a "dirty" status appended to the leaf node address to mark it as requiring further checks regarding the integrity of the data it holds by a step, denoted by 210. Additional checks are optionally carried out on data stored on the leaf node marked as 'dirty' by a step, denoted by 220. If a pre-determined percentage of data found to be "dirty", the node is removed from the communication system network, except for message traffic by a step, denoted by 230. In an event of a certain percentage of dirty data being established by aforesaid steps, the communication system may conclude that this node is compromised or otherwise damaged and the network would be informed of this. At that point, the node will be removed from the network except for the purpose of sending it warning messages by a step, denoted by 230. This allows either having data stored on nodes of equivalent availability and efficiency or dictating the number of copies of data required to maintain reliability with the communication system.

Further modifications and improvements may be added without departing from the scope of embodiments of the disclosure herein described.

Referring next to FIG. 10, duplicate data is optionally removed in the communication system to increase, for example maximize, an efficient use of the disk space available within the system. Prior to the initiation of the data backup process by a step, denoted by 240, internally generated content hash may be checked for a match against hashes stored on the Internet by a step, denoted by 250, or a list of previously backed up data; this will allow a number of replicate copies of data to be kept for robustness. Moreover, this reduces a network-wide requirement to backup data, which has mutually similar contents. Notification of shared key existence is beneficially passed back to an instigating node in a step, denoted by 260, to access that an authority check has been requested, which has to pass for signed result to be passed back to the storage node. The storage node passes shared key and database back to instigating node by a step, denoted by 270. Such data is beneficially backed up via a shared key, which after proof of the file existing on the instigating node in the step 260, the shared key, in the step 270, is shared with this instigating node. The location of the data is then passed to the node for later retrieval, if required. Moreover, this maintains copyright as parties, for example persons, can only backup what they prove to have on their systems and not publicly share copyright infringed data openly on the network of the communication system. Furthermore, this data may be marked as protected, or not protected, by a step, denoted by 280, which has a check carried out for protected, or non-protected, data content. The protected data ignores sharing process.

Next, perpetual data will be described, in respect of the communication system, with reference of FIG. 1, namely the aforesaid element PT1, and also with reference to FIG. 11.

According to a related aspect of the present disclosure, pertaining to the communication system and its manner of operation, a file is chunked or split into constituent parts, denoted by 1, this process involves calculating a chunk size, preferably from known data such as the first few bytes of a hash of the file itself and preferably using a modulo division technique, for example based on an exclusive OR operation, to resolve a figure between optimum minimum and optimum maximum chunk sizes for network transmission and storage.

Preferably, each data chunk is then encrypted and obfuscated in some manner to protect the data; such obfuscation after applying a hash function is beneficially achieved by applying an XOR function, for example XOR'ing one data chunk against another for obfuscation purposes. Optionally, a search of the network is carried out looking for values relating to the content hash of each of the chunks, as denoted by 2.

When looking for such values of the hash content, If this is found, as denoted by 4, then the other chunks are identified too; failure to identify all chunks may mean there is a collision on the network of file names or some other machine is in the process of backing up the same file. A back-off time is beneficially calculated to check again for the other chunks. If all chunks are on the network, the file is considered backed up and the user will add their MID signature to the file after preferably a challenge response to ensure there is a valid user and there are enough resources to do this.

If no chunks are found on the network of the communication system, the user preferably via another node, denoted by 3, will request the saving of the first copy, preferably in distinct time zones or by employing one or more other geographically dispersing methods. Thereafter, the chunk will be stored, as denoted by 5, on a storage node, allowing visibility of the PMID of the storing node and storage thereof.

Then, preferably, a Key.value pair of a chunkid.public key of the initiator is written to the network of the communication system, creating a Chunk ID (CID), as denoted by 6.

There will next be described storage and retrieval of data within the communication system, with reference to FIG. 1, for example the element P4. According to a related aspect of the present disclosure, data is stored in the madisafe.net system in multiple locations. Each location beneficially stores locations of its peers that hold identical chunks, namely at least identical in content, and they all communicate regularly to ascertain the health of the data which is mutually stored therebetween. A preferable method includes steps as provided in Table 8; the steps are optionally implemented in various different orders to an order of steps as depicted in Table 8. Optionally, certain steps are omitted.

TABLE 8

Steps of a preferable method of storing data in mutually cooperating locations

| Step | Detail |
| --- | --- |
| S1 | Copying the data to at least three disparate locations |
| S2 | Performing each copy via many nodes to mask the initiator |
| S3 | Checking each local copy for validity, and making checks that the preferably other 2 copies are also still valid |
| S4 | In an event of any single node failure, initiating a replacement copy to be made in another disparate location and updating the other associated copies to reflect this change |
| S5 | Carrying out the steps of storing and retrieving via other network nodes to mask the initiator |
| S6 | Renaming all files with a hash of their contents |
| S7 | Altering one or more names of the data, namely as data chunk, by a known process such as a binary shift left of a section of the data; this allows the same content to exist, but also allows the chunks to appear as three different bits of data for the sake of not colliding on the network |

Preferably, each data chunk has a counter associated therewith, namely "attached to it", that allows the network to determine, namely to understand easily, just how many users are attached to the data chunk, either by sharing or otherwise. A user requesting a "chunk forget" command or instruction will initiate a system question if they are the only user using the data chunk, and, if so, the data chunk will be deleted and the user's required disk space reduced accordingly. Such a feature allows users to remove files no longer required, and to free up their local disk space. Any file also being shared is preferably removed from the user's quota and the users database record or data map, as will be elucidated in greater later, is deleted.

Preferably, this counter is digitally signed by each node sharing the data and therefore will require a signed "forget" or "delete" command to cause its removal from the communication system. Preferably, even "store", "put", "retrieve" and "get" commands, in respect of a given data chunk, are also either digitally signed or preferably go through a PKI-challenge response mechanism. This PKI-challenge response mechanism assists to prevent unauthorized third parties from attempting to disrupt or damage operation of the communication system by attempting to delete one or more data chunks.

In order to ensure fairness, execution of the method is beneficially monitored by a supernode or similar, namely to ensure that the user has not simply copied the data map for later use without giving up the disk space for it. Therefore, the users private ID public key is beneficially used to request the "forget chunk" statement. This is used to indicate the user's acceptance of the "chunk forget" command and allow the user to recover the disk space. Any requests against the data chunk will preferably be signed with this key, and consequently rejected unless the user's system gives up the space required to access this file.

Preferably, each user storing a data chunk will append their signed request to the end of the data chunk in an identifiable manner, for example prefixed with 80- or similar.

Forgetting the data chunk means that the signature is removed from the file. This again is done via a signed request from the storage node as with the original backup request. Preferably, this signed request is another small data chunk stored at the same location as the data chunk with an appended postfix to the data chunk identifier to show a private ID is storing this chunk. Any attempt by somebody else to download the file is rejected unless they first subscribe to it, namely a chunk is called 12345, so a file is saved and called 12345 <signed store request>. This allows files to be forgotten when all signatories to the data chunk are gone. A user sends a signed "no store" or "forget" and their ID data chunk will be removed, and in addition if they are the last user storing that data chunk, the data chunk is removed. Preferably, this allows a private anonymous message to be sent upon data chunk failure or damage, thereby allowing a proactive approach to maintaining clean data.

Preferably, as a given node of the communication system fails, the other nodes preferably send one or more messages to all sharers of the data chunk to identify the new location of the replacement data chunk.

Preferably, any node attaching to a file which is downloading immediately should be considered to give rise to an alert, and the communication system optionally beneficially takes steps to slow down this node's activity, or even halt it to protect against potential data theft.

Next, checks performed on data chunk will be described with reference to Table 9, in conjunction with FIG. 1 and FIG. 12, namely with regard to aforementioned element P9.

TABLE 9

Checks performed on data chunks within the communication system

| Checking step | Detail |
| --- | --- |
| 1. Checking peers | A storage node of the madisafe.net system containing a given data chunk 1 checks its peers, namely its peer nodes. As each peer node is checked, it reciprocates the check. These checks are preferably split into two types:<br>(a) An availability check, namely a simple network ping or similar; and<br>(b) A data integrity check; in this instance, the checking node takes a chunk and appends random data to it and takes a hash of the result. It then sends the random data to the node being checked and requests the hash of the chunk with the random data appended. The result is compared with a known result and the chunk will be assessed as either healthy or not. If not, further checks with other nodes occur to find the bad node.<br>In such a manner, the storage node determines peer nodes that are likely to be reliable for the concurrent storage of data chunks. |
| 2. Checking multiple storage nodes | There may be multiple storage nodes, depending on the rating of machines and other factors pertaining to the communication system. The above checking is carried out by all nodes from 1 to n (where n is total number of storage nodes selected for the chunk). Obviously, a poorly rated node will required to give up disk space in relation to the number of chunks being stored to allow perpetual data to exist within the communication system. This is a penalty paid by nodes that are switched off. |
| 3. Integrity of data chunk | A given user who stored the data chunk will check on a chunk from one storage node which is randomly selected. This check will ensure the integrity of the data chunk and also ensure there are at least ten other signatures existing already for the data chunk. If there are not such other signatures existing, and the user's ID is not listed, the user signs the data chunk. |
| 4. Checking of a data chunk | Another example of another user checking the chunk is shown. Note that the user checks X (40 days in this diagram) are always at least 75% of the forget time retention (Y) (namely, when a chunk is forgotten by all signatories, it is retained for a period of time Y). This is optionally another algorithm that will continually develop in the madisafe.net system. |

Next, storage of additional data chunks will be described with reference to FIG. 12 and also Table 10.

TABLE 10

Storage of additional data chunks in the communication system

| Storage step | Detail |
| --- | --- |
| 1. Chunk ID | The communication system employs a program, wherein, with user logged in (so an MID exists), has "chunked a file", namely caused a file to be sub-divided into data chunks. It has already stored a chunk and is now looking to store additional chunks. Therefore a Chunk ID (CID) should exist on the communication network. This process retrieves this CID. |
| 2. CID | The CID as shown in storing an initial data chunk contains the data chunk name and any public keys that are sharing the data chunk. In this instance, it should only be a given user's key, as the given user is the first party storing the data chunks, wherein |

TABLE 10-continued

Storage of additional data chunks in the communication system

| Storage step | Detail |
| --- | --- |
| | others would be in a back-off period to see if the given user backs up other data chunks. Beneficially, a last bit is optionally any function on any bit as long as it replicable by the given user. |
| 3. Collision avoidance search | There is then performed a check that there will not be a collision with any other stored chunk on the net; there is performed again a CID search. |
| 4. Broadcast to supernodes | A broadcast is hen issues to the given user's supernodes, namely to the supernodes to which the given user is connected, stating that the given user needs to store X bytes and any other information about where the given user requires to store it, for example geographically in the given user's case-time zone (TZ). |
| 5. Supernode finds a storage location | The supernode network finds a storage location for the given user with the correct rank, and so forth. |
| 6. Storage after challenge response | The data chunk is stored after a successful challenge response, namely in the communication network. MIDs are require to ensure they are talking or dealing with validated nodes, so to accomplish this a challenge process is carried out as follows, wherein a sender is denoted by "[S]", and a receiver is denoted by "[R]":<br>[S] I wish to communicate (store/retrieve/forget data etc.) and I am MAID;<br>[R] retrieves MAID public key from DHT and encrypts a challenge (possibly a very large number encrypted with the public key retrieved);<br>[S] gets key and decrypts and encrypts [R] answer with his challenge number also encrypted with [R]'s public key;<br>[R] receives response and decrypts his challenge and passes back answer encrypted again with [S] public key<br>(Communication is now authenticated between these two nodes.) |
| 7. Update CID | The CID is then updated with the second chunk name and the location it is stored at. This process is repeated for as many copies of a chunk that are required. |
| 8. Copies of chunks | Copies of chunks will be dependent on many factors including file popularity (popular files may require to be more dispersed closer to nodes and have more copies. Very poorly ranked machines may require an increased amount of chunks to ensure they can be retrieved at any time (poorly ranked machines will therefore have to give up more space)). |

Next, issues of security and availability of data will be described with reference to FIG. 1, namely element P3.

According to a related aspect of the present disclosure of the communication system and its method of operation, data of each file is split into relatively small chunks and thereafter encrypted to provide security for the data. Only a person or a group, to whom the overall data belongs, will know locations of corresponding related, but dissimilar, chunks of data corresponding to the aforesaid file. As described elsewhere in this disclosure, by encrypting and obfuscating the data chunks, a higher degree of data secrecy is maintained, namely substantially impervious to unauthorized eavesdropping by governmental organisations, such as, for example, NSA (USA) and GCHQ (United Kingdom). A high degree of data storage reliability is maintained by spreading risk regarding where the encrypted and obfuscated data chunks are stored, in combination to a plurality of copies of each data chunk being stored. Preferably, each of the above data chunks does not contain location information for any other dissimilar chunks; this provides for security of data content, as well as a basis for performing integrity checking and redundancy of data content.

Preferably, the method employed in the communication system further comprises a step of only allowing the person, or the group, to whom the data belongs to have access to it, preferably via a shared encryption technique which allows persistence of the data.

Preferably, in the method, checking of data or chunks of data, namely, data chunks, between machines of the madisafe.net system is carried out via any presence-type protocol such as a distributed hash table network.

Preferably, in an event when all data chunks have been relocated, namely the user has not logged on for a while, a redirection record is created and stored in the super node network, namely a three copy process-similar to data; thus, when a user requests a check, the redirection record is given to the user to update his/her database. Such an approach provides enhanced operating efficiency, which in turn allows data resilience in cases where network churn is a problem, namely ability of the network to handle flows of data, as in peer to peer or distributed networks. This system message can be preferably passed via the messenger system described herein.

Preferably, the communication system may simply allow a user to search for his/her data chunks and through a challenge response mechanism, locate and authenticate himself/herself to have authority to get/forget this data chunk.

Furthermore, users can decide on employing various modes of operation, preferably such as:
(i) maintain a local copy of all files on their local machine, unencrypted or chunked;
(ii) or chunk and encrypt even local files to secure machine, preferably referred to as off line mode operation; or indeed
(iii) users may decide to remove all local data and rely completely on preferably the communication system or similar system to secure their data.

Next, there will be described a method of self-healing of data within the communication system, with reference to FIG. 1 and the element P2 therein. According to a related aspect of the present disclosure, there is provided a self healing network method via us of a process, as follows:
(i) as data or data chunks become invalid from a given location, data is ignored from that location;
(ii) data or data chunks are recreated in a new and safer location;
(iii) the original location is marked as bad; and
(iv) peers note this condition and add the bad location to a watch list.

The network is optionally the data communication network of the meadsafe.net system. Moreover, steps (i) to (iv) beneficially assist to prevent the introduction of viruses; worms and similar, and also allow faulty machines/equipment to be identified automatically. Preferably, the communication system employs a network layer which employs SSL or TLS channel encryption to prevent unauthorised access or snooping.

Next, there will be described self-healing of data or data chunks, with reference to FIG. 13 and also Table 11.

TABLE 11

Method of self-healing

| Step | Detail |
|---|---|
| 1. | A data element called a Chunk ID (CID) is created for each data chunk. Added to this is the "also stored at <1 >MID" for the other identical data chunks. The other data chunk names are also here as they may be renamed slightly, for example by bit shifting a part of the name in a manner that is calculable. |
| 2. | All storing nodes (related to this data chunk) have a copy of this CID file, or can access it at any stage from the DHT network, giving each node has knowledge of all other nodes. |
| 3. | Each of the storage nodes has their copy of the data chunk. |
| 4. | Each node queries its partner nodes' availability at frequent intervals. On less frequent intervals, a data chunk "health check" is requested. This involves a node creating some random data and appending this to its data chunk and taking the hash. The partner node will be requested to take the random data and do likewise and return the hash result. This result is checked against the result the initiator had and chunk is then deemed healthy or not. Further tests can be done as each node knows the hash their chunk should create and can self check n that manner on error and report a dirty node. |
| 5. | Now there arises a node fail, namely a dirty chunk being created. |
| 6. | The first node to note this carries out a broadcast to other nodes to say it is requesting a move of the data. |
| 7. | The other nodes agree to have CID updated; they may optionally carry out their own check to confirm this. |
| 8. | A broadcast is sent to the supernode network closest to the storage node that failed, to state a re-storage requirement. |
| 9. | The supernode network picks up a request associated with the broadcast. |
| 10. | The request is to the supernode network to store x amount of data at a rank of y. |
| 11. | A supernode will reply with a location. |
| 12. | The storage node and new location carry out a challenge response request to validate each other, namely invoke a mutual validation response. |
| 13. | The chunk is stored and the CID is updated and signed by the three or more nodes storing the chunk. |

Next, there will described peer ranking with reference to FIG. 1, and its associated element P1.

According to a related aspect of the present disclosure, there is provided an addition of a peer ranking mechanism, wherein each node, namely "leaf node" of a data communication network, for example as employed in the communication system, monitors its own peer node's resources and availability in a scalable manner. Nodes beneficially constantly perform this monitoring function. Such a manner of operation of the nodes assists the communication system to function in a distributed manner.

Each data store of the aforesaid data communication network, whether it is a network service, physical drive, and so forth, is monitored for availability. A ranking figure is appended and signed by a supplying of a key from a monitoring super node, wherein the key is preferably agreed by one or more other supernodes to establish a consensus before altering the ranking of a given node of the data communication network. Preferably, the new rank will be appended to the node address, or by use of a similar mechanism, to allow the given node to be managed in terms of what is stored therein, and how many copies there has to be of the data stored for it to be regarded, namely "seen", as being perpetual.

In the aforementioned peer ranking method, each piece of data is checked via a content hashing mechanism. This is preferably carried out by the storage node itself or by its one or more partner nodes via supernodes, or by employing an instigating node via supernodes by retrieving and running the hashing algorithm against that piece of data.

Preferably, as a peer, whether an instigating node or a partner peer, namely one that has same chunk, checks the data, the supernode querying the storage peer will respond with the result of the integrity check and update this status on the storage peer. The instigating node or partner peer will decide to forget this data and will replicate it in a more suitable location. If the data fails the integrity check, the node itself will be marked as "dirty" and this status will preferably be appended to the node's address for further checks on other data to take this into account. Preferably, by establishing that a certain percentage of data is dirty data, it is concluded therefrom that this node is compromised or otherwise damaged and the network is beneficially informed of this. At that point, the node will be removed from the network, except optionally for a purpose of sending it warning messages.

In general, the madisafe.net system computes a node ranking figure which takes into account at least one of:
(i) an availability of a given network connection within the communication system;
(ii) an availability of resources within the communication system;
(iii) a time on the network with a rank, wherein the rank is useful for performing effort-based trust modelling; and
(iv) an amount of resource that is available within the communication system network, and also connectivity capabilities of any node, namely whether it is directly or indirectly contactable.

Such an approach allows data to be stored on nodes of equivalent availability and efficiency, and to determine the number of copies of data required to maintain reliability of data storage within the communication system.

Next, a "put" operation occurring within the communication system will be described with reference to FIG. 15 and also Table 12. Here, the MID is the MID of the machine saving data to the net, and the PMID is the ID of the storage node chunk server. The communication is therefore between a communication application with a logged-in user, namely to provide a corresponding MID, and a chunking system on the net somewhere, for example in a storage node.

TABLE 12

Steps of a "put" operation within the communication system

| Step | Detail |
|---|---|
| 1. | A message is signed with a user's MID, namely checked by getting the MAID packet from the net, is received for requesting storage of a data chunk. |
| 2. | This message is a specific message stating the storage node's ID (PMID) and the data chunk name to be saved and signed, namely this is a unique message. |
| 3. | The chunk server decides if it will store the data chunk. |
| 4. | A signed message is returned stating if PMID will store this data chunk (chunkID). |
| 5. | The data chunk is stored and checked, for example using a SHA check. |
| 6. | A message is sent back to state that the data chunk is saved and is OK. This is signed by the PMID of the data chunk server. |
| 7. | The data chunk server awaits the locations of the other identical chunks. |
| 8. | Locations of the identical data chunks returned to the chunk server are signed with the MID. |
| 9. | Each storage node is contacted and public keys exchanged (PMIDs). |
| 10. | The data chunk checking process is initiated. |

Next, a "forget" operation within the communication system will be described with reference to FIG. 16.

TABLE 13

Steps of a "forget" operation within the communication system

| Step | Detail |
|---|---|
| 1. | A user has requested that a file should be deleted from his/her backup, namely "forgotten" from the communication system. The system signs a request using the user MID. |
| 2. | The request is sent to a chunk server, for example a data chunk storage node. |
| 3. | The storage node picks up the request. |
| 4. | The storage node sends the signed request to the other storage nodes that have this data chunk. |

TABLE 13-continued

Steps of a "forget" operation within the communication system

| Step | Detail |
|---|---|
| 5. | The MID is checked as being on the list of MIDs that are watching the chunk; it will be appreciated that only a few, for example twenty, are ever listed. |
| 6. | The other storage nodes are notified of this. |
| 7. | If this is the only MID listed, then all owners are possibly gone. |
| 8. | Chunk delete timer begins; this timer will always be higher than a user check interval, namely the timer of 60 days-user check interval 40 days. |
| 9. | This information is also passed to other storage nodes. |

Next, a method of removing duplicate data chunks in the communication system will be described, namely "Duplicate Removal", with reference to FIG. 1, in respect of element P5 thereof.

According to a related aspect of the present disclosure, prior to data being backed up, a content hash may be checked against a list of previously backed up data. This will allow only one backed-up copy of data to be kept, thereby reducing the network wide requirement in the communication system to backup data that has mutually similar content, for example mutually exactly same content. Preferably, such a functionality is achieved via performing a simple search for existence on the net of all data chunks of a particular file.

Preferably, such data is backed up via a shared key, or mechanism of appending keys, to chunks of data, namely data chunks. After proof of the file existing on a given instigating node, the shared key is shared with the instigating node and the storing node issues a challenge response to add their ID to a pool, if it is capable of carrying out actions on the file such as get/forget; the "forget" functionality corresponds to "delete". The location of the data is then passed to the node for later retrieval, if required.

Such deletion of duplicate copies of data in the communication system is beneficially in respect of enforcement of copyright, namely it maintains copyright as users, for example persons, can only backup what they prove to have as data on their systems; it is thereby not easy publicly to share copyright-infringed data openly on the network. Preferably, data may be marked as protected or not protected; for example copyright-sensitive content can be marked as "protected" to reduce a risk of copyright infringement occurring. Preferably protected data ignores sharing processes invoked within the communication system.

Next, chunking of data, namely "chunking", within the communication system will be described with reference to FIG. 1 and the aforementioned element P7 thereof.

According to a related aspect of the present disclosure, data files are split, namely sub-divided, preferably using an algorithm to work out an appropriate data chunk size when splitting the data files into several component parts. The size of the parts is preferably worked out from known information about a corresponding file, or files, as a whole, preferably the hash of the complete file, or files. This information is run through an algorithm, such as adding together the first x bits of the known information and using a modulo division to give a chunk size that allows the file to preferably split into a plurality of parts, for example at least three parts.

Preferably, known information from each data chunk is used as an encryption key. This is preferably done by taking a hash of each chunk and using this as the input to an encryption algorithm to encrypt another chunk in the file. Preferably, there is used a symmetrical encryption algorithm, such as an AES256 encryption algorithm. As will be described in further detail later, after encryption, data chunks are beneficially subject to further processing to increase their obfuscation, for example data chunks are XOR'ed against each other.

Preferably, this key is input into a password creating algorithm such as a pbkdf algorithm, and an initial vector and key calculated from that. Preferably, an iteration count for the pbkdf algorithm is calculated from another piece of known information, preferably a sum of bits of another chunk, or similar.

Preferably, each initial chunk hash and the final hash after encryption are stored somewhere for later decryption, for example included in one or more data maps which enable stored encrypted data chunks to be recovered by an associated user of the communication system and then appropriately decoded to enable access to a data file corresponding to the stored encrypted data chunks; the one or more data maps are beneficially stored in the communication system in an encrypted state.

Next, a method of self encrypting files will be described with reference to FIG. 1, in respect of the element PT2 thereof, and also with reference to FIG. 17. Reference is also made to Table 14.

distributed network, but a search is beneficially carried out for checking for the existence of all associated chunks created. Preferably, the locations of the chunks have the same ranking, from an earlier ranking system as aforementioned, as user or better, otherwise the existing chunks on the net are promoted to a location of equivalent rank at least. If all chunks exist, then the file is considered as already having been backed up. If less than all chunks exist, then this will preferably be considered to be a collision, after a time period, and the file will be re-chunked using one or more secondary algorithms, namely preferably just adjusted file sizes. This allows duplicate files on any two or more machines only to be backed up once, although through perpetual data several copies will exist of each file; this is limited to an amount that will maintain perpetual data.

Next, a method of encrypt-decrypt in the communication system will be described with reference to FIG. 1, namely in respect of the aforementioned element P8.

According to a related aspect of the present disclosure, the actual encrypting and decrypting within the communication system is carried out via knowledge of the file's content and

TABLE 14

Steps of a method of self encrypting files

| Step | Detail |
|---|---|
| 1. | Take a content hash of a file or data element. |
| 2. | Chunk a file with preferably a random calculable size, namely based on an algorithm of the content hash (to allow for recovery of the file). Also, obfuscate the file such as in step 3 |
| 3. | Obfuscate the chunks to ensure safety, even if encryption is eventually broken, as occurs with all encryption if given enough processing power and time:<br>(a) chunk 1 byte 1 swapped with byte 1 of chunk 2<br>(b) chunk 2 byte 2 swapped with byte 1 chunk 3<br>(c) chunk 3 byte 2 swapped with byte 2 of chunk 1<br>(d) This (a) to (c) repeats until all bytes are swapped and then repeats the same number of times as there are chunks with each iteration making next chunk first one, namely second time round chunk 2 is in a starting position |
| 4. | Take hash of each chunk and rename chunk with its hash. |
| 5. | Take h2 and first x bytes of h3 (6 in an example case here) and either use modulo division or similar to get a random number between two fixed parameters (in the example case 1000) to get a variable number. Use the above random number and h2 as the encryption key to encrypt hi or use h2 and the random number as inputs to another algorithm (pdbfk2 in the example case) to create a key and iv. (initialisation vector) |
| 6. | This process may be repeated multiple times to dilute any key throughout a series of chunks. |
| 7. | Chunk name i.e. hi (unencrypted) and h1c (and likewise for each chunk) is written to a location for later recovery of the data. Added to this, it is possible simply to update such a location with new chunks if a file has been altered, thereby creating a revision control system where each file can be rebuilt to any previous state. |
| 8. | The existence of the chunk will be checked on the net to ensure it is not already backed up. All chunks may be checked at this time. |
| 9. | If a chunk exists, all chunks must be checked for existence. |
| 10. | The chunk is saved. |
| 11. | The file is marked as backed up. |
| 12. | If a collision is detected the process is redone altering the original size algorithm (2) to create a new chunk set, each system will be aware of this technique and will do the exact same process till a series of chunks do not collide. There will be a back off period here to ensure the chunks are not completed due to the fact another system is backing up the same file. The original chunk set will be checked frequently in case there are false chunks or ones that have been forgotten. If the original names become available the file is reworked using these parameters. |

Next, there will be described a method of duplicate removal implemented in the communication system, with reference to FIG. 1, and in respect of the aforementioned element P5.

According to a related aspect of the present disclosure, data which is chunked and ready for storing can be stored on a this is somehow maintained, as will be described in greater detail below. Keys are generated and preferably stored for decrypting. Actually activities of encrypting the file will preferably include a compression process and further obfuscation methods, for example applying XOR operations to encrypted data chunks for obtaining further obfuscation. Preferably, the data chunk is stored with a known hash, preferably based on the contents of that chunk, as aforementioned.

Decrypting the file preferably requires a collation of all data chunks and thereafter rebuilding of the file itself, namely rebuilding the file giving that gave rise to the data chunks. The file may preferably have its content mixed up by an obfuscation technique rendering each chunk useless on its own.

Preferably, every file is subjected in the communication system to a process of byte-swapping, or preferably bit-swapping, between its chunks to ensure the original file is rendered useless without all chunks. Such bit-swapping or byte-swapping is to be regarded as a form of obfuscation process.

This process preferably involves running an algorithm, which preferably takes the data chunk size, and then distributes the bytes in a pseudo-random manner, preferably taking the number of chunks and using this as an iteration count for the process. Moreover, this beneficially protects data, even in an event of a third party, namely somebody, getting hold of the encryption keys, as the chunks of data are rendered useless, even if transmitted "in the open" without encryption having been employed. Such a method is able to circumvent surveillance by governmental eavesdropping organisations, for example NSA (USA) and GCHQ (United Kingdom), thereby avoiding potential imposition of a police state, for example. Moreover, such obfuscation defends against somebody copying all data and storing for many years until decryption of contemporary encryption algorithms is possible; it is not anticipated that such decryption will be feasible until many years in the future.

This also defends against somebody; instead of attempting to decrypt a chunk by creating the enormous amount of keys possible, for example in an order of 254 keys, rather instead creating the keys and presenting chunks to all keys; if this were possible, which is unlikely, a data chunk would decrypt. The process defined here makes this attempt useless.

When encryption and obfuscation of data chunks has been applied, all data is to be considered to be diluted throughout the original data chunks and preferably additions to this algorithm will only strengthen to a greater extent the process of obfuscation of data in the communication system.

Next, a method of identifying data chunks will be described, with reference to FIG. 1, and in respect of the aforementioned element P9.

According to a related aspect of the present disclosure, a data chunk's original hash, or one or more other calculable unique identifiers, is stored. Such stored data preferably with the final name of the data chunk. This aspect defines that each file has a separate map, preferably a file or database entry, to identify the file and the name of its constituent parts. Preferably, this map includes local information to users, such as its original location and associated rights, such as read-only rights in the system, and so forth. Preferably, some of this information can be considered shareable with others, such as filename, content hash and data chunk names.

Next, there will be described ID data with its associated small file, namely data maps, with reference to FIG. 1, and with reference to the aforementioned element P11.

According to a related aspect of the present disclosure, these data maps may be very small in relation to the original data itself, thereby allowing transmission of files across networks such as the Internet with extreme simplicity, security and bandwidth efficiency. Preferably, the transmission of maps will be carried out in a very secure manner, but failure to do this is akin to currently emailing a file in its entirety. Moreover, the communication system is thus capable of being hosted via the contemporary Internet, but is also capable of being hosted in other types of data communication networks.

Moreover, ID data allows a very small file, such as the data map or database record, to be shared or maintained by a user in a location not normally large enough to fit a file system of any great size, such as on a PDA, smart phone, mobile phone and similar. The identification of the data chunk names, original names and final names are all that is required in order to retrieve the data chunks and rebuild the file (from which the data chunks are generated) with certainty.

With data maps in place, as aforementioned, a users whole machine, or all its data, can exist elsewhere. Simply retrieving the data maps of all data is all that is required to allow the user to have a complete visibility and access to all his/her data as well as any shared files to which he/she has agreed.

Next, there will be described a method of revision control in the communication system, with reference to FIG. 1, and with reference to the aforementioned element P10; revision control is required when updating data stored in the communication system as data chunks.

According to a related aspect of the present disclosure, as data is updated and the data map contents are altered to reflect the new contents, this will preferably not require the deletion or removal of existing chunks, but instead allow the existing chunks to remain and the map appended to with an indication of a new revision existing. Preferably, further access to the file will automatically open the last revision unless requested to open an earlier revision. Such a manner of revision control reduces a volume of data flow occurring within the communication system when data files are updated and such updates are to be recorded securely and reliably in corresponding data chunks.

Preferably, revisions of any file can be forgotten or deleted, preferably after checking the file counter or access list of sharers as above. This allows users to recover space from revisions that are no longer required.

Next, there is described a method of creating a map of data maps, with reference to FIG. 1, with reference to the aforementioned element P15.

According to a related aspect of the present disclosure, data identifiers, preferably data maps as aforementioned, are appended to each other in a way that preferably allows a single file or database record to identity several files in one, namely as a form of share. Such a share can be private to a given individual, thereby replacing a directory structure of files that users are normally acquainted, and replacing this with a new structure of shares which is very similar to volumes or filing cabinets, as this is more in line with normal human nature and should make things simpler when using the communication system.

Next, there will described shared maps within the communication system, with reference FIG. 1, and with respect to the aforementioned element P16.

According to a related aspect of the present disclosure, this map, namely shared map, of maps will preferably identify the users that are connected to the shared map via some public ID that is known to each other user, with the shared map itself being passed to users who agree to join such a share. Moreover, the sharing is preferably implemented via an encrypted channel, such as an ms messenger or similar. This shared map may then be accessed at whatever rank level users have been assigned. Preferably, there will be associated access rights such as read/delete/add/edit as is typically used in a contemporary context. As a map is altered, the user instigating such an alteration is checked against a user list in the map to determine whether or not the alteration is allowed. If the alteration is not allowed, the request is ignored, but preferably the users may then save the data themselves to their own database or data maps as a private file or even copy the file to a share for which they have access rights. These shares will preferably also exhibit the revision control mechanism as described above.

Preferably, joining the share will mean that the users subscribe to a shared amount of data storage space and reduce one or more other subscriptions, namely a 10 Gbyte share is created, and then the individual gives up 10 Gbyte, or equivalent dependent on system requirements which may be a multiple or divisor of 10 Gbyte) Another user joining result in them both having a 5 Gbyte space to give up and 5 users would mean they all have a 2 Gbyte or equivalent space to give up. So with more people sharing, requirements on all users reduce.

Next, shared access to private files will be described with reference to FIG. 1 and FIG. 18, and also with reference to the aforementioned element PT5.

TABLE 15

Steps of a method of shared access to private files in the communication system.

| Step | Detail |
|---|---|
| 1. | User 1 logs onto a network |
| 2. | The user 1 Authenticates ID, namely gets access to his/her public and private keys to sign messages. This should NOT be stored locally but should have been retrieved from a secure location-anonymously and securely. |
| 3. | User 1 saves a file as normal (encrypted, obfuscated, chunked, and stored) on the net via a signed and anonymous ID. This ID is a special communication Share ID (MSID) and is basically a new key pair created purely for interacting with the share users, namely to mask the user's MID (i.e. cannot be tied to MPID via a share). So again the MSID is a key pair and the ID is the hash of the public key-this public key which is stored in a data chunk called the hash and signed and put on the net for others to retrieve and confirm that the public key belongs to the hash. |
| 4. | User 1 creates a share, which is a data map with some extra elements to cover users and privileges. |
| 5. | File data added to file map is created in the backup process, with one difference, namely this is a map of maps and may contain many files, see 14 |
| 6. | User 2 logs in |
| 7. | User 2 has authentication details (i.e. their private MPID key) and can sign/decrypt with this MPID public key. |
| 8. | User 1 sends a share join request to user 2 (shares are invisible on the net, namely nobody except the sharers to know they are there). |
| 9. | User 1 signs the share request to state he/she will join the share. He/she creates his MSID key pair at this time. The signed response includes User 2's MSID public key. |
| 10. | Share map is encrypted or sent encrypted (possibly by secure messenger) to User 1 along with the MSID public keys of any users of the share that exist. Note the transmission of MSID public key may not be required as the MSID chunks are saved on the net as described in 3, so any user can check the public key at any time; this just saves the search operation on that chunk to speed the process up slightly. |
| 11. | Each user has details added to the share these include public name (MPID) and rights (read/write/delete/admin etc.) |
| 12. | A description of the share file is provided; it will be appreciated that as each user saves new chunks, he/she does so with the MSID keys; this means that if a share is deleted or removed, the data chunks still exist in the user's home database and he/she can have an option to keep the data maps and files as individual files or simply forget them all. |

It will be appreciated that, as a user opens a file, a lock is transmitted to all other shares and they will only be allowed to open a file read only; they can request unlock, namely another user unlocks the file, namely meaning it becomes read only. Non-logged in users will have a message buffered for them; if the file is closed, the buffered message is deleted, as there is no point in sending it to the user now, and logged in users are updated also. This will take place using the messenger component of the system to receive automatically messages from share users about shares, but being limited to that.

Next, there will be described a method of providing a public ID for the communication system, with reference to FIG. 1, and the aforementioned element P17 thereof.

According to a related aspect of the present disclosure, a public and private key pair is created for a network of the communication system, where, preferably, the user is anonymously logged on, and preferably has a changeable pseudo-random private id, which is only used for transmission and retrieval of ID blocks giving access to that network.

Preferably, this public private key pair is associated with a public ID. This ID is transmittable in a relatively harmless way using almost any method including in an open communication, for email, ftp, www, etc., but preferably in an encrypted form. Preferably, this ID is simple enough to remember, such as a phone-number-type length. Preferably, this ID will be long enough, however, to be distinguishable in view of a size of contemporary world's population and more, for example this ID is beneficially approximately 11 characters long, or more.

This public ID can be printed on business cards or stationary, like a phone number or email address, and beneficially cannot be linked to the user's private ID by external sources. However, the users own private information makes this link by storing such data in an ID bit that the user retrieves when logging into the communication system network, or via another correspondingly valid method of secure network authentication.

This public ID is beneficially used in data or resource sharing with others in a more open manner than is feasible with the private id. Moreover, use of the public ID keeps the private ID private, and allows for much improved inter-node or inter-person communications.

Next, there will be described secure communications in the communication system, with reference to FIG. 1, and with reference to the aforementioned element P18.

According to a related aspect of the present disclosure, communications between nodes of the communication system should be both private and validated. Such validation is preferably implemented in an irrefutable manner, but there is beneficially provided a plurality of options in the communication system for refutable communications, if required. For irrefutable communications, a given user logs onto the network of the communication system, and retrieves his/her key pair and ID. This is then used to start communications via the communication system. Preferably, the user's system will seek another node to transmit to, and receive from, in a random manner; such randomness adds to the masking of the users private ID as the private ID is not used in any handshake with network resources apart from logging into the network.

As part of the initial handshake between a plurality of users of the communication system, a key is optionally passed. Preferably, this is a code passed between users over another communications mechanism in a form such as a pin number known only to the users involved, or it may be as simple as appending the user's name and other information to a communication request packet, such as exists in some contemporary instant messaging clients, for example " . . . David wants to communicate with you allow/deny/block".

Unlike many communications systems today, the aforementioned handshake is beneficially carried out on a distributed server-less network, for example a peer-to-peer network formed by users' own computing devices, without any central serves associated with contemporary types of data communication networks. This however gives rise to a problem of what to do when users are off-line, and data memory associated with the users is then not available to users of the communication system. In contemporary data communication systems, messages are either stopped or stored on a server, and in many cases not encrypted or secured. In contradistinction, embodiments of the present disclosure allow users to have messages securely buffered whilst off-line. Such secure buffering is preferably achieved by the user's node creating a unique identifier for only a present session and passing that ID to all known nodes in the user's miadsafe.net address book. Users on-line get this present-session ID immediately, whereas users off-line have this present-session ID buffered to their last known random ID. Such a manner of operation ensures that the ability of third parties to snoop on a users messages is significantly reduced, as there is no identifier such third parties outside the address book to provide any information indicative to where the name of the random ID bit associated with the messages are stored. The random ID bit is preferably used as a first part of an identified buffer file name; when more messages are stored, another file is saved with the random ID and a number appended to it representing a next sequential available number. Therefore, a user will log on and retrieve his/her message sequentially. This allows buffered secured and distributed messaging to exist within the communication system.

Next, there will described a method of signing documents, namely "document signing", within the communication system, with reference to FIG. 1, and the aforementioned element P19 thereof.

According to a related aspect of the present disclosure, there is provided a method of signing documents, wherein the method is a by-product of securing communications between nodes using asymmetric encryption as aforementioned, namely achieved by introducing a non-refutable link. Such a link allows not only for messages communicated between nodes to be non-refutable, but also for documents signed in the same manner as messages to be non-refutable. In contemporary data communication systems, somebody can easily steal a users password or purposely attack users, as they are not anonymous; embodiments of the present disclosure provide an enhanced degree of anonymity, and backs this up with access to resources; for example, the communication system enables documents to be signed and passed as being legally-enforceable between parties, for example as in a manner of a contract in one or more countries.

Next, a method of implementing contract conversations within the communication system will be described with reference to FIG. 1, namely in respect of the aforementioned element P20 thereof.

According to a related aspect of the present disclosure, a conversation or topic can be requested under various contractual conditions, for example within the communication system. The system may have implemented therein a non-disclosure agreement as an example, and both parties to the agreement digitally sign it automatically on acceptance of an associated contract conversation, for example, in this case, an associated non-disclosure conversation. Such an approach preferably speeds up and protects commercial entities entering into associated agreements, or in situations where a mutual relationship is merely being investigated. Preferably, other conditions can be applied here, such as preferably full disclosure conversations, purchase order conversations, contract signing conversations, and so forth. Such interaction is all carried out via the communication system, preferably having ready-made enforceable contracts for automatic signing. These contracts may preferably be country- or legal-domain-specific, and are optionally are require to be enforceable under laws of countries where such conversations are happening. This requires the users, preferably automatically, to use a combination of geographic IP status and by selecting which is their home country and where they are at that time located and having that conversation. Preferably, only the discussion thread is under this contract, allowing any party to halt the contract but not the contents of the thread, which is under contract. Preferably, in operation of the communication system, there is employed a very clear intent statement for a given conversation, to which both parties agree. This statement beneficially forms a basis of a contract in a event of any debate subsequently arising in respect of the contract.

Next, a method of ms_messenger will be described, with reference to FIG. 1 and Table 16, and the aforementioned element PT6 thereof.

TABLE 16

Steps of a method of ms_messaging using the communication system

| Step | Detail |
|---|---|
| 1. | A non-public ID, namely preferably one which is used in some other autonomous system, is used as a sign-in mechanism and creates a Public ID key pair. |

TABLE 16-continued

Steps of a method of ms_messaging using the communication system

| Step | Detail |
|---|---|
| 2. | The user selects or creates his/her public ID by entering a name that can easily be remembered (such as a nickname) the network is checked for a data element existing with a hash of this and, if not there, this name is allowed. Otherwise, the user is asked to choose again at step 1 of Table 16. |
| 3. | This ID is called the MPID (communication public ID) can be passed freely between friends or printed on business cards, and so forth as an e-mail address, namely in a contemporary manner. |
| 4. | To initiate communications, a user (initiator) enters the nickname of a person (receiver) with whom he/she is trying to communicate, with perhaps a short statement (like a prearranged pin or other challenge). The receiver agrees or otherwise to this request, wherein disagreeing means a negative score starts to build with the initiator. This score may last for hours, days or even months depending on a regularity of refusals. A high score will accompany any communication request messages. Users may set a limit on how many refusals a user has prior to being automatically ignored. |
| 5. | All messages now transmitted are implemented in an encrypted manner, with the receiving party's public key, making messages less refutable. |
| 6. | These messages are optionally communicated via a proxy system, or additional nodes to mask a location of each user (for example initiator and/or receiver). |
| 7. | This system also allows document signing (namely use of digital signatures) and contractual conversations. In contractual conversations, a contract is signed and shared between associated users. Preferably, this signed contract is equally available to all in a signed (non-changeable manner) and retrievable by all associated contractual parties. Therefore, the method is well suited to being implemented in a distributed environment, for example as pertains to the communication system. These contracts are, for example, NDA's, Tenders, Purchase Orders and so forth. |
| 8. | This may in some cases require parties to prove their identity, wherein such proof of identity can take many forms, for example from dealing with drivers licenses to utility bills being signed off in person, or by other electronic methods such as inputting passport numbers, driving license numbers, and so forth. |
| 9. | If the recipient is on-line, then messages are sent straight to them for decoding. |
| 10. | If the recipient is not on line, messages are require to be buffered as required for contemporary e-mails. |
| 11. | Unlike contemporary e-mails though, the method is implemented via the communication system which is a distributed system with no servers in which to buffer. In the communication system, messages are stored on the net and are encrypted with the receiver's public key. Buffer nodes may be known trusted nodes or not. |
| 12. | Messages will look like "receiver's id. message 1. message 2" or simply be appended to the user's MPID chunk; in both cases, messages are signed by the sender (initiator). This allows messages to be buffered in cases where the user is offline. |

When implementing the method, when the user comes on-line, he/she check his/her ID chunk and looks for appended messages as above, for example ID.message1 and so forth, which is for example in a format "MPID.<message 1 data>.<message 2 data>", and so forth.

The communication system is operable to support sending of automatic system messages, for example in a case of sharing shared data, wherein data maps can exist on everyone's database and never be transmitted or stored in an open state, thereby avoiding eavesdropping from occurring. File locks and changes to the maps can automatically be routed between users using the messenger system as described above. Such automatic routing is straightforward to achieve on account of the distributed nature of communication system, in contradistinction to other contemporary known messaging systems. In the maidesafe.net system, these system commands are strictly limited for security reasons and are initially used to send alerts from trusted nodes and updates to share information by other shares of a private file share, for example whether they are speaking with them or not. In the communication system, an avoidance of a need of e-mail servers also prevents occurrence of e-mail spam, which is a problem associated with operation of conventional contemporary e-mail systems.

Next, a method of performing anonymous transactions within the communication system will be described with reference to FIG. 1, namely with regard to the aforementioned element P24.

According to a related aspect of the present disclosure, the communication system is capable of providing a platform to performing transactions in a global digital medium is made available in conjunction with the system. Such transaction is achieved by passing signed credits to sellers in return for goods, thereby providing a mechanism for exchange of consideration. The credits are beneficially implemented as data chunks with a given worth preferably 1, 5, 10, 20, 50, 100, and so forth units, for example conveniently referred to as being "cybers" in this case; however, the madisafe.net system also provides a perfect platform for using other types of representations of consideration, for example BitCoin and so forth.

These cybers are a digital representation of a monetary value and can be purchased as described below or earned, for example, for giving up machine resources such as disk space or CPU time, and so forth. Beneficially, many different ways of earning cybers are beneficially provided in the communication system. Such a system for handling consideration for making purchases via use of the communication system is potentially more secure than contemporary banking systems, where institutions such as the Federal Reserve in the USA create fiat currency from nothing, in a World where perpetual growth is expected by financial markets, but not possible in reality due to finite Earth resources. The communication system provides a far superior solution in comparison to contemporary banking systems and financial structures.

A cyber is, in practice, a digitally signed piece of data containing a corresponding value statement, for example "10 cybers" and preferably a unique corresponding serial number. During a transaction, a given sellers serial number database is checked for validity of the cyber alone. The record of the ID used to transact is preferably not transmitted or recorded. This cyber will have been signed by the issuing authority as having a value. This value will have been proven, and preferably initially will actually equate to a single currency for instance linked to a Euro, or to a real non-fiat item of worth such as a defined amount of a precious metal, for example Gold or Silver, stored in a precious metals repository institution. This value will preferably alter through time as the communication system hosting the cyber currency increases in capability.

Some sellers may request non-anonymous transactions, and if a given user agrees, he/she will then use a public ID creation process to authenticate a non-anonymous transaction and may have to supply more data. However, there may be other sellers who will sell anonymously. Such a manner of financial transaction potentially has a dramatic effect on marketing and demographic analysis, and so forth, as some goods will sell anywhere and some will not. It is assumed that this communication system hosting the cyber, or similar type of verifiable currency, allows privacy and freedom to purchase goods without being analysed. Again, this avoids unauthorized eavesdropping and spying of governmental organisations, for example the NSA (USA) and GCHQ (United Kingdom).

The aforementioned process of transacting the cybers will preferably involve a signing system, such that two persons in a given transaction will actually pass the cyber from the buying person ("buyer") to the selling person ("seller"). Such a process will preferably alter the signature on the cyber to the seller's signature. This new signature is reported back to the issuing authority, responsible for issuing cybers.

Next, there will be described a method of interfacing, in respect of the communication system, with non-anonymous systems, with reference to FIG. 1, and with regard the aforementioned element P23.

According to a related aspect of the present disclosure, a situation potentially arises wherein people purchase digital cash or credits from any seller of the digital cash or credits. A given seller preferably creates actual cash data chunks which are signed and serialised to prevent forgery. This is preferably accountable as with contemporary actual cash, namely to prevent fraud and counterfeiting. In an embodiment of the present disclosure, sellers are preferably registered centrally in some cases. Users can then purchase cybers for contemporary cash, and store these cybers in their database of files in a system, preferably such as the aforementioned communication system.

As a cyber is purchased by a purchaser, it is preferably unusable and in fact simply a reference number which is utilized to claim the cyber's monetary value by the purchasers system. This reference number is preferably valid for a period of time. The purchaser then logs into their system, for example the communication system, and inputs the reference number via a secure communications medium as a cyber request. This request is analysed by a cyber issuing authority and a corresponding transaction process begins, defined by the reference number. Preferably, the cyber is signed by the issuing authority that then preferably encrypts it with the purchaser's public key and issues a signing request. The cyber is not valid at this point. Only when a signed copy of the cyber is received by the issuing authority is the serial number made valid and the cyber is live for the purchaser to employ, for example for claiming resources, namely physical products and/or services.

This cyber now belongs to the purchaser and validated by the issuer. To carry out a transaction, such a process is preferably carried out again, namely the seller asks for payment and a cyber signed by the buyer is presented; this cyber signed by the buyer is validated by checking with the issuer that the cyber's serial code is valid and that the buyer is the actual owner of the cyber. Preferably, the buyer issues a digitally-signed transaction record to the issuing authority to state he/she is about to alter that cyber's owner. This transaction record is then passed to the seller, who is then requested to sign it. The seller then signs the transaction record pertaining to the cyber and requests the issuing authority to accept him/her as new owner via a signed request. The authority then simply updates the current owner of the cyber in their records.

These transactions, for example with reference to cybers, are preferably anonymous, as users should be beneficially using a private ID to accomplish this process. This private ID can be altered at any time, but the old ID should be saved to allow cyber transactions to take place with the old ID.

Next, anonymity within the communication system will be described, with reference to FIG. 1, and regarding the aforementioned element P25.

According to a related aspect of the present disclosure, there is provided a system of voting which is non-refutable and also anonymous. Such non-refutable and anonymous features are a requirement to allow free speech and thinking to take place on a global scale without recrimination and negative feedback as encountered in contemporary situations.

To partake in a vote, the user will have to be authenticated as above and then preferably be presented with an issue on which a vote is to be taken. The user then uses a private ID key to sign their vote anonymously. Optionally, non-anonymous irrefutable voting may also take place in the system by simply switching from a private ID to a public one. This preferably forms the basis of a petition based system as an add-on to the voting system.

The system requires that a block of data can be published, namely preferably broadcast to each user via a messenger function, and picked up by each user of the system and presented as a poll. This poll is then signed by the user, and sent back to a poll issuer whose system will count the votes and preferably show a constant indication of the votes so far accumulated, for example in substantially real-time.

As there are public and private IDs available, then each vote preferably requires only one ID, namely a unique ID, to be used to prevent double voting. Preferably, geographic IP may be used to establish geographic analysis of the voting community particularly on local issues.

Next, a voting system pursuant to the present disclosure will be described with reference to FIG. 1, namely in relation to the aforementioned element PT8, and also with reference to FIG. 20. Details of a method of operating the voting system are provided in Table 17.

TABLE 17

A method of operating a voting system based upon the communication system

| Step | Detail |
|---|---|
| 1. | A vote is created in a normal fashion; it could be a list of candidates or a list of choices that users have to select. Preferably, this list will always have an "I do not have enough information" option appended to the bottom of the list, namely to ensure that voters have sufficient knowledge to make an informed decision. A limit on the last option should be stipulated as a limit to void the vote and redo the vote with more information. |
| 2. | This vote is stored on the system with the ID of the voting authority. This may be a chunk of data called with a specific name and digitally signed for authenticity. All storage nodes may be allowed to ensure certain authorities are allowed to store votes, and only store votes digitally signed with the correct ID. |
| 3. | A system broadcast may be used to let everyone interested know that there is a new vote to be retrieved. This is an optional step to reduce network congestion with constant checking for votes; other similar systems may be used for the same ends. |
| 4. | A non-anonymous user logged into the net will pick up the vote. This is a user with a public ID known at least to the authority. The vote may in fact be a shared chunk that only certain IDs have access to or know of its location (i.e. split onto several component parts and a messaging system used to alert when votes are ready). |
| 5. | An anonymous user may be logged onto the net and may in fact use a random ID to pick up the vote. |
| 6. | The vote is retrieved. |
| 7. | The system will send back a signed (with the ID used to pick up the vote) "I accept the vote". |
| 8. | The voting authority will transmit a ballot paper, namely a digitally-signed (and perhaps encrypted/chunked) ballot paper. This may be a digitally signed "authorisation to vote" slip which may, or may not, be sequentially numbered or perhaps a batch of x number of the same serial numbers (to prevent fraud by multiple voting from one source, namely to issue 5 same numbers randomly and only accept 5 votes with that number). |
| 9. | User machine decrypts this ballot paper. |
| 10. | The users system creates a one time ID + key pair to vote. This public key can be hashed and stored on the net as with a MAID or PMID so as to allow checking of any signed or encrypted votes sent back. |
| 11. | The vote is sent back to the authority signed and preferably encrypted with the authority's public key. |
| 12. | In the case of anonymous or non-anonymous voting, this may be further masqueraded by passing the vote through proxy machines en route. |
| 13. | The vote is received and a receipt chunk put on the net. This is a chunk called with the user's temp (or voting) ID hash with the last bit shifted or otherwise knowingly mangled, so as not to collide (namely be similar to) with the voting ID bit the user stores for authentication of their public key. |
| 14. | The authority can then publish a list of who voted for what (namely a list of votes and the voting ID's). |
| 15. | The user's system checks the list for the ID that was used being present in the list and validates that the vote was cast properly. |
| | If this is not the case: |
| 16. | The users system issues an alert. This alert may take many forms and may include signing a vote alert packet; this can be a packed similarly (as in step 13), and altered to be a known form of the vote chunk itself. There are many forms of raising alerts including, for example, simply transmitting an electronic message through a messenger function or similar and possibly to a vote authentication party and not necessarily the voting authority themselves. |
| 17. | The user has all the information to show the party investigating voting authenticity, accuracy, legality or some other aspect, thereby allowing faults and deliberately introduced issues to be tracked down. |
| 18. | The user has the option to remove all traces of the vote from his system at this time. |

Next, features of a proven individual of the communication system will be described, with reference to FIG. 1, and the aforementioned element P26 thereof.

According to a related aspect of the present disclosure, there is preferably using a system of anonymous authentication, preferably as in the communication system.

Access by a given user to a system can be made possible by use of information that the given user possesses, for example passwords and similar, or something that the given user physically has, for example iris/fingerprint or other biometric test. In order to prove an individual's identity, the system preferably uses a biometric test. Such tests are a key to a voting system, as such biometric tests become more broadly adopted in contemporary society. It is inherent in this system that is herewith described, that any personally identifying data must be kept secret, and also that any passwords or access control information is never transmitted.

When a user authenticates, the system can recognise whether or not they have done so biometrically. In this case, an account is regarded as a unique individual rather than an individual account. This is possible as communication can authenticate without accessing servers or database records of a biometric nature, for example.

As a user logs into the communication system through a biometric mechanism, as aforementioned, a state of login is known so no login box is required to be presented for the user to type in information in order to access the system. This allows the system to guarantee that the user has logged in biometrically. Moreover, the system on each machine is always validated by communication on login to ensure this process cannot be compromised. Preferably, some votes will exist in the communication system only for biometrically-authenticated users.

Next, a method of distributed controlled voting for the meaidsafe.net system will be described, with reference to FIG. 1, and in regard of the aforementioned element P29 thereof.

According to a related aspect of the present disclosure, in order to manage further the system, there has to be a level of control as well as distribution to enable all users to access it at any time. The distribution of the votes is controlled as system messages are stored for users, for example using the messenger system described earlier.

A main issue arising in practice with regard to a system such as this would be "what" is voted on and "who" poses the votes and words polls. This is key to the fairness and clarity of the system and process. This voting system preferably always has a "not enough information" selection to provide a route by which users are able to access information, so that they are well informed before making any decision.

The system requires a group of individuals, who are preferably voted into office by the public as the policyholders/trustees of the voting system. This group is beneficially known by their public ID and use their public ID to authenticate and publish a poll. This group is preferably voted into office for a term and may be removed at any time via a consensus of the voting public. For this reason, there is beneficially continual polls on line which reflect how well associated policyholders are doing as a group, and preferably in respect of individual members of the group as well.

According to a related aspect of the present disclosure, users of the system beneficially input to the larger issues on the system. Macro-management is beneficially carried out via the policyholders of the system, whom, as mentioned previously, may be voted in or out at any time; however, larger issues are beneficially left to the users. These issues can preferably be one of more of:
(i) what licenses are used;
(ii) costs of systems;
(iii) dissemination of charitable contributions;
(iv) provision to humanitarian and scientific projects of virtual computing resources on large scales,
and so forth.

To achieve this, preferably a system message is sent out, where it is not presented as a message but as a vote. This should show up in the users' voting section of the system. User private IDs are them required to act on this vote, and the users are able to make their decision.

In the system, there will be appeals on these votes when it would be apparent that a conclusion of the vote is dangerous to either a small community or the system as a whole. Users beneficially have an option of continuing with the vote and associated potential damage, but essentially the user decides and that is final. Preferably, this system does not have a block vote or any other system which rates one individual over another at any time or provides an advantage in any other way. This requires no ability to allow veto on any decision or casting of votes by proxy, so that the authenticated users decision is regarded as being properly recorded and final.

According to a related aspect of the present disclosure, there is provided a system of perpetual data, self encrypting files and data mapping which allows a global anonymous backup and restore system for data to exist, for example in a manner of a "drop box" for data files. This system is beneficially constructed from the aforementioned communication system, where data is susceptible to being made perpetual on a network, and anonymously shared to prevent duplication. This, together with the ability to check, manipulate and maintain revision control over files, adds a capability of a time machine type environment where data may be time stamped on backup.

This allows a system to rebuild a given users data set as it was at any time in history, since communication or similar technologies are employed. Such rebuilding of the user's data may form a defence at times where, in cases like prior art enquiries, insider dealing and similar are being considered, as the system is secure and validated by many other nodes, and so forth. It is therefore feasible to show what knowledge, at least from the point of view of owning the data pertaining to a subject, anyone had of certain circumstances.

According to a related aspect of the present disclosure, preferably using features of one or more aspects of the disclosure previously defined, taking distributed authentication, backup and restore along with data map sharing, the system can add to this an ability for granular access controls. In this case, a node entering the network will request an authenticator to authorise its access. In this case the authenticator will be a manager or equivalent in an organisation, whether matrix managed or traditional pyramid. This authorisation will tie the public ID of the authoriser to the system as having access to this node's data and any other authorisations they make, for example in an authorisation chain. This allows an environment of distributed secure backup, restore and sharing in a corporate or otherwise private environment.

According to a related aspect of the present disclosure, all of the capabilities described here with the exception of the above will ensure that a network of nodes can be created, in which users have security privacy and freedom to operate.

These nodes will have refutable IDs, for example MAID, PMID and similar, as well as non-refutable IDs, for example MPID, for different purposes; just as in human life in general, there are occasions when it is advantageous to be identified, and other occasions when it is desirable not to be identified.

According to a related aspect of the present disclosure, adding a functionality of non-refutable messaging allows users not only to communicate genuinely and securely, but also a functionality to communicate under contracted terms. This allows for the implementation of legally-kept trade secrets, as implied with NDA agreements and similar, together with many more contracted communications. This beneficially lessens a burden in system relating to legal issues such as litigation, and so forth.

According to a related aspect of the present disclosure, adding a functionality to create two voting systems, namely anonymous and non-anonymous, allows the system to provide a mechanism for instant democracy. This is achieved by allowing a voting panel to be provided in a given users account that is constantly updated with issues regarding the system and initially improvements thereto. These votes are beneficially anonymous.

In another anonymous voting scenario, for example based upon the aforementioned communication system, users are optionally capable of continually voting on certain subjects, for example in a manner of a running poll, wherein these subjects are optionally leaders of management boards, and so forth.

In a non-anonymous voting scenario, for example based upon the aforementioned communication system, a situation potentially arises where there are one or more groups of identified people, for example identifiable via their MPID, who have a common grouping such as a charity or similar, and they may require certain people to vote on certain matters and be recognised. This is where the MPID is beneficially used for voting purposes.

According to a related aspect of this present disclosure, there is additionally provided a functionality, namely an ability to collect and trade credits anonymously, thereby allowing users to sell machine resources they are not using, and also to trade on a network with a cash equivalent, for example in a manner of a fiat currency, and go about their business on a network as they do in real life.

According to a related aspect of this present disclosure, there is provided a system of self-encryption of data that does not require user intervention or passwords. The resultant data item then has to be saved or stored somewhere as in all methods. The self-encryption system creates cipher-text (encrypted) objects that are extremely strong and closer to perfect in terms of reversibility, and produce difficult-to-guess uncompress-able output. The difficult-to-guess and uncompressable output equates to random results based on random input data and random, unrelated algorithm inputs plain text, key and initialisation vectors in the case of modern symmetric ciphers. The self-encryption system includes a file chunking module, file encryption module, and a file obfuscation module.

The file chunking module splits an input data into several data chunks ($C_n$) based on the size of data file (f .size( ) and total number of data chunks. The total number of data chunks may depend on maximum number of data chunks, or maximum chunk size specified by the user. In an example, the input data may be divided into chunks of size 256 kB. The file chunking module beneficially further takes a hash of each data chunk, and hashes the hashed data chunks to create a structure, referred to as a data map. The file content, namely input data is referred to as $f_c$, file metadata is referred to as $f_m$, and $$\text{file hash } f_h = H(f_c) \text{ or } f_h = H(H(C_1) + H(C_2) + \ldots H(C_{n-1})) \quad (1)$$

The data chunks are created with fixed size to ensure the set required to recreate the file is almost as large as the number of available data chunks in any data store. This data map is mapped to file metadata through $f_h$.

In cryptographically secure hashing, the input data is analysed and a fixed length key called the hash of the data is produced. A cryptographically secure hash is a one way function which creates output that has a uniform distribution and can be computed in polynomial time. The output should be in fact random, although can be affected by a size of input. The size of input required is dependent on the strength of the hash functions employed. A hash function can be thought of as a digital fingerprint. Just as a fingerprint of a person is supposed to be unique, then a digital hash function is also supposedly unique. Two data pieces with the same hash result leads to a collision, The more secure the hash algorithm, then the likelihood of a collision is reduced. Again, similar to human fingerprinting, a hash cannot reveal data, just as a fingerprint cannot reveal a person (i.e. the person cannot be recreated from the print and the data cannot be recreated from hash)

The file encryption module uses two separate non-deterministic pieces of data, i.e. the encryption key (or password) and an initialisation vector (IV) for encryption of a data chunk. To ensure all data chunks of a file encrypt to the same end result, the IV is determined from non-deterministic data, i.e. hash of one of the data chunks. The encryption of data with encryption key and IV can be represented by $\text{Enc}_{[key][IV]}$(data), where the key and the IV for encryption of $n^{th}$ chunk are derived from separate portions of the hash of $n-1^{th}$ chunk. In an example, when the encryption algorithm is AES, the first 32 bytes of the hash of $n-1^{th}$ chunk are beneficially presumed to be the key and the next 16 bytes are beneficially presumed to be the IV, and an encrypted data chunk $C_{xen}$ is then formed from a data chunk $C_{xn}$ using hash of a $n-1^{th}$ data chunk $C_{n-1}$, such that (2)

$$C_{xen} = \text{Enc}_{[H(C_{n-1}[first 32 bytes])][H(C_{n-1}[32\text{-}48 bytes])]}(C_{xn}) \quad (2)$$

The hash of the encrypted data chunk $C_{xen}$ is conveniently represented as $H_{C_{xen}}$ and the encrypted chunk $C_{xen}$ is then beneficially renamed with the corresponding hash $H_{C_{xen}}$.

The file obfuscation module pollutes a data chunk with data from other data chunks. In an example, for obfuscating an $n^{th}$ data chunk $C_n$, firstly an identically-sized data chunk is created by repeatedly rehashing the hash of $n+2^{th}$ chunk $C_{n+2}$ and appending the result, i.e. $H(C_{n+2}) + H(H(C_{n+2})) + H(H(H(C_{n+2}))) + \ldots$. This identically-sized data chunk may be referred to as XOR $n^{th}$ chunk ($C_{XORn}$). Then, the XOR $n^{th}$ chunk ($C_{XORn}$) is XORed ($\oplus$) with $n^{th}$ data chunk $C_n$ to determine an obfuscated $n^{th}$ chunk $C_{xn}$.

In an example, a first obfuscated data chunk $C_{x1} \equiv C_{XOR1} \oplus C_1$, a second obfuscated data chunk $C_{x2} \equiv C_{XOR2} \oplus C_2$, and so forth. Although, XOR has been selected to represent a logical operation to obfuscate the data, this is not restrictive in any way and may be replaced by other obfuscation methods.

TABLE 18

A method of self-encrypting data using the file chunking, file encryption, and file obfuscation modules

| Step | Detail |
|---|---|
| 1. | Split an input data into several chunks ($C_n$). |
| 2. | Take hash of each chunk ($Hc_n$). |
| 3. | In case of AES or similar cypher, use [keysize] ($C_{n-1}$) as the key, use [next bytes]($C_{n-1}$) as the initialisation vector (IV); (for AES 0 to 32 bytes == key and 32 to 48 bytes == IV). |
| 4. | Create obfuscation chunk ($OBFC_n$) by concatenating the hashes of other chunks ([unused part of] $C_{n-1}$ $C_{n-2}$ and $C_n$). |
| 5. | Run encryption cypher or similar reversible method on ($C_n$), to produce ($C_{random}$). |
| 6. | Now data is considered to be randomised and of the same length as input data. |
| 7. | $OBFC_n$ is also random output, but of a length less than the input data. |
| 8. | Take $OBFC_n$ (repeated) XOR $C_{random}$ to produce output data. |
| 9. | Rename each with the hash of the new content and save these hashes. |

In the aforementioned method of encrypting data, the encryption of the data chunks and then thereafter XOR'ing them together, namely for obfuscation purposes, provides synergistically extremely secure data, which is substantially impossible for NSA in the USA and GCHQ in the UK to decrypt, even using extremely powerful modern computers. When the obfuscation is performed before encryption, a much inferior result in terms of data security is obtained. The encryption followed by XOR obfuscation is very robust, as aforementioned.

The symmetric encryption algorithm (AES) introduces randomness to the data, and the obfuscation module repeats random data. Therefore, the self-encryption process can be considered substantially, for practical purposes, as a form of one time pad.

Data Map: The data maps facilitate retrieval of plain-text from the cipher-text (encrypted) data chunks.

TABLE 19

Data map structure
$fh = H(H(c_1) + H(C_2) + \ldots H(C_{n-1}))$

| | |
|---|---|
| $H(c_1)$ | $H(c_{xe1})$ |
| $H(c_2)$ | $H(c_{xe2})$ |
| ... | ... |
| $H(c_n)$ | $H(c_{xen})$ |

In the aforementioned data map structure, the file hash $f_h$ in the top row identifies the data and acts as the unique key for the input file. The left-hand-column includes all the passwords and IV's, which are derived from the original chunk hashes, and the right-hand-column include names of all the encrypted and obfuscated data chunks. The data map structure facilitates retrieval of plain-text from the cipher-text chunks, where the retrieval process includes:

1) Retrieving the chunks listed in right hand column
2) Creating each XOR chunk again
3) Reversing the obfuscation stage
4) Decrypting each result
5) Concatenating the results.

Data Atlas or Recursive Data Maps:

The data maps ($d_m$) from multiple files can be concatenated into a new structure, referred to as a data atlas ($d_a$), where $d_a \equiv d_{m1} + d_{m2} + \ldots d_{mc}$. This data atlas is itself now a large piece of data and may be fed into the self-encryption process, to produce a single data map and more data chunks. The data chunks may be stored somewhere and the single remaining data map may be the key to all data.

Modifications to embodiments of the invention described in the foregoing are possible without departing from the scope of the invention as defined by the accompanying claims. Expressions such as "including", "comprising", "incorporating", "consisting of", "have", "is" used to describe and claim the present invention are intended to be construed in a non-exclusive manner, namely allowing for items, components or elements not explicitly described also to be present. Reference to the singular is also to be construed to relate to the plural. Numerals included within parentheses in the accompanying claims are intended to assist understanding of the claims and should not be construed in any way to limit subject matter claimed by these claims.

I claim:

1. A method of protecting data, comprising:
   providing a system including a plurality of users, a plurality of data storage nodes and a data communication network linking the plurality of users to the plurality of data storage nodes; and
   storing user data corresponding to a currency value authenticated by an authenticating arrangement by:
   (i) dividing the user data into a plurality of data chunks;
   (ii) swapping data between the data chunks to encrypt and/or obfuscate the data chunks;
   (iii) storing the one or more encrypted and/or obfuscated data chunks at the plurality of data storage nodes including maintaining multiple copies of the encrypted and/or obfuscated data chunks at the plurality of data storage nodes;
   (iv) recording, in at least one data map stored in encrypted form at one or more locations in the plurality of data storage nodes, locations of the plurality of data storage nodes at which the one or more encrypted and/or obfuscated data chunks are stored; and
   (v) from uncorrupted copies of the multiple copies of the encrypted and/or obfuscated data chunks, regenerating one or more replacement encrypted and/or obfuscated data chunks and replacing any copy of the encrypted and/or obfuscated data chunks which has been corrupted; and
   registering a change of value ownership at the authenticating arrangement of the system to transfer ownership of the currency value from one user to another.

2. The method as claimed in claim 1, further comprising generating encrypted and obfuscated data chunks by encrypting the data chunks, followed by obfuscating the data chunks using a modulo division function and/or an XOR function.

3. The method as claimed in claim 1, further comprising, for each data chunk, using known information from another chunk as the encryption key to encrypt each data chunk separately.

4. The method as claimed in claim 1, further comprising:
   determining a hash value for the user data; and
   using the hash value to determine at least one of: sizes of the data chunks and the number of data chunks corresponding to the user data.

5. The method as claimed in claim 1, wherein swapping data between the data chunks to encrypt and/or obfuscate the data chunks and storing the one or more encrypted and/or obfuscated data chunks at the plurality of data storage nodes further comprise swapping, by a first user, the data between the data chunks to encrypt and/or obfuscate the data chunks and storing, by the first user, the one or more encrypted and/or obfuscated data chunks;
   the method further comprising: decrypting and/or de-obfuscating the encrypted and/or obfuscated data chunks by a second user, wherein the first and second users are mutually cooperating parties of a secure data, video and/or audio communication link.

6. The method as claimed in claim 1, further comprising employing deterministic encryption to encrypt parts of files individually by chunking the data into determinable fixed-size data in a sliding window of several data chunks, wherein the deterministic encryption requires no input except the data of the files itself, and providing in-operation decryption that requires only the at least one data map for executing decryption of the encrypted data chunks.

7. The method as claimed in claim 1, further comprising employing a finger printing algorithm to create, by hashing, pseudorandom data suitable for encrypting the data chunks and/or the at least one data map.

8. The method as claimed in claim 1, further comprising:
   filtering the user data to generate corresponding metadata; and
   making the corresponding metadata available for data mining processes associated with third parties.

9. A computer program product for protecting data, the computer program product residing on a non-transitory computer-readable storage medium and comprising instructions which, when executed by a processor, cause one or more computers to:
   (i) divide, into a plurality of data chunks, data corresponding to a currency value which is authenticated by an authenticating arrangement;
   (ii) swap data between the data chunks to encrypt and/or obfuscate the data chunks;

(iii) store the one or more encrypted and/or obfuscated data chunks at a plurality of data storage nodes including maintaining multiple copies of the encrypted and/or obfuscated data chunks at the plurality of data storage nodes;

(iv) record, in at least one data map stored in encrypted form at one or more locations in the plurality of data storage nodes, locations of the plurality of data storage nodes at which the one or more encrypted and/or obfuscated data chunks are stored;

(v) regenerate, from uncorrupted copies of the encrypted and/or obfuscated data chunks, one or more replacement encrypted and/or obfuscated data chunks and replace any copy of the encrypted and/or obfuscated data chunks which has been corrupted; and (vi) register a change of value ownership at the authenticating arrangement of the system to transfer ownership of the currency value from one user to another.

10. The computer program product as claimed in claim 9, further wherein the instructions, when executed, further cause the one or more computers to generate encrypted and obfuscated data chunks by encrypting the data chunks, followed by obfuscating the data chunks using a modulo division function and/or an XOR function.

11. The computer program product as claimed in claim 9, wherein the instructions, when executed, further cause the one or more computers to encrypt each data chunk separately using, for each data chunk, known information from another chunk as an encryption key.

12. The computer program product as claimed in claim 9, wherein the instructions, when executed, further cause the one or more computers to:
   determine a hash value for the user data; and
   use the hash value to determine at least one of: sizes of the data chunks and the number of data chunks.

13. The computer program product as claimed in claim 9, wherein the instructions, when executed, further cause the one or more computers to:
   swap, by a first user, the data between the data chunks to encrypt and/or obfuscate the data chunks and storing, by the first user, the one or more encrypted and/or obfuscated data chunks;
   and decrypt and/or de-obfuscate the encrypted and/or obfuscated data chunks by a second user.

14. The computer program product as claimed in claim 9, wherein the instructions, when executed, further cause the one or more computers to:
   employ deterministic encryption to encrypt parts of files individually by chunking the data into determinable fixed-size data in a sliding window of several data chunks, wherein the deterministic encryption requires no input except the data of the files itself; and provide in-operation decryption that requires only the at least one data map for executing decryption of the encrypted data chunks.

15. The computer program product as claimed in claim 9, wherein the instructions, when executed, further cause the one or more computers to employ a finger printing algorithm to create, by hashing, pseudorandom data suitable for encrypting the data chunks and/or the at least one data map.

16. The computer program product as claimed in claim 9, wherein the instructions, when executed, further cause the one or more computers to:
   filter the user data to generate corresponding metadata; and
   provide the corresponding metadata to third party data mining processes.

17. A method of protecting data, comprising:
   providing a system including a plurality of users, a plurality of data storage nodes and a data communication network linking the plurality of users to the plurality of data storage nodes;
   determining a hash value for user data corresponding to a currency value authenticated by an authenticating arrangement;
   using the hash value to determine sizes of data chunks;
   dividing the user data into a plurality of variable-sized data chunks in accordance with the determined sizes;
   swapping data between the data chunks to encrypt the data chunks;
   storing the one or more encrypted data chunks at the plurality of data storage nodes including maintaining multiple copies of the encrypted data chunks at the plurality of data storage nodes;
   using known information from a first of the plurality of data chunks as an encryption key to separately encrypt a second of the plurality of data chunks;
   generating encrypted and obfuscated data chunks by obfuscating the encrypted data chunks using a modulo division function;
   from uncorrupted copies of the multiple copies of the encrypted and obfuscated data chunks, regenerating one or more replacement encrypted and obfuscated data chunks and replacing any copy of the encrypted and obfuscated data chunks which has been corrupted; and
   registering a change of value ownership at the authenticating arrangement of the system to transfer ownership of the currency value from one user to another.

* * * * *